US009387154B2

(12) United States Patent
Aggarwal et al.

(10) Patent No.: US 9,387,154 B2
(45) Date of Patent: Jul. 12, 2016

(54) APPARATUS AND ASSOCIATED METHODS FOR TRACKING AND INCREASING MEDICATION ADHERENCE FOR PATIENTS

(71) Applicant: TowerView Health, Inc., Philadelphia, PA (US)

(72) Inventors: Ankur Aggarwal, Philadelphia, PA (US); Nikolaos Valilis, Philadelphia, PA (US); Rahul Jain, Philadelphia, PA (US); Hareesh Ganesan, Philadelphia, PA (US); Jonathan K. Friedman, Marina Del Rey, CA (US)

(73) Assignee: TowerView Health, Inc., Philadelphia, PA (US)

( * ) Notice: Subject to any disclaimer, the term of this patent is extended or adjusted under 35 U.S.C. 154(b) by 0 days.

(21) Appl. No.: 14/949,012

(22) Filed: Nov. 23, 2015

(65) Prior Publication Data

US 2016/0074283 A1 Mar. 17, 2016

Related U.S. Application Data

(63) Continuation of application No. 14/680,036, filed on Apr. 6, 2015.

(60) Provisional application No. 61/975,717, filed on Apr. 4, 2014.

(51) Int. Cl.

| | |
|---|---|
| ***G08B 23/00*** | (2006.01) |
| ***A61J 7/00*** | (2006.01) |
| ***A61J 1/03*** | (2006.01) |
| ***H04B 1/38*** | (2015.01) |
| ***A61J 7/04*** | (2006.01) |

(52) U.S. Cl.

CPC *A61J 7/0069* (2013.01); *A61J 1/03* (2013.01); *A61J 7/04* (2013.01); *A61J 7/049* (2015.05); *A61J 7/0436* (2015.05); *H04B 1/38* (2013.01); *A61J 2200/70* (2013.01); *A61J 2205/60* (2013.01)

(58) Field of Classification Search

None

See application file for complete search history.

(56) References Cited

U.S. PATENT DOCUMENTS

| | | | | |
|---|---|---|---|---|
| 3,921,804 A * | 11/1975 | Tester | B65D 83/0463 | 206/515 |
| 4,693,371 A * | 9/1987 | Malpass | B65D 1/36 | 206/534 |
| 4,735,318 A * | 4/1988 | Keffeler | A61J 1/03 | 206/532 |
| 5,579,941 A * | 12/1996 | Romick | B65D 5/6611 | 206/538 |
| 6,102,855 A * | 8/2000 | Kehr | A61B 5/0002 | 206/561 |
| 6,779,663 B1 * | 8/2004 | Pocsi | A61J 1/03 | 141/242 |
| 7,004,324 B1 * | 2/2006 | Delorio | A61J 7/0481 | 206/534 |
| 7,661,530 B1 * | 2/2010 | Hewitt | A45C 11/24 | 206/528 |
| 7,793,785 B2 * | 9/2010 | Keffeler | A61J 1/03 | 206/532 |

(Continued)

*Primary Examiner* — Curtis King

(74) *Attorney, Agent, or Firm* — Clause Eight IPS; Michael Catania

(57) ABSTRACT

A medication container comprises a body portion and a grid coupled to the body portion. The grid and the tray each comprise a corresponding number of wells configured to contain medication. The tray is configured to be inserted into and removed from the body portion, above the grid. The tray may be configured to be connected to and disconnected from the grid, when the tray is inserted into the body portion. The wells of the grid may be configured to be manually loaded with medication by a user and the wells of the tray may be configured to be received by the user loaded with medication in accordance with a medication regimen. The first wells may be integral with the grid and the second wells may be integral with the tray.

14 Claims, 32 Drawing Sheets

(56) References Cited

U.S. PATENT DOCUMENTS

| | | | | |
|---|---|---|---|---|
| D683,914 | S * | 6/2013 | Jones | D30/121 |
| 8,607,983 | B2 * | 12/2013 | Niven | A61J 1/035 206/538 |
| 9,211,233 | B2 * | 12/2015 | Shavelsky | A61J 7/04 |
| 2006/0058917 | A1 * | 3/2006 | Vonk | A61J 7/0481 700/236 |
| 2009/0194452 | A1 * | 8/2009 | Hession | A61J 1/035 206/531 |
| 2013/0285681 | A1 * | 10/2013 | Wilson | G01N 27/00 324/693 |

* cited by examiner

APPARATUS AND ASSOCIATED METHODS FOR TRACKING AND INCREASING MEDICATION ADHERENCE FOR PATIENTS

CROSS REFERENCES TO RELATED APPLICATIONS

The present application is a continuation application of U.S. patent application Ser. No. 14/680,036, filed on Apr. 6, 2015, which claims the benefit of U.S. Provisional Patent Application No. 61/975,717, filed on Apr. 4, 2014, and both of which are hereby incorporated by reference in their entireties.

BACKGROUND OF THE INVENTION

1. Field of the Invention

The present technology is in the technical field of health monitoring, and, more specifically, medication adherence monitoring and assistance.

2. Description of the Related Art

Medication non-adherence compromises treatment efficacy, worsens patient health outcomes, and increases overall healthcare costs. In the United States alone, one-third to one-half of patients do not take their medications as prescribed by their physician. Estimates by the World Health Organization report that the average compliance rate in developed countries is 50%. In addition, medication non-adherence, suboptimal prescribing, and improper drug administration are responsible for an estimated $290 billion in "otherwise avoidable medical spending." These costs arise from increased physician and hospital treatment, as nonadherent patients are three times more likely to visit a doctor and incur $2,000 more in hospital treatment annually when compared to adherent patients. "21st Century Intelligent pharmacy project: the importance of medication adherence." Center for Health Transformation (2010).

There have been many attempts to improve medication adherence. For example, GlowCaps® from Vitality, Inc., Los Angeles, Calif. is a cap that screws-on to most standard, prescription medicine bottles. When a medication becomes due, both the cap and a plug-in nightlight flash orange to alert the patient of their dose. The cap transmits data to the plug-in device which ultimately communicates data over a cellular network. Patients receive a series of reminders after their medication is due, culminating in a reminder phone call to the patient or caregiver if the pill bottle is not opened. In addition to monitoring compliance, the GlowCaps® cap can also send a request for a new prescription via a push button that lies under the cap. Patients receive a call shortly after pushing the button, confirming their prescription.

MedPod, from Daya Medicals, Inc., Miami, Fla. ("DayaMed"), is a rechargeable and portable dispenser of pre-sorted medication. The MedPod reminds patients and/or their caregivers of missed doses via text, email, or by phone. LED lighting and audible reminders alert patients that they need to take their dose. DayaMed produces self-contained cartridges that can be loaded directly into the Medpod. These cartridges are shipped directly to patients, eliminating the need to manually load the device. Medpod is also equipped with a calling functionality that allows patients to directly contact their pharmacist or provider.

U.S. Pat. No. 8,744,620 B2, U.S. Pat. No. 8,193,918 B1, and U.S. Patent Publication No. 2013/0002795 A1, assigned to MedMinder Systems, Inc., Needham, Massachusetts ("MedMinder"), describe a technology enabled pill box that separates a patient's medications into 4 compartments for each day of the week. The compartments contain cups which in turn contain pills. Manipulating a lid, and/or placing into, removing from, or replacing a cup in a correct compartment are detected and compared to a medication dispensing compliance schedule. If a lid is not opened or a cup is not removed within a designated time frame, the patient receives an auditory prompt in addition to subsequent phone calls, text messages, and emails. The pill box can be equipped with wireless pendant that serves as a medical alert that connects patients to a medical professional at a certified monitoring center. MedMinder sells two basic types of pill boxes, one whose compartments remain locked until a dose is due and another whose compartments remain unlocked. Additionally, a patient can opt for MedMinder to issue trays, which can be filled by a caretaker to ease the burden of loading the pill box. The compartments of this tray contain the pill cups that the box would otherwise use.

U.S. Pat. No. 8,754,769, U.S. Patent No. Patent Publication No. 2014/0347175, U.S. Patent Publication No. 2014/024094, and U.S. Patent Publication No. 2013/0222135, assigned to AdhereTech, Inc., New York, N.Y., describe smart pill bottles that track the exact amount of medication inside the bottle in real-time, wirelessly sends the data into the cloud, and reminds patients to take their dose via automated call or text message. In addition, the pill bottle is equipped with LED lighting to alert patients directly that a medication dose is due.

A digital sensor that can be directly embedded into solid medication pills has been developed by Proteus Digital Health, Inc., Redwood City, Calif. ("Proteus"). The patient ingests a sensor which subsequently communicates with a wearable patch sensor on the patient's skin. From there data can be sent to Proteus software that allows monitoring of compliance by patients and caregivers. The sensor technology is currently only approved for use in an accessory pill that is taken alongside a patient's regular medications.

BRIEF SUMMARY OF THE INVENTION

Many current adherence systems that are preloaded with pills rely on blister packs to deliver medication. While known blister packs tightly control which pills a patient accesses, they offer little flexibility for manual modification. A tray, on the other hand, may enable manual adjustment for sudden medication changes.

In accordance with one embodiment of the invention, a medication container comprises a pill box container designed to hold a user's solid medications. As used herein, the term "pill" means any "solid medication," which includes tablets, capsules, powders, herbs, edibles, dietary supplements, suppositories, and the like. The medication container may also be configured to contain other forms of medication, such as liquid medicine, syrups, solutions, injectables, which may be scooped from the pill box by an implement, such as a spoon or drawn by a syringe, for example.

In accordance with one embodiment of the invention, the pill box comprises a body, a lid, wells for pills, and electronics. The pill box may be organized into individual wells for time of day (morning, afternoon, and night, for example) and day of the week, for example. In one example, in order to determine when a well's pills have been taken by the user, the electronics detect a sufficient change in the average dielectric constant of the volume of a well to indicate removal of medication from a well. Instead of or in addition to capacitance sensing, other technologies for sensing pills in the compartments may be used, such as weight sensors, pressure sensors, chemical sensors, or optical sensors, for example.

The medication may be manually added to wells in the medication container by a user and/or the medication container may be configured to receive pre-filled medication trays prepared by a third party, such as a pharmacy. The pre-filled trays may be delivered to a user's home or picked up by the user at the pharmacy, for example. Filling of the trays may be performed manually or by a machine at the pharmacy or other third party. The tray itself may be constructed of a thin plastic or other such material configured to fit within the medication container without interfering with existing sensing and communications functions. The wells in the trays may be sealed by pealable foil, for example. Trays may be shipped to or picked up by users at an interval of their choosing. The trays may also be configured to accommodate multiple users by assigning particular wells requesting users in a household. For example, if one member of the household takes medication in the morning, and the other in the evening, one row of wells may be assigned to one user and the other row of wells may be assigned to the other. In addition, a larger tray may be perforated to be easily broken down into smaller pieces for insertion into pill boxes for respective users.

While the replaceable tray simplifies loading of the medication container and/or a portable adherence system, and provides flexibility for a user, in accordance with embodiments of the invention, the pill box may be used without a tray or both the tray and a grid that also defines wells and supports the tray if present. If the tray is not being used, medications may be manually loaded into the grid. Concurrent use of the tray and grid may be advantageous when a dose of a medication is changed prior to receiving a tray reflecting the dose change, for example. In this case, the dose to be changed may be removed from the tray and the well of the grid beneath the dose removed from the tray may be filled with the new dose.

If a well remains full past the scheduled dose time or time period, a reminder may be issued. The reminder may be, for example: 1) a text message initiated by cellular hardware embedded in the pill box, 2) an automated phone call initiated by cellular hardware embedded in the pill box, 3) a visual reminder via patterns of LED lighting on the pill box, and/or 4) an audio reminder via speaker/s on the pill box, for example. Other types of reminders may be used in addition to or instead of the reminders listed above.

The medication container may communicate via one or more networks with an application ("App") on a user's device, such as computer, laptop, smartphone, tablet, etc. and/or a central processing center accessible via one or more networks that sends reminders to take medication, provides a dashboard (display) of a patient's medication schedule and adherence history, and allows communication between the user and optionally the user's care community, which may include, for example, a guardian, family, close friends, trusted individuals, insurance providers and/or healthcare providers, for example. Healthcare providers may include doctors, nurses, assistants, and pharmacists, for example. The care community may be designated by the user or user's guardian to have access to and/or to receive and/or have access to information about the adherence of the patient to their medication schedule, including receiving reminders and other monitoring information. The user/guardian may designate the members of the care community during registration with the system and at other times. The central processing center may also provide reminders for patients to refill prescriptions and deliver insight to providers regarding patient refill rates. Both the patient and healthcare providers selected by the patient may have the ability to edit medication schedules to accommodate changes in dosage and medication regimen. In addition, the software and/or the system may be used to initiate a refill either manually or automatically, for example.

As used herein, the term "medication schedule" is a set of data defining the dose times for a user. For example, medication schedule may define that a user should take their medications in the morning and the evening, or the morning, afternoon, and evening, for example. As used herein, the medication schedule does not identify the respective medications stored in the wells in the pill box. As also used herein, the term "medication regimen" is a set of data including the medication schedule and also including information related to medication, such as the name of the medication, the dose and prescribing instructions (beyond the dose time, which is in the medication schedule), such as taking a respective medication with food or without food, how to handle a skipped dose, contraindications, prescribing doctor, etc. The medication regimen may be provided by one or more doctors or other medical providers, for example. The regimen may be updated by medical providers as needed.

A single tray, such as a 1×7, 2×7, 3×7, 4×7 well tray, for example, may be used in a pill box to manage pills on weekly basis (medication doses 1, 2, 3, or 4 times a day for a week). In accordance with one embodiment of the invention, larger trays, such as a tray containing a week's doses of medication (a 3×7 or 4×7 tray, for example) may be separated into smaller pieces along perforations, for example. The separated smaller pieces may be inserted into a portable medication container configured to hold pills for one or a few days, for example. In this way, the original tray can serve as the pill source for both a highly portable, short-term compliance aid for one or a few days, as well as a less portable, longer term compliance aid, such as weekly, bi-weekly, or monthly for example.

In accordance with an embodiment of the invention, a medication container comprises a body portion and a grid coupled to the body portion. The grid comprises a first number of first wells configured to contain medication. The medication container further comprises a tray defining a second number of second wells corresponding to the first number of first wells. The second wells are also configured to contain medication. The tray is configured to be inserted into and removed from the body portion, above the grid. Respective second wells of the tray are configured to be received within respective first wells of the grid when the tray is inserted into the body portion. The tray may be configured to be connected to and disconnected from the grid, when the tray is inserted into the body portion. The wells of the grid may be configured to be manually loaded with medication by a user and the wells of the tray may be configured to be received by the user loaded with medication in accordance with a medication regimen. The first wells may be integral with the grid and the second wells may be integral with the tray.

At least one sensor configured to sense a first state of each well of the grid when the tray is not inserted into the body portion and to sense a second state of well of the tray when the tray is inserted into the body portion, may be provided. The first and second states are indicative of whether medication has been removed from a respective well. The sensors comprise capacitance sensors, for example. The capacitance sensors may be positioned below the grid, within the body portion. A processing device may also be provided. The capacitance sensors may comprise at least one excitation electrode and at least one receiving electrode electrically coupled to the processing device, and the processing device may be configured to process data received from the receiving electrode. The processing device may be configured to determine whether medication has been removed from a respective well based, at least in part, on data received from the at least one sensor. The medication container may further comprise a motion sensor.

The medication container may further comprise a cellular module and/or a Wi-fi module, and the processing device may be configured to forward processed data to a central processing center via the cellular module and/or the Wi-fi module. A Bluetooth module may also be provided and the processing device may be configured to forward processed data to a Bluetooth enabled device separate from the medication container, for forwarding to a central processing center.

At least some of the wells are arranged in a two-dimensional matrix. Columns, rows, and/or individual wells of the tray may be separable. The wells may be configured to contain pills. Each well comprises at least one wall configured to position the medication for sensing by the at least one sensor. A front wall of each well may be outwardly angled with respect to the interiors of each well, wherein the outward angle is configured to position medication loaded into a well for sensing by the at least one sensor.

In accordance with another embodiment of the invention, a medication container comprises a body defining multiple wells configured to contain medication. At leastone sensor is configure to sense the presence of medication in at least one of the wells. The wells have at least one wall configured to position the medication for sensing by the at least one sensor. The at least one wall may be outwardly angled with respect to an interior of each well, to position the medication for sensing by the at least one sensor. The at least one wall may have an upward concave curved cross-section with respect to the interior of the well to position the medication for sensing by the at least one sensor. The well further comprises a flat bottom wall and the curve of the front wall may be configured to position the medication on the flat bottom. The rear wall of respective wells may have an upward concave curved cross-section with respect to the interior of the well to also position the medication on the flat bottom.

The at least one sensor may comprise a capacitance sensor, for example. The capacitance sensor may comprise at least one excitation electrode and at least one receiving electrode below the wells. The at least one excitation electrode and at least one receiving electrode may lie in the same plane. An excitation electrode may be positioned proximate and below a front curve of each well and a receiving electrode may be positioned proximate and below a rear curve of each well, or example. A processing device may be electrically coupled to at least one excitation electrode and at least one receiving electrode. The processing device may be configured to process data received from the receiving electrode. As above, the medication container may further comprise a cellular module, a Wi-fi module, and/or a Bluetooth module. At least some of the wells may be arranged in a two-dimensional matrix, and the wells may be configured to contain pills. Sensing may take place in accordance with a medication schedule that the medication schedule defining times medication is to be taken from each well. The schedule may be stored in the storage. A motion sensor may also be provided. The processing device may be configured to cause sensing by the at least one sensor of the wells based, at least in part, on an asynchronous signal from the at least one sensor, and/or the motion sensor. As above, the wells may be defined in a tray and/or grid.

In accordance with another embodiment of the inventions, a medication container comprises a body defining multiple wells. At least some of the wells are configured to contain medication and capacitance sensors are below the wells, within the body. The capacitance sensors configured to detect the presence of medication in respective wells and a processing device is configured to control operation of the sensors and to receive sensor data. Other aspects of the medication container described above may also be included.

In accordance with another embodiment of the invention, a medication delivery system comprises a body portion and a tray defining a plurality of columns of wells to contain medication for a respective number of days. The tray is configured to be inserted into and removed from the body portion, and portions of the tray are separable from adjacent portions. The system may further comprise a second medication container separate from the first medication container. The second container comprises a body portion configured to receive at least one separated portion of the replaceable tray. Other aspects of the medication containers described above may be incorporated in the first and second medication containers in accordance with this embodiment.

In accordance with another embodiment of the invention, a medication container comprises a body defining multiple wells configured to contain medication. At least one first sensor is configured to monitor a state of respective wells and at least one second, motion sensor is configured to detect motion of the medication container. A processing device is configured to receive data from the first sensor and the second, motion sensor, and to use the data received from the first sensor and the second, motion sensor to determine whether medication has been removed from a respective well. The first and second data may also be used to whether medication has been added to a respective well. The data may be collected from the at least one first sensor and the at least one second sensor over a period of time. The processing device may be configured to forward via a network the received data by the at least one processing device to a central processing center separate from the pill box to determine whether medication has been removed from a respective well. In accordance with one embodiment of the invention, the processing device is configured to determine whether medication is removed from a respective well. In accordance with another embodiment of the invention, a central processing system is configured to determine whether medication is removed from a respective well, in a similar manner.

The processing device may be configured to delay sensing by the capacitance sensors based, at least in part, on the data received from the motion sensor. The may comprise an accelerometer and/or a gyroscope, for example.

The processing device is configured to determine whether medication has been removed from the at least a portion of the medication container based, at least in part, on the first and second stored data, by adjusting the first data based, at least in part, on the second data. The first data may be adjusted by determining a deviation of the second data from third data from the second, motion sensor when the medication container is at rest. The third data may be stored in storage in association with an identification of the respective medication container. A transfer function is determined to the first data based, at least in part, on the deviations. The transfer function is applied to adjust the first data and it is determined whether medication has been removed from the medication container based on the adjusted first data. The determination may be made by determining whether the adjusted first data is in the form of a step function is indicative of removal of medication from a respective well.

The processing device may also be configured to adjust the first data by comparing the first and second data to identify coincidences in respective time ranges. A transfer function to decrease or eliminate the identified coincidences in the first data is derived to adjust the first data based, at least in part, on the deviations. The transfer function is applied to the first data and it is determined whether medication has been removed from the medication container based on the adjusted first data. The determination may be made by determining whether the adjusted first data is in the form of a step function is indicative of removal of medication from a respective well.

As noted above, in accordance with another embodiment, the first data is adjusted at a central processing system which receives the data from the medication container and performs similar processing as described above with respect to the processing device of the medication container. The central processing center then determines whether medication has been removed from the medication container based on the adjusted first data. The determination may be made by determining whether the adjusted first data is in the form of a step function is indicative of removal of medication from a respective well.

DETAILED DESCRIPTION OF THE INVENTION

Figure 1:
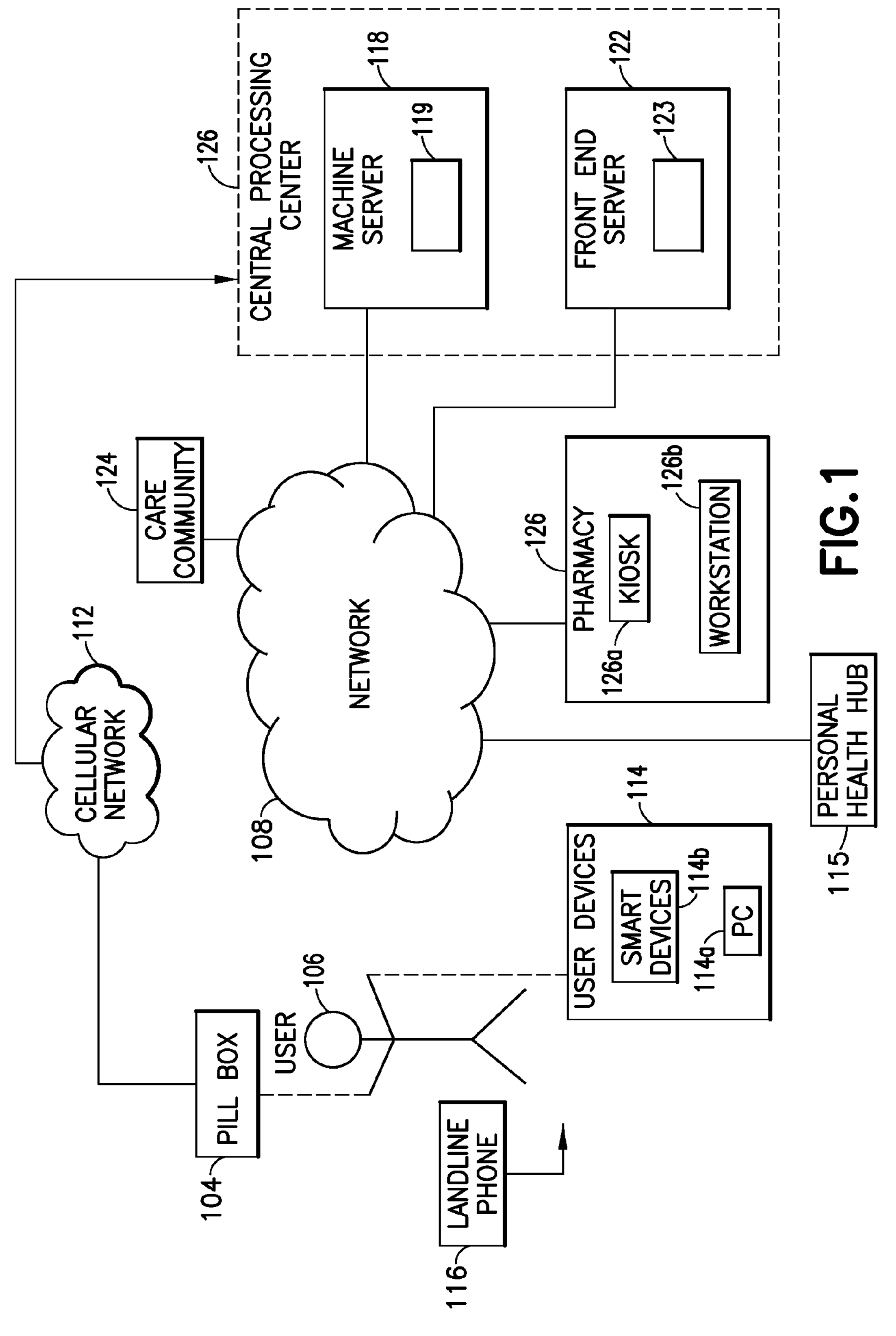
FIG. 1 is a block diagram of an adherence monitoring system in accordance with embodiments of the invention.

FIG. 1 is a block diagram of an adherence monitoring system 100 in accordance with an embodiment of the invention. The system 100 includes a central processing system 102 that exchanges information with a pill box 104 of a user 106 via one or more networks 108. In one example, the pill box 104 stores pills and other medications to be taken in accordance with a medication schedule. Sensors, such as capacitance sensors, are provided in the pill box to monitor the removal of pills, as discussed further below. In accordance with one embodiment of the invention, the pill box transmits sensor related data to the central processing center 102 and receives updated medication schedules from the central processing center, via the network 108. The data may be indicative of whether an event has taken place, such as the pill box 104 being loaded with pills or pills being removed from the bill box. The network 108 may be or include the Internet, for example.

The network or networks 108 through which the pill box 104 communicates with the central processing center 102 may depend on the capabilities of the pill box. If the pill box 104 is equipped with a cellular chipset or modem, for example, the pill box may communicate with the central processing center 102 through a carrier-maintained cellular network 112 and the network 108 or directly via the cell network 112. If the pill box 104, is equipped with a Wi-Fi module, the pill box may communicate with the central processing center via a router (not shown) coupling the pill box to the network 108, for example. The pill box 104 may also be equipped with other communications technologies, such as Bluetooth, BLE, ZigBee, Ethernet, etc. Bluetooth may be used by the pill box 104 to communicate with a user's personal smart device, such as a smart phone, for example, within range of the Bluetooth communication. If multiple technologies are provided in the pill box, communication may take place via network with the best coverage where the user 106 and pill box 104 are located at the time.

The user 106 is a representative user of medications stored in the pill box 104. The central processing center 102 may monitor the adherence of a large number of other users with their own respective pill boxes in the same manner described herein with respect to the user 106 Communications between the pill box 104 and the central processing center 102 may be encrypted for additional protections and the pill box 104.

The user 106 may also communicate with the central processing center 102 via their own user processing devices 114, such as a personal computer (PC) 114$a$ or laptop, or through their personal, portable smart devices 114$b$, such as their smartphone, Blackberry, Palm Pilot, etc. to register with the central processing center, for example. The central processing center 102 may also communicate with the user 106 via one or more of the user devices 114 to send reminders to take medication, and other messages, for example. The user 104 may also register with the central processing center 102 and receive reminders via a landline phone 116, for example.

The central processing center 102 comprises at least one processing device and storage, such as computer and at least one database, for example. In the example of FIG. 1, the central processing center 102 includes a machine server 118 front end server 122, each of which may be separate processing devices or part of one or more processing devices. The machine server 118 and the front-end server 122 each contain or are associated with respective storage, such as databases 119, 123, for example. The machine server 118 and the front-end server 112 may communicate with each other via the network 108 or directly. The central processing unit may operate on the cloud or another distributed storage and processing system. The machine server 118 and the front-end server 122 may be in the same or different physical locations.

In this example, the pill box 104 communicates with the central processing center 102 via the machine server 118, which stores the received sensor data, such as sensing data, received from the pill box, in the database 119. The machine server 118 may also process the sensor data, as described in more detail below. The database 119 also stores medication schedule data for the pill box 104, which is retrieved by the machine server 118 and transmitted to the pill box 104 via the network 108.

In this example, the front-end server 122 receives information related to the user 106 from user devices 114 and other networks 108 as necessary through the network 108 and/or the cellular network 112. The front-end server 122, which may also communicate with the user 106 via the pill box 104, the user devices 114, or the landline phone 116, for example, maps users to pill boxes, and provide reminders to take medication and other information to the users, for example. The mapping information may be stored in the front-end server 122 in the database 223, for example. The central processing system 102 or a portion thereof which may store sensitive user information may be HIPAA compliant and/or may comply with other standards. The operation of the central processing center 102 is described in more detail below.

The central processing center 102 may also communicate with one or more members of a care community 124 of a respective user 106. As discussed above, the user's care community may include trusted individuals and health professionals, such as physicians, nurses, family members, close friends, insurance providers, pharmacists, for example, designated by the user (or the user's guardian) to receive information about the adherence of the patient to a medication schedule. The user 106 or the user's guardian may designate the members of the care community during registration of the user with the central processing center 102 or at other times, via a graphical user interface, for example. Members of the care community may receive information from the central processing center 102 via the network by email or text, for example.

Members of the care community 124 may also be contacted by automated or personal phone calls, mail, etc. The mode of communication with the user 106 and respective members of the care community 124 may also be determined during set up and/or at other times by the user 106 and/or the respective members of the care community 124. For example, users may access to the web and/or mobile applications via smart hand held devices, such as smart phones, tablets, etc., through personal computers (PCs), to designate members of the care community 124 and the type of information they are to receive and/or have access to, and to select modes of communication with respective members of the care community. A settings menu or other such interface maybe used, for example. A patient may also set up such preferences by phone via voice or manual input through the display, for example.

A pharmacy 126 is also shown coupled to the network 110. In accordance with one embodiment of the invention, the central processing system 102 provides medication information to the pharmacy via the network 108, so that the pharmacy may refill prescriptions for the user 104. The pharmacy 126 may package the medications in a convenient fashion that facilitates loading of the pill box by the user, as discussed further below. The pharmacy 126 may then mail or otherwise deliver the packages of medication to the user or the user may pick them up at the pharmacy, for example. The user 104 may also register with the system through other types of devices, such as a kiosk 126*a* or a workstation 126*b* at the pharmacy 126, doctor's office, or insurance company, for example.

Pill Box

Figure 2:
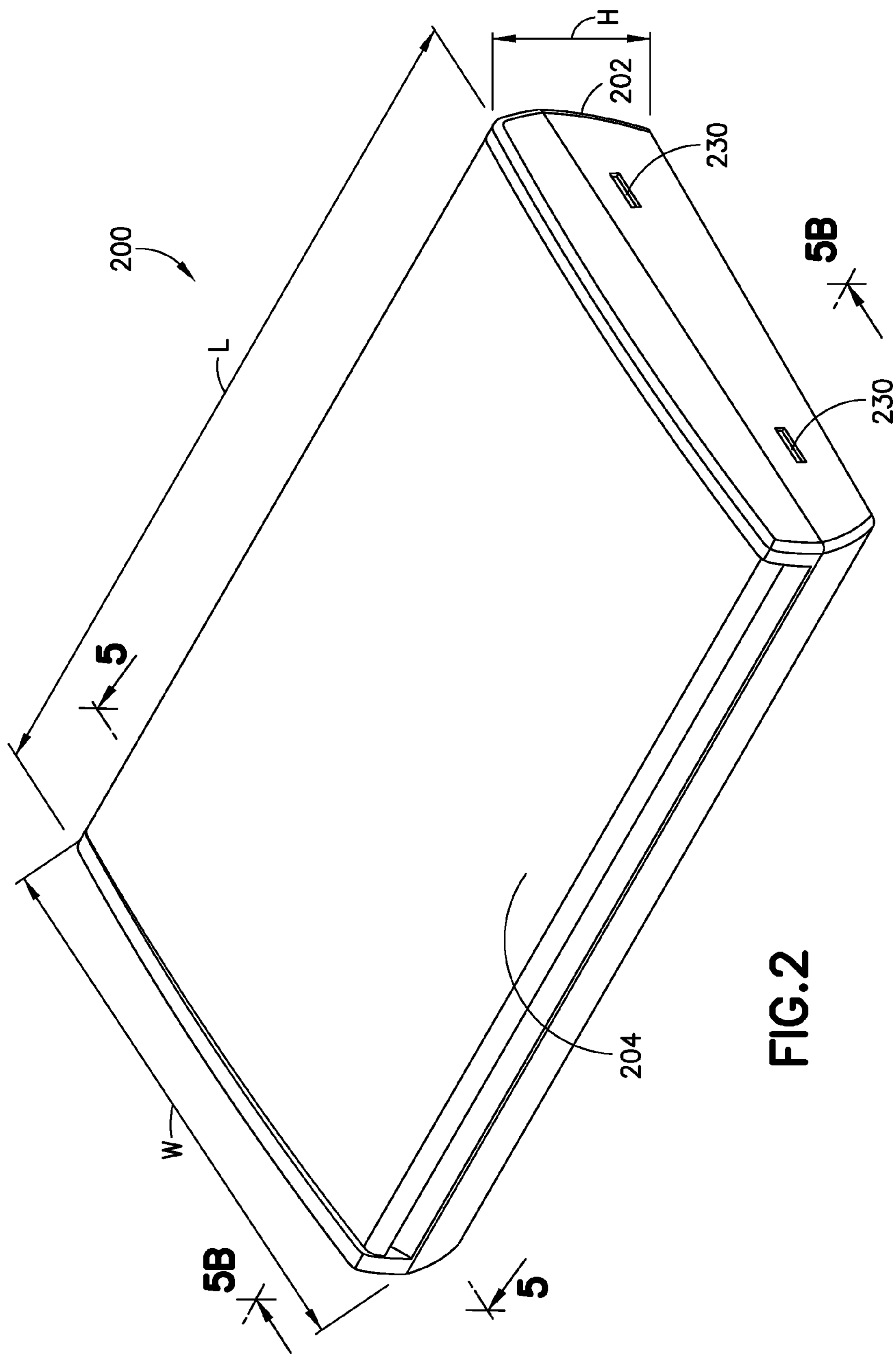
FIG. 2 is a perspective view of an example of a pill box for use in the embodiment of FIG. 1 and in accordance with embodiments of the invention.

FIG. 2 is a perspective view of an example of a pill box 200 in accordance with an embodiment of the invention. The pill box 200 comprises a body portion 202 and a lid 204. In one example, the pill box 200 has a length "L" of about 8 inches, a width "W" of about 4 inches, and a height "H" of about 2 inches (about 20×10×5 cm), for example. In another example, the pill box 200 has dimensions of 10×5×2 inches (about 25×12.5×5 cm). The pill box 200 may have other dimensions, as well.

Figure 3:
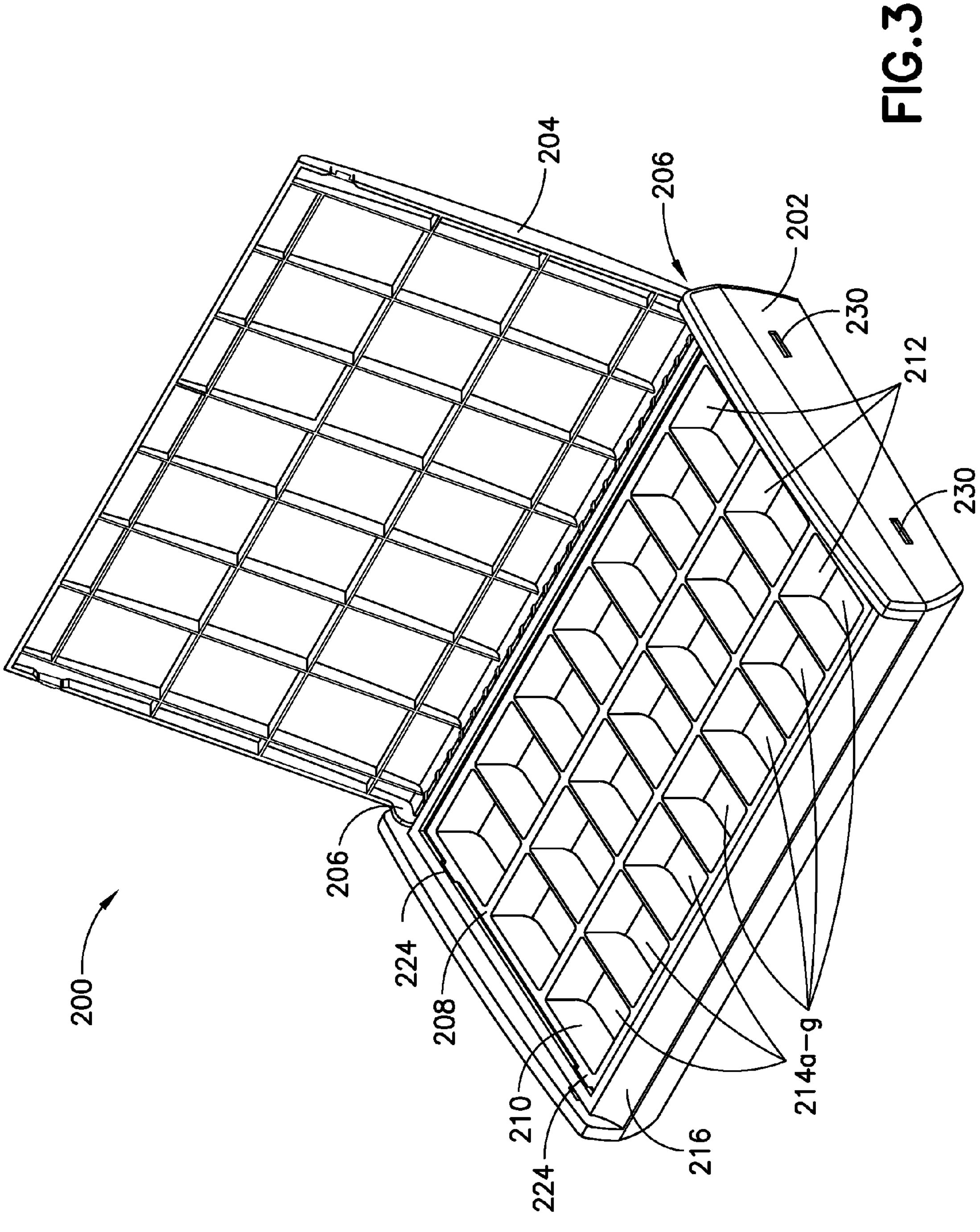
FIG. 3 is a perspective view of the pill box of FIG. 1 with a lid in an open position.

FIG. 3 is a perspective view of the pill box 200 with the lid 204 in an open position. The lid 204 is pivotally coupled to rear corners of the body portion 202 by pivots 206. The body portion 202 is configured to support a replaceable tray 208, comprising a planar frame 208*a* and open wells 210 protruding from the bottom of frame. The wells 210 are configured to support pills and/or other medications for a user 106. In this example the wells 210 are integral with the tray 208 in this example. Alternatively, the tray 208 and the wells 210 may be separate components. The wells 210 are arranged in this example as a matrix comprising three (3) parallel rows 212 *a-c* perpendicular to seven (7) parallel columns 224 *a-g*. The seven (7) columns 224*a-g* are for medication to be taken by the user 106 each of the seven (7) respective days of the week and the three rows 222 *a-c* are for medication to be taken respective three (3) time a day. The three (3) times of the day may be morning, noon, and evening, which may correspond with breakfast, lunch and dinner or bedtime, for example. The tray 208 in this example is received in a grid, which is better shown in FIG. 4. In this example, pills or other medication may be directly removed from a respective well by a finger or implement, for example.

Figure 4:
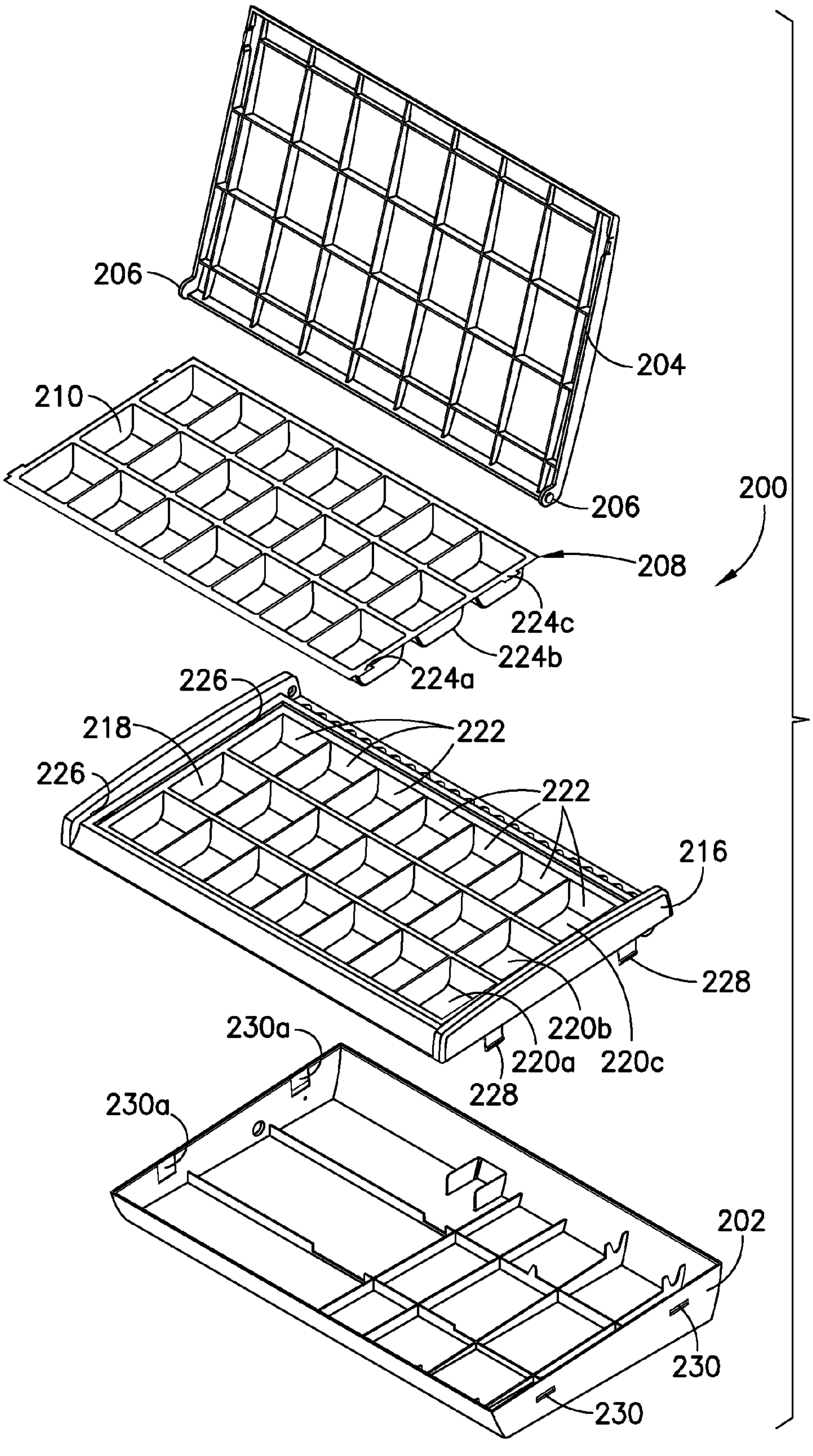
FIG. 4 is an exploded view of the pill box of FIG. 3.

FIG. 4 is an exploded view of the pill box 200 and showing the body 202, the lid 204, the pivots 206, the tray 208, and the grid 246. In accordance with one embodiment of the invention, the grid 216 is also configured to support pills in downwardly protruding wells 218 that are also arranged in a matrix of three (3) parallel rows 220 *a-c* perpendicular to seven (7) parallel columns 222 *a-g*. The shapes and positions of the wells in the matrix of the grid 216 correspond to the wells in the matrix of the tray 208, as shown more clearly in FIG. 5. In this example the grid 216 and the wells 218 are integral. Alternatively, the grid 216 and the wells 218 may be separate components. If pills or other medications are stored in the wells 218, they may be removed directly from the wells by a finger or implement, for example.

Since both the replaceable tray 208 and the grid 216 include wells, 210, 218, respectively, either the tray or the grid are optional. In this example, both the tray 208 and the grid 218 are provided.

Pills and/or other medications may be stored in the wells 210 of the tray 208 or of the wells 218 of the grid 216. Pills may be loaded by the user 106 or a third party manually into the grid 216. The third party may be a pharmacy 126 that loads the tray 208 manually or automatically by machine, for example. The pharmacy 126 may deliver the loaded tray to the user 106 by mail, for example. The user 106 may pick up the loaded tray from the pharmacy 126, as well.

Tabs 224 are shown protruding from the tray 208. The tabs 224 are inserted into openings 226 in the grid 216, as shown in FIG. 4. Slots or guides on the grid 216 may be provided to assist in positioning the tray 208. Indicia, such as arrows or other markings, for example, may be used to show the user 106 or another party how to orient and load the tray 208 in this and other examples of the pill box. If the grid 218 is not provided, the slots or guides may be provided in the body portion 202. To ensure that trays are only used with a particular type of pill box 200, a mechanical or geometrical feature in the tray 208 may be provided on the tray that only fits with a complementary feature in the grid 216 body portion 202, such as a lock and key arrangement akin to the way only certain keys may open certain locks.

The grid 216 includes clips 228 that clip into openings 230 in the body portion 202. The openings 230 are also shown in FIG. 4 and FIG. 2. A guide or groove 230*a* may assist the guiding clips 228 of the grid 216 into the openings 230 during assembly, for example.

Each well 210 in the tray 210 or each well 218 in the grid 216 may be used to store all the medication that user 106 has been prescribed to take on a respective day, at a respective time of day. Wells 210,218 may be assigned to doses of medication in different ways. For example, doses may be stored in columns from Sunday through Saturday or Monday through Sunday from left to right, evening to morning from front to back, vice-versa. The medication schedule may be modified, as discussed below. Depending on the medications needs of user 106, not all wells 210, 218 need be filled. For example, if a user does not need to take medication during or after lunch time, on any days of the week, the middle rows of wells 210, 218 need not be filled. Alternatively, the user 106 may use a pill box 200 with only two wells per column, one for the morning and one for the evening. Indicia of the days of the week may be placed on the inside of the lid 306, aligned with the corresponding column, for example, as discussed below.

Figure 5A:
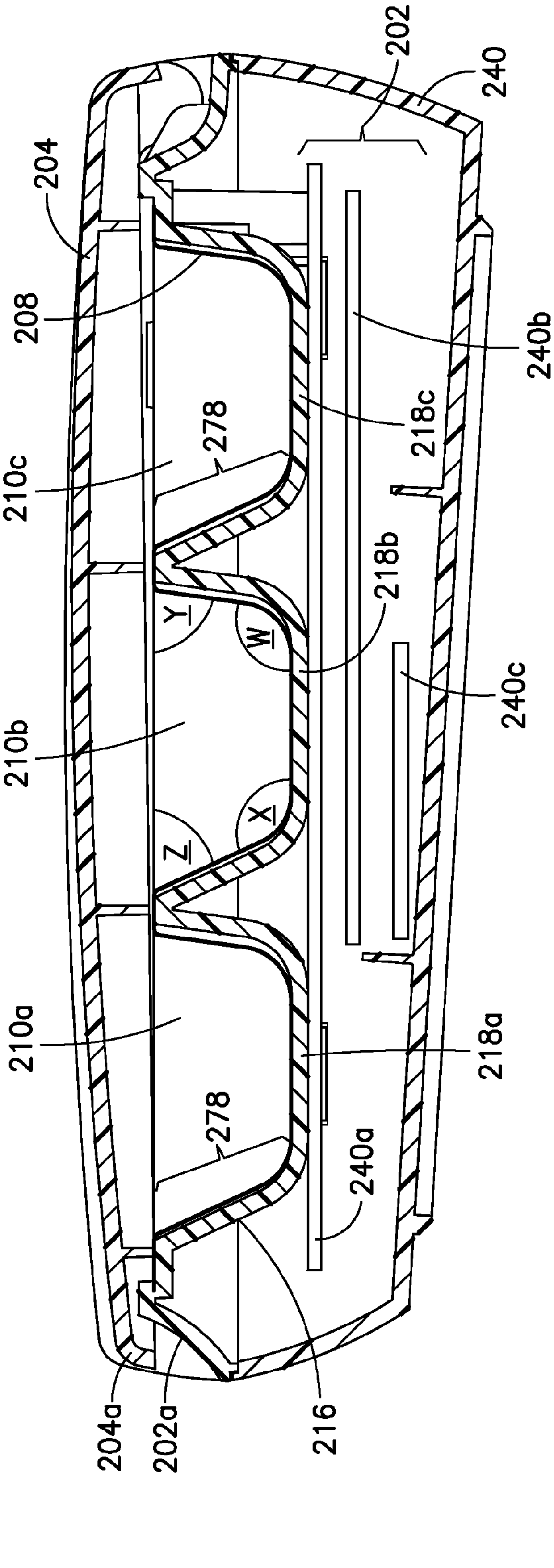
FIG. 5A is a cross-section view through line 5A-5A of FIG. 2.

FIG. 5A is a cross-sectional view of the pill box through line 5-5 of FIG. 2. The lid 202 in this example closes the pill box 200 by overlapping an inwardly tapered portion 202*a* of the body portion 202. The lid 204 may be locked to the body portion 202 in this and other examples by tabs or protrusions (not shown) on the lid 202 that may be received in openings on the outer side walls of the body portion 202, for example. In addition or instead of the side tabs, the lip 204*a* may be provided on the front edge of the lid 202 for engagement with a protruding lip (not shown) on the bottom portion 202. Velcro® may also be provided in the lid 204 and bottom portion 202 to close the pill box 200 along with or instead of the closure mechanisms described herein. The chosen closing mechanism is configured to be easily opened by a user's hand, thumb, or finger. Other easy opening closure mechanisms may be used in addition to or instead of those described above.

Electronics 240 on power control boards ("PCBs") 240*a*, 240*b*, 240*c* are supported by the body portion 202 below wells 218*a, b, c*, and other wells 218 of the grid 216, as shown in FIG. 5A. The electronics 240 control operation of the pill box 200, including detecting the presence and/or removal of pills from respective wells 210 of the tray or respective wells 218 of the grid 216, as discussed further below. By placing the electronics 240 below the grid 216, the electronics are not easily seen or accessible by the user 104. The electronics 240 may be positioned in other locations in the pill box 200, such as at the side or back of the body portion 202, or example. If the grid 216 is not provided, a plastic plate may be provided above the electronics 240 for protection. The electronics 240 include capacitance sensors or a capacitance sensor array below the grid 216 and supported on the PCB 240*a*, to sense the presence or absence of pills in respective wells. A processing device, such as a microcontroller or microprocessor, which may be supported on the PCB 240*b*, is electrically coupled to the sensors. A cellular module may be supported on the PCB 240*c*, for example. Other components are also supported on the PCB 240*b*, as discussed below in more detail with respect to FIGS. 12A-12C, for example.

FIG. 5A shows three wells 210*a*, 210*b*, 210*c* of the tray 208 received within three respective wells 218*a*, 218*b*, 218*c* of the grid 216. As mentioned above, the shapes of the wells 210 of the tray and the other wells 210 of tray 208 are similarly received within corresponding wells 218 of the grid 216. The shape of the wells 218 of the grid 208 match the shape of the wells 210 in the tray 208, in this example. In one example, wells 210 of the tray 208 are flush or nearly flush with the wells 210 of the grid 216, when the tray is inserted into the pill box 200.

FIG. 5A also shows that forward walls 278 of the wells 210*a*, 210*b*, 210*c* of the tray 208 and the wells, 218*a*, 218*b*, 218*c* are angled outwardly with respect to the interior of each well. The forward walls may have a curved or parabolic, upward concave geometry that rises toward the front of each well (in the direction of pill removal), for example. The other wells show the same curved/parabolic portion 278. The curved/parabolic cross-section allows the patient to more easily scoop out one or more pills by sliding the pill's along the curved surface of the well with one or two fingers. Providing such a curve may be particularly advantageous for patients having finger or hand weakness or coordination problems due to arthritis or other conditions, for example.

In the example of FIG. 5A, the bottoms 218*a*, 218*b*, 218*c* of the wells 210*a*, 210*b*, 210*c* are flat and the front walls 278 have an angle X of about 115 degrees plus or minus 20 degrees with respect to the bottoms of the wells. The radius of the curve through the angle X is 0.24, for example. The angle X may be 115 degrees plus or minus 10 degrees, or 115 degrees plus or minus 5 degrees, for example. The front wall 278 is not indicated in the well 210*b* for ease of illustration.

The rear walls 279 have an angle W of about 98 degrees plus or minus 5 degrees with respect to the bottoms 218*a*-218*c* of the wells 210*a*-210*c* and a radius of 0.21, for example. The rear walls 279 have an angle Y of about 82 degrees and the front wall 278 has an angle Z of about 65° with respect to the horizontal plane of opening the well.

While only one axis of the compartments is shown to have a curved or parabolic geometry, the other axis may have a similar geometry as well.

Pill boxes in accordance with other embodiments of the invention may have other arrangements.

During use, pill removal by a user 106 may follow any order. For example, pills may be removed in order from the front well 210 in row 222*a*, the middle well 210 in the middle row 226, and the back well 210 in the middle row **22*b* in the back row 222*c*, or vice-a-versa, as long as the electronics 240 in the pill box 200 and/or the processing device 402** are appropriately programmed to correlate respective wells to times of the day. The morning, afternoon and evening pills may be taken before, after, or during breakfast, lunch, and dinner, respectively, in accordance with doctor's instructions. Instead of morning, afternoon, and evening, the wells may be designated for different times of the day, such as 9:00 AM, 12 Noon, and 6 PM, for example.

The tray 208, which may comprise a flexible plastic material, for example, may be removed from the grid 216 by inserting two or more fingers in open wells to pinch the tray, disengaging the tabs 224 from the openings 226, and lifting the tray. Alternatively or in addition, a front edge **208*a* of the tray 310 may extend over an edge of the grid 216 and/or a rim (not shown) of the body portion 202. The tray 208 may be removed from the grid 216 to replace the tray, for example, by lifting the front edge 208*a* of the tray. The front of the grid 216 and/or the body portion may also be inwardly tapered toward the front edge 208*a* of the tray 208** to facilitate grasping the edge.

The body portion 202, lid 204, the tray 208, and the grid 216 of the pill box 200 and the other pill boxes described herein may be made of food-grade plastic, and/or other materials appropriate for storing pills and enabling the functions described here. For example, plastics such as acrylonitrile butadiene styrene (ABS), polyactic acid, (PLA), polyphenyle ether (PPE), and/or polyvinyl, may be used, for example. The pill box 200 and the other pill boxes described herein may contain metal if allowances are made to permit penetration of electromagnetic radiation for the purposes of wireless communication, in manners known in the art. This and other pill box configurations of plastic may be formed by 3D-printing, for example. Other methods of fabrication may also be used.

Figure 5B:
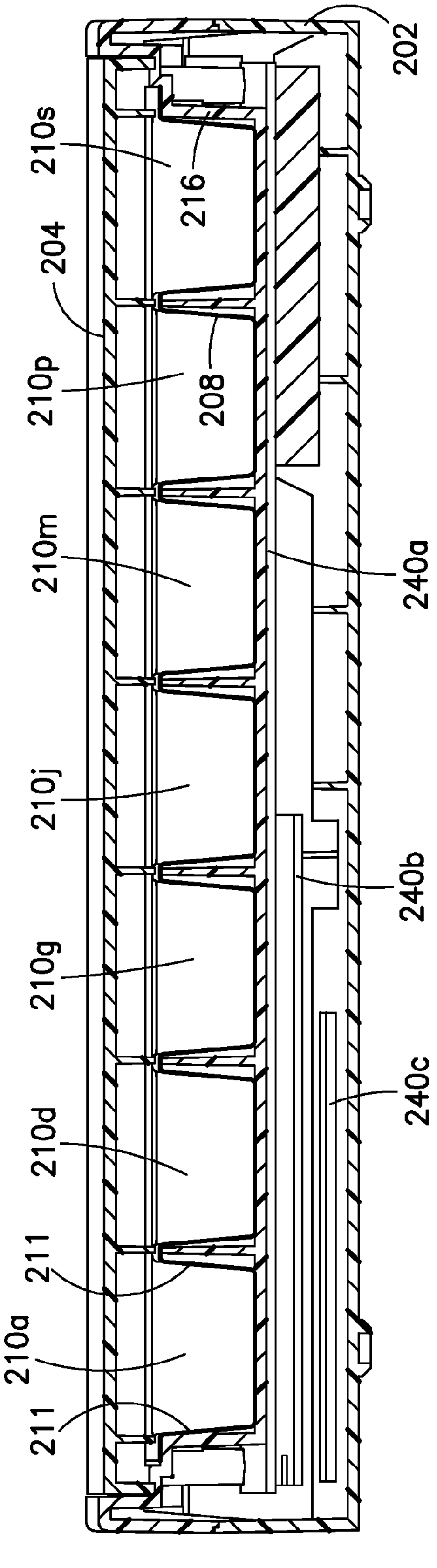
FIG. 5B is a cross-section view through line 5B-5B of FIG. 2.

FIG. 5B is a cross-section of a row of the pill box 200 through line 5A-5A of FIG. 2. The front row of the tray 208 and the grid 216, along with wells **210*a, d, g, j, m, p*, s are shown. Also shown are the body portion 202, the lid 204 in a closed position, and PCBs 240*a, b, c*. The angles of the side walls 211 of each of the wells is slightly greater than 90 degrees. The angles of the side walls 211** also assist in positioning the pills on the bottoms the respective wells for sensing.

Figure 6:
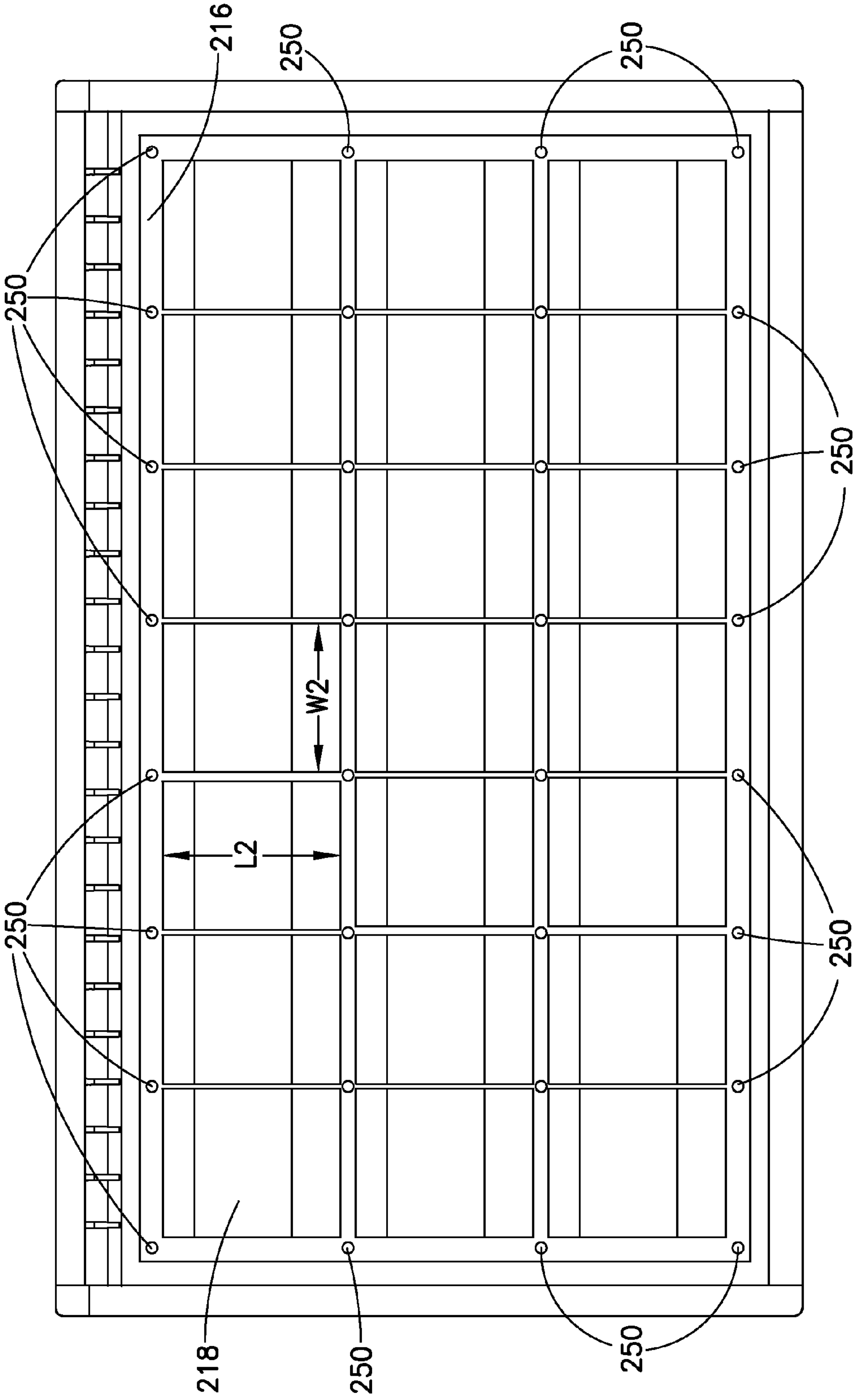
FIG. 6 is a top view of a grid of the pill box of FIGS. 2-5.

The wells of the grid 216 may be illuminated by devices such as LEDs or light pipes. FIG. 6 is a top view of the grid 216 showing LEDs 250 in each corner of each 218 well. The four LEDs 250 at corners of a respective well may be turned on to highlight the respective well when it is time for the user 106 to remove the pill or pills from that respective well. Adjacent wells may share LEDs 250 in a common corner. The operation of the LEDs 250 may be controlled by the electronics 240 to turn on at the appropriate time, as discussed further below. When the LEDs 250 or other lighting is used, the tray 208 may transparent or have holes selectively positioned over the lights, in order for the light to be seen through the tray.

FIG. 6 also shows the length L2 and the width W2 of the wells 218 of the grid 216 are 1.9 inches (4.83 cm) and 1.33 inches (3.38 cm), respectively, in this example. The wells 218/216 may have other sizes.

Figure 7:
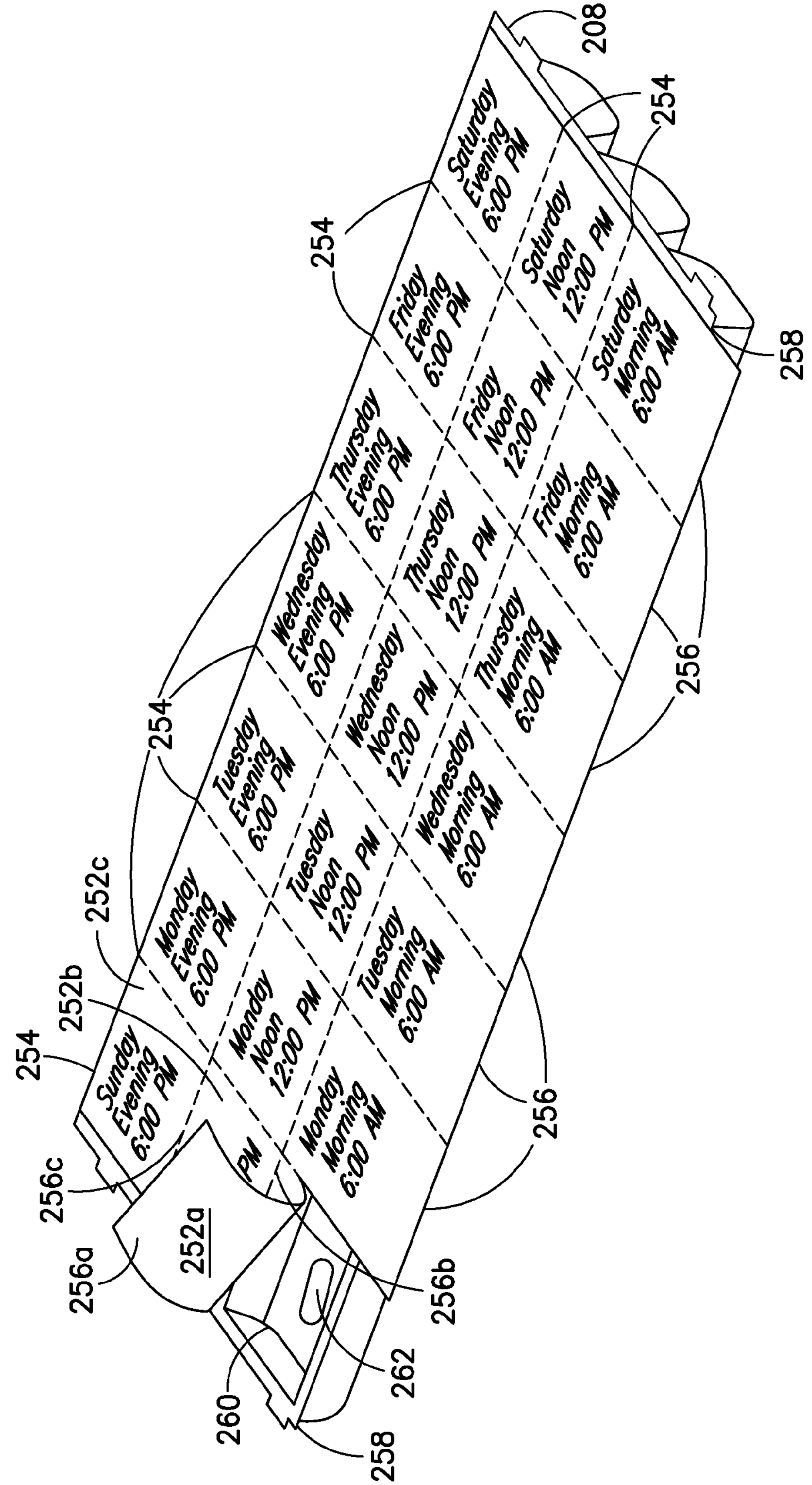
FIG. 7 is a perspective view of the tray of FIGS. 2-6, with seals over the wells.

FIG. 7 is a perspective view of the tray 208 of FIG. 5A, with seals 252 over the wells 240. The seals 254 may be foil seals, for example. Horizontal and vertical scores 254 may be provided between the wells 40 between adjacent seals for respective wells to facilitate removal of the seal over a respective well. The front edges 245 of the foil seals 252 extend over the front edge 258 of the tray 208 to facilitate removal of a respective seal. In this example, the seals in each column are labeled "Sunday Morning," "6:00 AM;" "Sunday Noon, 12:00 PM"; and "Sunday Evening, 6:00 PM," respectively. Different indications or no indications may be provided. Separations or openings may be provided in the seals above respective LEDs 250 to allow light from respective LEDs to pass through the tray and seal.

To open the first well (Sunday morning) 260, the front edge **256*a* of the Sunday morning foil seal 256*a* is lifted and peeled back over the first well. The seal 256*a* separates along the scores 254, revealing the first well (and a pill 262 in the first well). The seal 252 is configured such that when the first, Sunday morning seal 256*a* is removed, a portion of the front edge 256*b* of the Sunday Noon seal 256*b* extends over the rear of the Sunday morning well 260. The front edge 256*b* may then be readily grasped and peeled over the Sunday Noon well, removing the seal 252*b*. When that seal is removed, the front edge 256*c* of the Sunday evening seal 252*c* will terminate near the rear of that Sunday well so that an edge protrudes over the space of the well. This facilitates removal of the seal when it is desired to open the next well in the column. In an alternative configuration, each seal over each well may have a raised corner, facilitating removal of the seal. The tray 208 of FIG. 7** may also be used in the other pill boxes described herein.

As discussed above, pill loading may be performed by a third party, such as a pharmacy 126, for example, relieving the user 106 of the burden of loading the pills into the tray 208 or the grid 216. The pharmacy 126 may also seal a loaded tray 216 by foil. Equipment for loading trays with pills and sealing the trays with foil are known in the art.

The tray 208 may emit a signature that the pill box needs to receive and recognize in order to function as described. This may help to prevent the use of imitation trays manufactured or issued by third parties. The signature may be provided by an RFID tag (not shown) on the tray 208, which can be interrogated and detected by an RF sensor in the electronics 240 of the pill box 200, for example. The RF sensor may be coupled to the microprocessing device controller 402 in the pill box. Alternatively, the tray 208 may complete a circuit for example, introduce logic gates to complete a logic function in a digital circuit, in the pill box 200 coupled to the processing device 402, without which the pill box 200 will not work.

Capacitance Sensors

Figure 8:
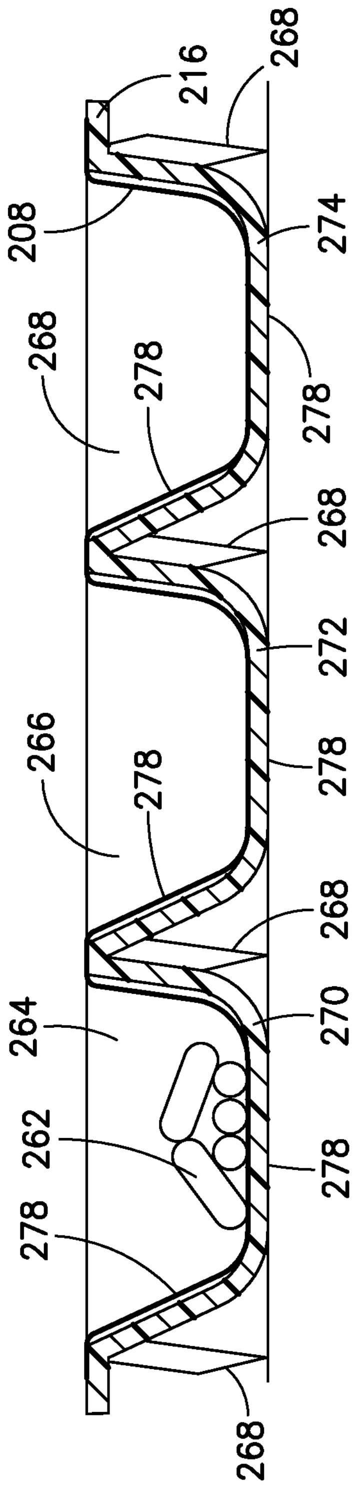
FIG. 8 is a partial cross-sectional view of an example of a portion of a pill box as in FIG. 5A, showing parallel plate capacitance sensors, in accordance with an embodiment of the invention.

FIG. 8 is a cross-sectional view of the tray 208 sitting in the grid 216 pill box 200, similar to FIG. 5. Five (5) pills 262 are in the first well **210*a* of the tray 208**.

Pills are not shown in the wells **210*a* and 210*b*, for ease of illustration, but pills typically would be in those wells during actual use. Capacitive plates 268 are positioned in grooves or other spaces between wells 270 and 272, and between wells 272 and 274 of the grid 216 to form parallel plate capacitors. The first plate in front of the well 270 is in a space between the well and the front side wall of the bottom portion 202. The plates 268 may be metal, for example. The dielectric between the opposing plates 362 includes the plastic or other material of the tray 208 and grid 216, the air within the wells between the plates, and any other contents of the well. Respective capacitance plates can act as transmitters and receivers, depending on which well is being sensed. When a pill or pills are 262 is inserted into a respective well 268, the dielectric constant of the well changes between the parallel plates, changing the capacitance between the plates. Capacitance plates 268 may be similarly positioned adjacent to opposite side walls instead of or in addition to between front and rear wall of respective wells. The plates 268 may be electrically connected to the electronics 240 for signal processing, as discussed further below. The principles described herein are also applicable when pills are directly stored in the wells of the grid 216, if the tray 208** is not used. The metal plates may be in the form of metal brackets with a L-shape that facilitates positioning between wells, for example.

Instead of providing metal capacitance plates within grooves or spaces between wells, the plates may be inserted into plastic layers of the walls of the wells during manufacture of the grid 216, such as by injection-molding or vacuum molding, for example. In another example, opposing walls of the wells of grid 216 may be coated with metal powder. The bottoms of the wells may also be metalized to provide electrical connections to the electronics 240. The walls of the compartments may also be made of copper-clad fiberglass, similar to a printed circuit board.

Figure 9:
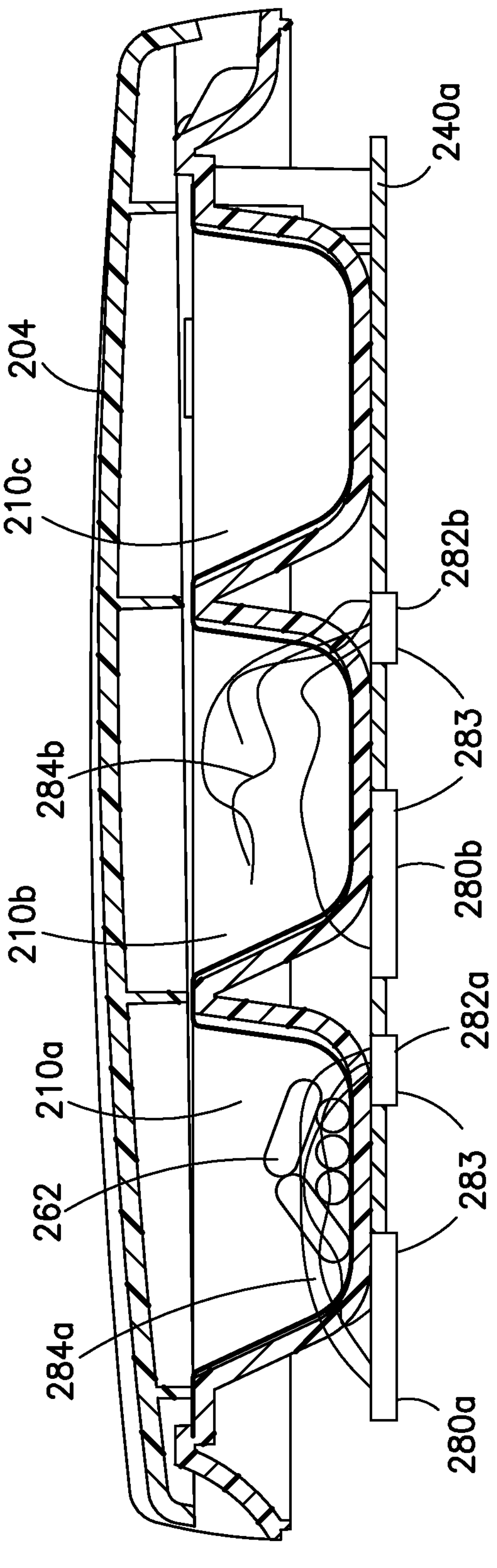
FIG. 9 is another partial cross-sectional view of a portion of a pill box as in FIG. 5A, FIG. 2, showing capacitance sensors below the wells, in accordance with another embodiment of the invention.

In accordance with another embodiment of the invention, capacitance sensors are provided below the wells 270, 272, 274, and other wells of the grid 216. FIG. 9 is the same side, cross-sectional view through line 5A-5A of the pill box 200 of FIG. 2, without the bottom portion 202 and without the PCBs 240*b* and 240*c* of the electronics 240, for ease of illustration. As in FIG. 8, five (5) pills 262 are shown in the first well 210*a* of the tray 208. As above, the principles described herein are applicable when pills are directly stored in the wells of the grid 216, if the tray 208 is not used.

Below the grid 216 is the PCB 240*a*. Two excitation electrodes 280*a*, 280*b* and two input channel electrodes 282*a*, 282*b*, are shown below the wells, 218*a*, 218*b* also below the same wells, in the same plane as the excitation electrodes. The excitation electrodes 280*a*, 280*b* and two input channels 282*a*, 282*b* are shown enlarged in FIG. 9 for illustrative purposes. In this example, the excitation electrodes 280*a*, 280*b* and input channel electrodes 282*a*, 282*b* are thin and not visible in the side view. An excitation electrode and an input channel electrode are also provided below the third well 218*c* and other wells of the grid, in positions corresponding to the positions of the electrodes with respect to the wells 218*a*, 218*b*, but are not shown enlarged in this view. Respective pairs of excitation electrodes and input channel electrodes form capacitance sensors 283. As discussed below, a single excitation electrode may be coupled to multiple input channel electrodes, such as all the input channel electrodes in a row, for example.

Electric fields 284*a*, 284*b* originating from the excitation electrodes 280*a*, 280*b* are received by the input channel electrodes 282*a*, 282*b*. The excitation electrodes 280*a*, 280*b* act as transmitters and the input channel electrodes 282*a*, 282*b* act as receivers and sinks for the respective electric fields 284*a*, 284*b*.

The electric fields 284*a*, 284*b* form in response to capacitive coupling between the excitation channel electrodes 280*a*, 280*b* and the respective input channel electrodes 282*a*, 282*b*. The electric fields 284*b* in the middle well 218*b* does not strongly couple into the corresponding input channel electrode 282*b* due to the absence of the dielectrics from the pills in the well 210*b*. The electric fields 284*a* in the first well 218*a*, in contrast, are strongly coupled between the corresponding excitation electrode 280*a*, and input channel electrode 280*b*, because of the presence of the dielectric in the pills 262. If the user 106 were to remove the pills from the first well 210*a*, the electric field 284*a* would more closely resemble the electric field 284*b*, because the dielectric from the pills 262 would not be present.

In one example, the capacitance sensors measure changes in displacement current between input channel electrodes 280*a*, 280*b* and corresponding excitation electrode 282*a*, 282*b* respectively. As is known in the art, the displacement current dQ/dt is equal to C*dV/dt, where C is positively correlated with dielectric constant, and dV/dt is approximately constant. Since the removal of pills 262 decreases C, dQ/dt is also decreased, as measured by capacitance sensors 283 using circuitry known in the art and discussed further below.

In another example known in the art, a voltage divider technique may be used to determine an impedance (i.e. capacitance) value between the respective excitation electrode and the respective input channel electrode. In this example, the voltage at an input channel electrode is divided against a load of known impedance such that, after a sufficient number of samples of the divided voltage, an accurate value of the impedance (i.e. capacitance) between the respective excitation electrode and the respective input channel electrode may be determined. An analog-to-digital converter, combined with delta modulation, for example, may be used to convert the divided voltage to a digital value.

FIG. 9 is a top view of an example of the PCB 240*a* of FIGS. 216A and 8B, showing three excitation electrodes 280*a*, 280*b*, 280*c*, one for each row of the grid 216, and 21 input channel electrodes in the form of respective pads, one for each well position. The pads may be copper pads, for example.

In each row, one (1) excitation electrode and seven (7) input channel electrodes are connected to form seven (7) respective capacitance sensors 283. For example, in row 208*a*, the excitation electrode 280*a* and input channel electrodes 282*a*, 282*d*, 282*g*, 282*j*, 282*m*, 282*p*, 282*s*, form seven (7) capacitance sensors. Thus, twenty-one (21) capacitance sensors 283 may be provided in a given pill box 104 to detect pill removal from all of the wells. In one example, the excitation electrodes and input channel electrodes in respective rows are activated at one time when the pill box 207 is sensing, with the electrodes for the other rows turned off. Sensing then proceeds, one row after the other, in an alternating pattern. Alternatively, individual input channel electrodes may be connected to a multiplexer (not shown) and individually excited and sensed. For example, multiplexors may be provided between the sensor IC 406 and the excitation electrodes in the capacitance array 404 so that the excitation signals are localized to a single well and single input channel electrode, to decrease cross-talk, for example.

The potential difference between excitation electrodes and input channel electrodes may be described by any number of profiles, such as, for example, a 3.3V, 250 kHz square wave. As mentioned above, the strength of the coupling between the excitation electrodes and input channel electrodes can be affected by the presence of dielectrics in wells, such as the pills 262, the materials of the grid 216 the tray 208 (if present), and the air. Environmental factors such as the moisture in the air and the air temperature, for example, may also affect the dielectric constant in the wells.

PCB trace lines from the input channel electrodes 228*a*-282*u* may be surrounded by adjacent traces in the plane of the PCB that are connected to an AC or capacitance shield (not shown), for example, to electrically isolate the traces from excitation energy from the excitation electrodes. The wave forms in the traces may be copies of the excitation in the wave forms in the excitation electrodes.

Figure 10:
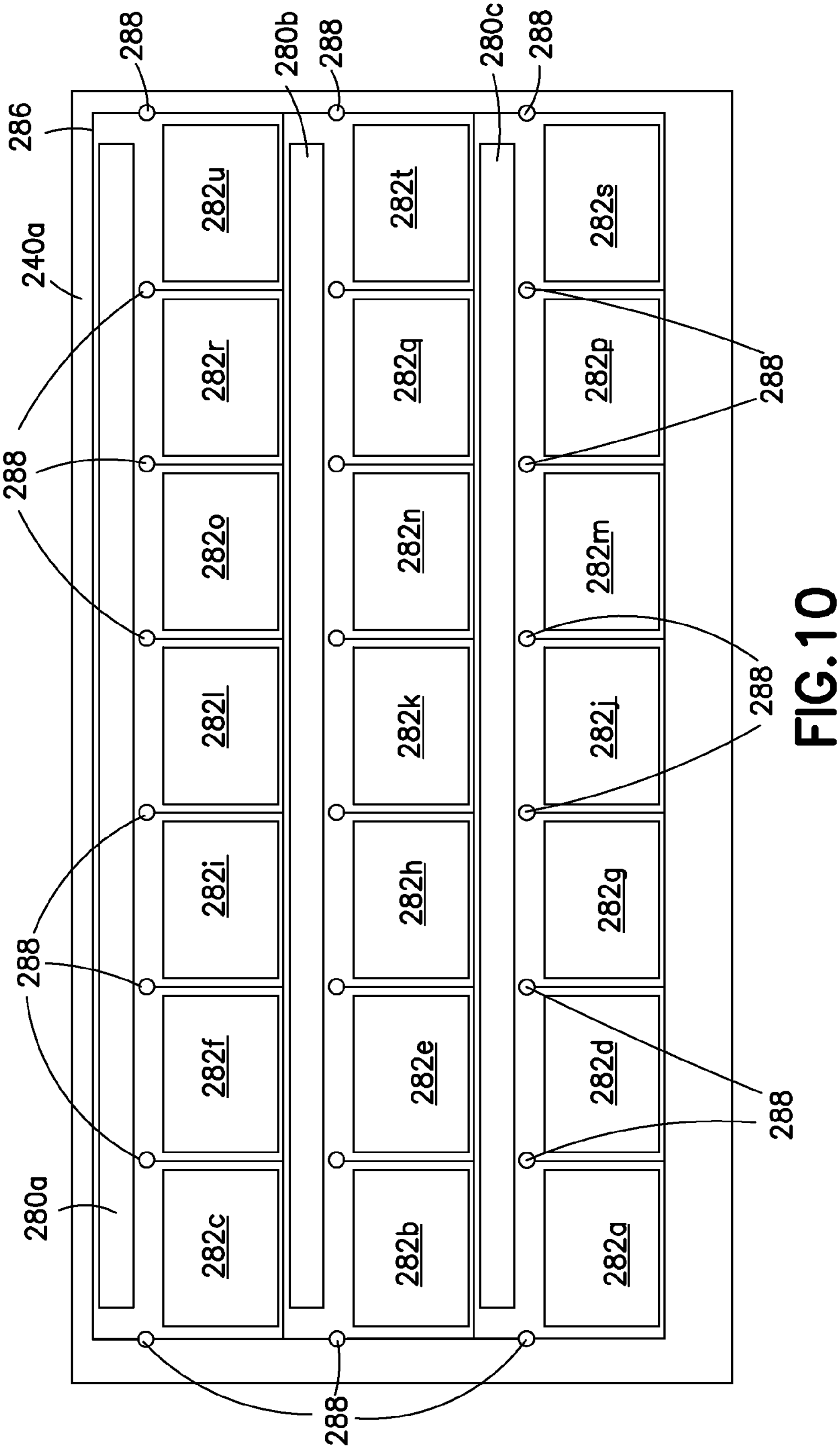
FIG. 10 is a top view of the capacitance sensors of FIG. 9 mounted on a PCB.

Ground lines 286 and 288 (some of which are identified as 288 in FIG. 10), which may be grounded copper traces in the PCB 240*a*, for example, may be positioned to shield the input channel electrodes 280*a*-280*c* from outside interference and from each other.

The shapes of the excitation electrodes 280*a*-280*c* and/or the input channel electrodes 282*a*-282*u* may be varied. For example, the electrodes may be curved or interleaved (in the form of alternating fingers of the excitation electrodes 280*a*-280*c*, and the input channel electrodes 282*a*-282*u*). Similarly, the excitation electrodes 280*a*-280*c* need not be continuous strips for the wells in a row, but may be split into separate rectangular or other shaped electrodes for each respective well, similar to the input channel electrodes 282*a*-282*u*. In this case, operation of the pairs of input channel electrodes/excitation electrodes may be multiplexed to decrease cross-talk, for example, as discussed above.

The pill box 200 may have other shapes and sizes, and/or be organized in accordance in other manners. For example, seven separate pill boxes in the form of respective columns or rows may be provided, one for each day of the week. Each pill box may be connectable for one or more pill boxes for other days of the week to form a larger pill box (for several days for example) or a complete pill box (for one week, for example). Each separate pill box may contain sufficient electronics to sense the removal of pills from wells in the separate pill boxes. Each column may have Bluetooth capability to communicate with a microcontroller present in one of the column of the pill boxes, which acts as a hub pill box, and/or wireless capability to communicate with the central processing center 102 for example.

The pill box 104 may include multiple two-dimensional grids stacked on top of one another and accessible via a staircase or related mechanism, in case the patient user 106 to store more than one week's worth of medications in a single box. Alternatively, additional sealed trays may be stored in a single pill box 102.

The lid 204 may be pivotally attached to the body portion 202 along the right side or left side of the body portion. Such positioning may be advantageous for a user 106 with weakness or disability in over as the other hand or arm, or other handicap, for example.

Figure 11A:
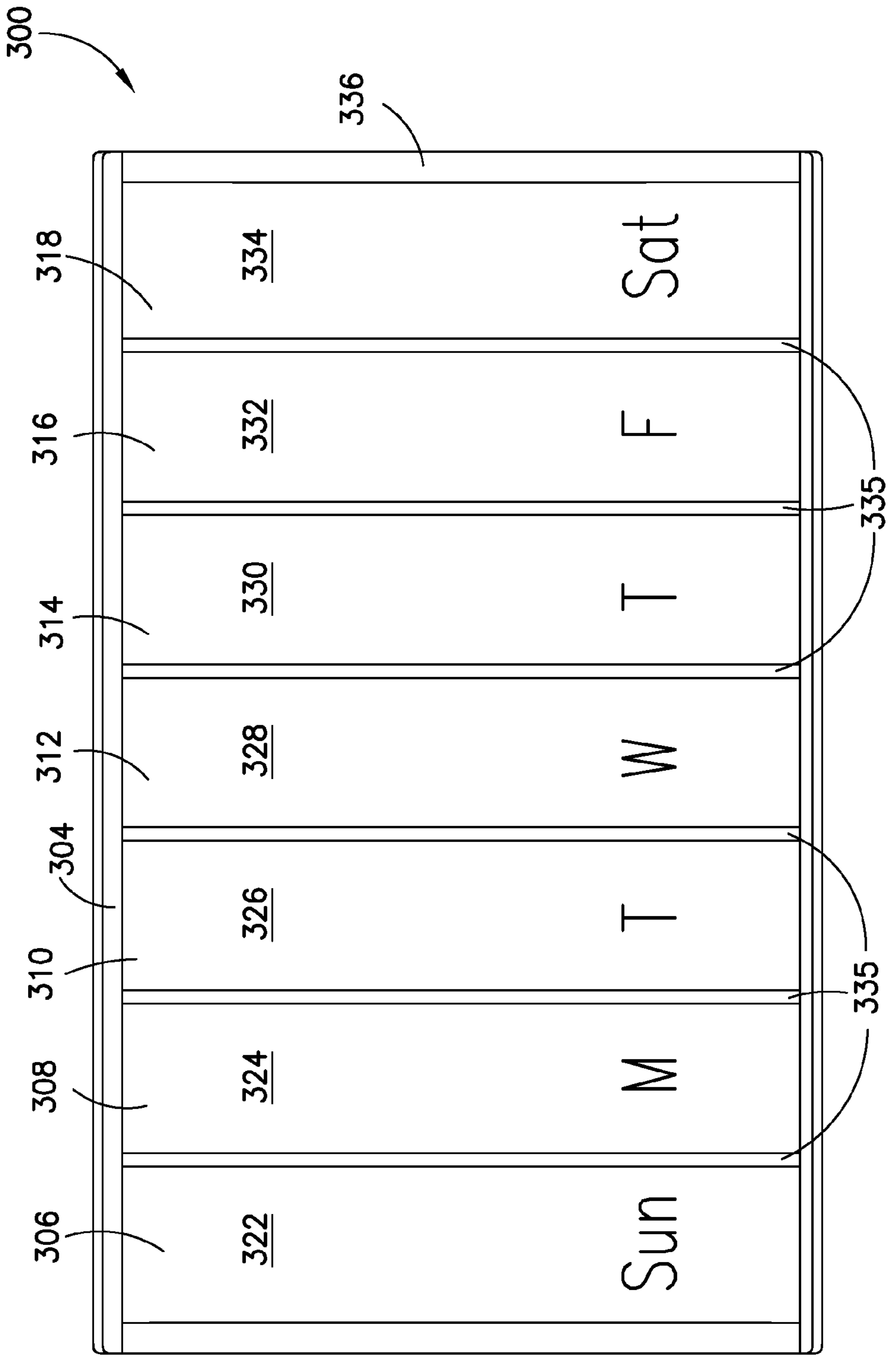
FIGS. 11A-11B are top view of another pill box in accordance with another embodiment of the invention.

FIG. 11A is a top view of another example of a pill box 300, which has a different lid 302 than the lid 204 of the pill box 200. The remainder of the pill box 300 may be the same as the pill box 200.

Figure 11B:
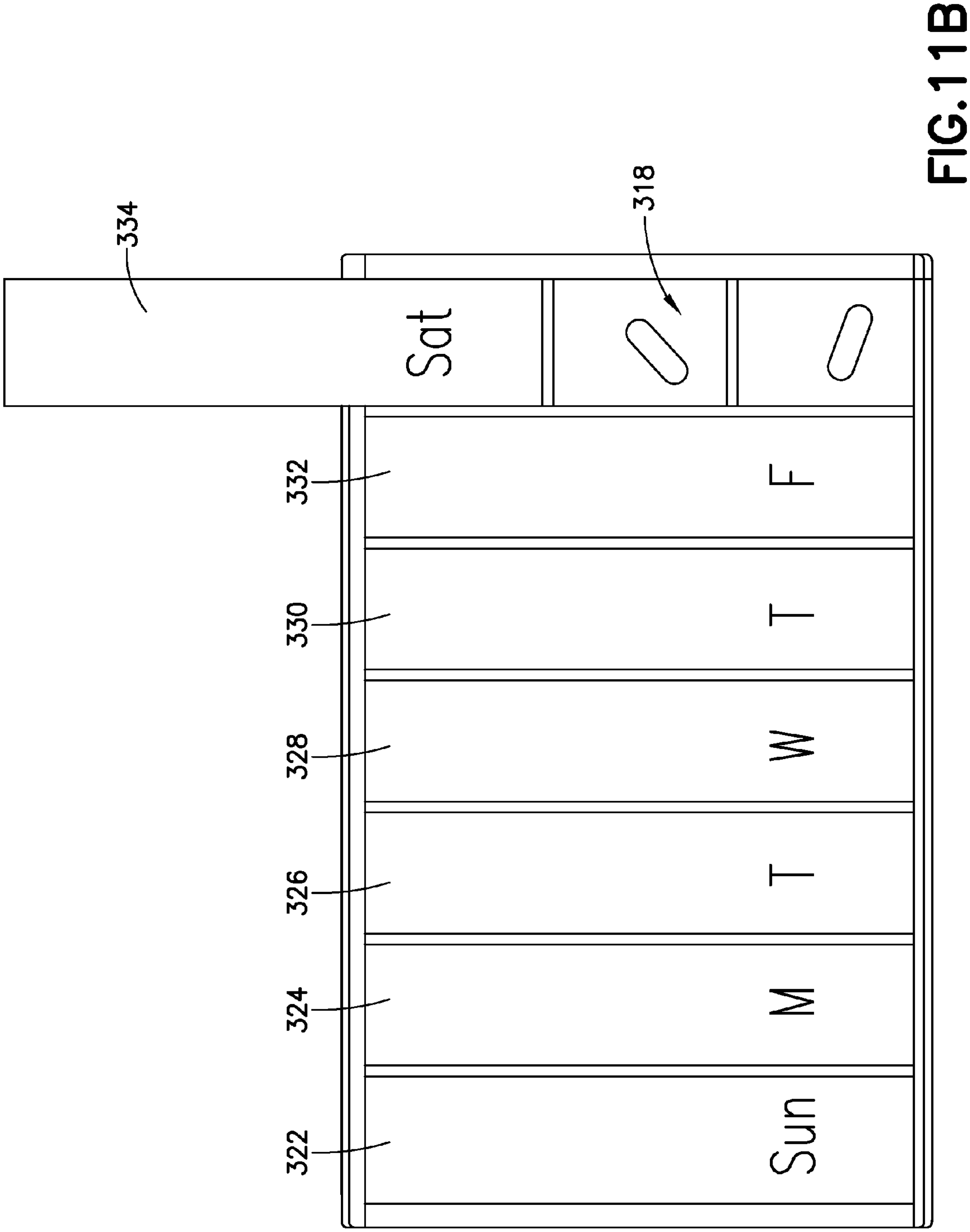

In this example, the lid 302 comprises a frame 304 defining seven (7) open, parallel columns 306-318. The open column 318 is shown in FIG. 11. Seven (7) lid sections 322-334 are provided, one for each column 306-318. The lid sections 322-334 may be moved by a user 106 within opposing grooves (not shown) defined by raised portions of a frame 336 of the lid 302, to reveal one or more wells for the pill removal. Two wells 338, 340 are shown in FIG. 11.

Each of the seven slidable lid sections 322-334 in this example are labeled according to the first English letter or first few letters of each day of the week. Other indicia may be used, such as the full name of the respective day, for example. In another example, the name of the day may be provided in multiple languages. Labeling, which is optional, may be similarly provided in the pill box 200.

In FIG. 11A, the Saturday lid section 334, which is labelled "Sat" in this example, is slid out of the respective column 320 to reveal two wells 342, 344. The three wells in each column may be mapped to the morning, afternoon, and evening times at which a user 106 may need to take medication, for example, as discussed above. While a pill box with 3 compartments per day for the seven days of the week will have 21 compartments, fewer or more compartments per day may be provided in a pill box for a respective user, in accordance with the needs of the user.

As above, pill removal by a user 106 may follow any order. For example, pills may be removed in order from the front well 342, the middle well 344, and the back well (not shown) or vice-a-versa, as long as the electronics 212 in the pill box 250 and/or the central processing system 102 are appropriately programmed to correlate respective wells to times of the day. For example, either the bottom well 342 or the top well (not shown) may be designated as the well containing pills for the morning and the evening, respectively, or vice-versa. The middle well 344 may be designated as the well containing pills for the afternoon. As above, the morning, afternoon and evening pills may be taken before, after, or during breakfast, lunch, and dinner, respectively, in accordance with doctor's instructions. Instead of morning, afternoon, and evening, the wells may be designated for different times of the day, such as 9:00 AM, 12 Noon, and 6 PM, for example.

The sliding lids may be pushed or pulled out to gradually reveal the wells containing the doses to be taken during the day, as shown in FIG. 11. This creates a natural convention for a user 106 to follow when loading, managing, and taking their pills. It may be convenient to assign the first well revealed as a lid is slid out to be the morning compartment, followed by the afternoon compartment, and finally the evening compartment, when the respective lid is slid out the maximum distance. A stop (not shown), such a protrusion (not shown) on a front end of each lid, may be provided on each lid section 322-334 to prevent a lid from being completely removed from each column 306-318, respectively.

As above, the pill box 300 may include a replaceable tray and/or a grid. The wells of the grid may be filled by a user 106 or by a third party, such as a pharmacy. If the tray is used, the wells of the tray may be loaded by a third party, such as a pharmacy, for example. The pharmacy may deliver one or more preloaded trays 272 to the user 106 for insertion into the grid 270 of the pill box 250 or the user 106 may pick the tray(s) from the pharmacy, for example.

Figure 12A:
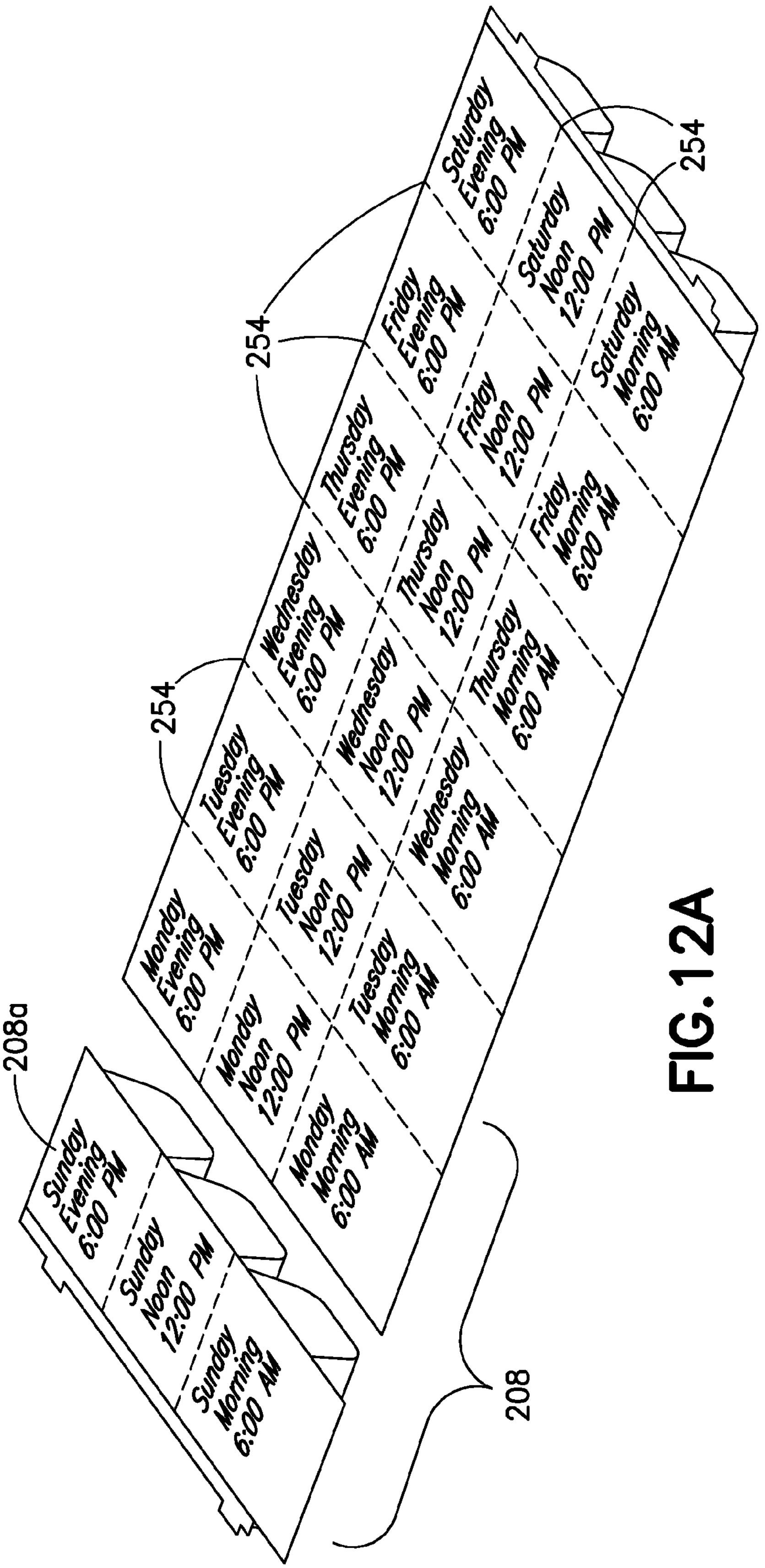
FIG. 12A is a perspective view of a tray with separable columns, showing the left most column separated from the rest of the tray, in accordance with an embodiment of the invention.

The tray 208 may have perforations along the rows and/or columns so that it may be separated into multiple columns using methods known in the art for perforating plastic and plastic like materials. The perforations may coincide with or be near the scores 254 of the seals shown in FIG. 7, for example. In this way, the tray 208 may be used in pill boxes of different form factors than the one described herein, which may be useful for greater portability. For example, a user 106 may separate one or a few adjacent columns 222 of the tray 208 to travel with the separate portion without the pill box, or to place the tray in a smaller pill box (such as a one, two or three column box for one, two, or three days, respectively, for example). FIG. 12A shows a left column 208*a* of the tray 208 separated from the tray 208.

Figure 12C:
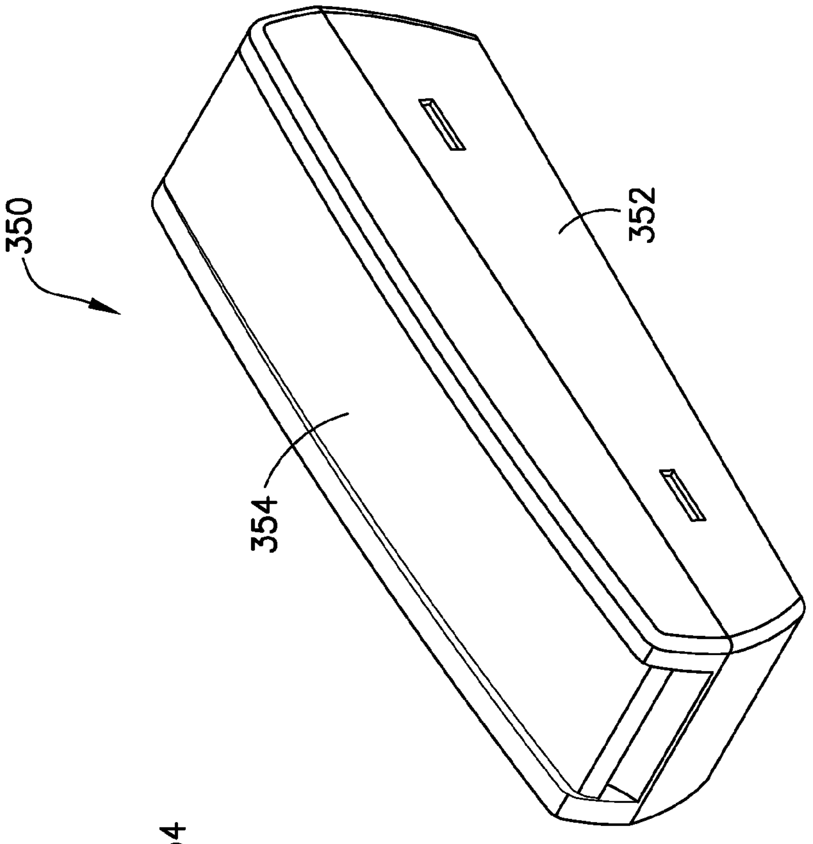
FIGS. 12B-12C show perspective views of a pill box for accommodating the separated column of FIG. 12A, in accordance with another embodiment of the invention.
Figure 12B:
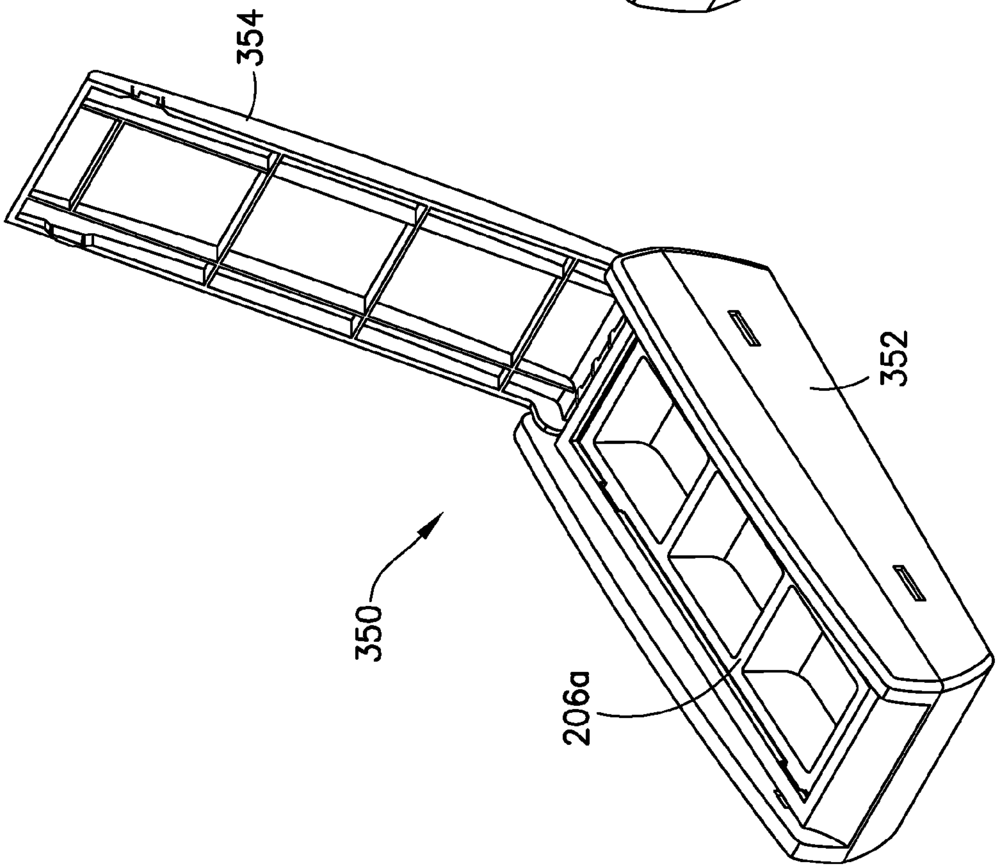

FIG. 12B shows the separated column in a one-column pill box 350. FIG. 12C shows the pill box 350 with the lid 352 closed. The one-column pill box 350 includes a body portion 352 and a lid 354. A one-column grid may or may not be provided. Sensors, a processing device, and other components, such as a Bluetooth module 410*c* (discussed below) may be provided in the pill box 350 to send information including sensor data to another Bluetooth enabled device, such as the pill box 200, a user device 114, such as a smartphone 114*b* or a personal health hub 115 in the user's home for example. Information sent to the pill box 200 may be processed by the pill box and/or sent to the central processing center 102, for example. If the user 106 has taken the pill box 350 out of the home, the pill box 350 may communicate with the central processing center 102 via a Bluetooth enabled smart phone or other device 114 of the user. The Bluetooth module in the pill box 350 may also receive information from the pill box 200, such as alerts, for example. The pill box 350 may also contain a cellular module 410*a* or Wi-Fi module 410*b* (discussed below) in order to directly communicate with the central processing center 102. Other electronic components discussed below may be provided in the pill box 350, as well.

The separated column 208*a* may be secured to the pill box 350 by fitting the tabs 224 fitting into openings, as above, pressure fit, and/or the lid 352 of the pill box, for example. In this example, the left most column and the right most column include tabs 224 but if an interior column were to be removed, the separated column would not have tabs 224. In that case, a pressure fit and/or the lid 354 would be relied upon to maintain the column in the pill box 350. The original tray, which is now 6 columns, may be returned to the original pill box. The one as a pill box 350 may fit in a pocket of a user 106, for example, and is advantageous if the user travels, for example.

In addition, perforating the tray 208 allows for adjustment of the tray to remove one or more wells if a prescription has changed, and a new tray reflecting the new prescription has not been received, for example. Replacement medication may be placed in one or more wells in the grid 216 below the removed wells of the tray 210, if necessary.

Figure 13:
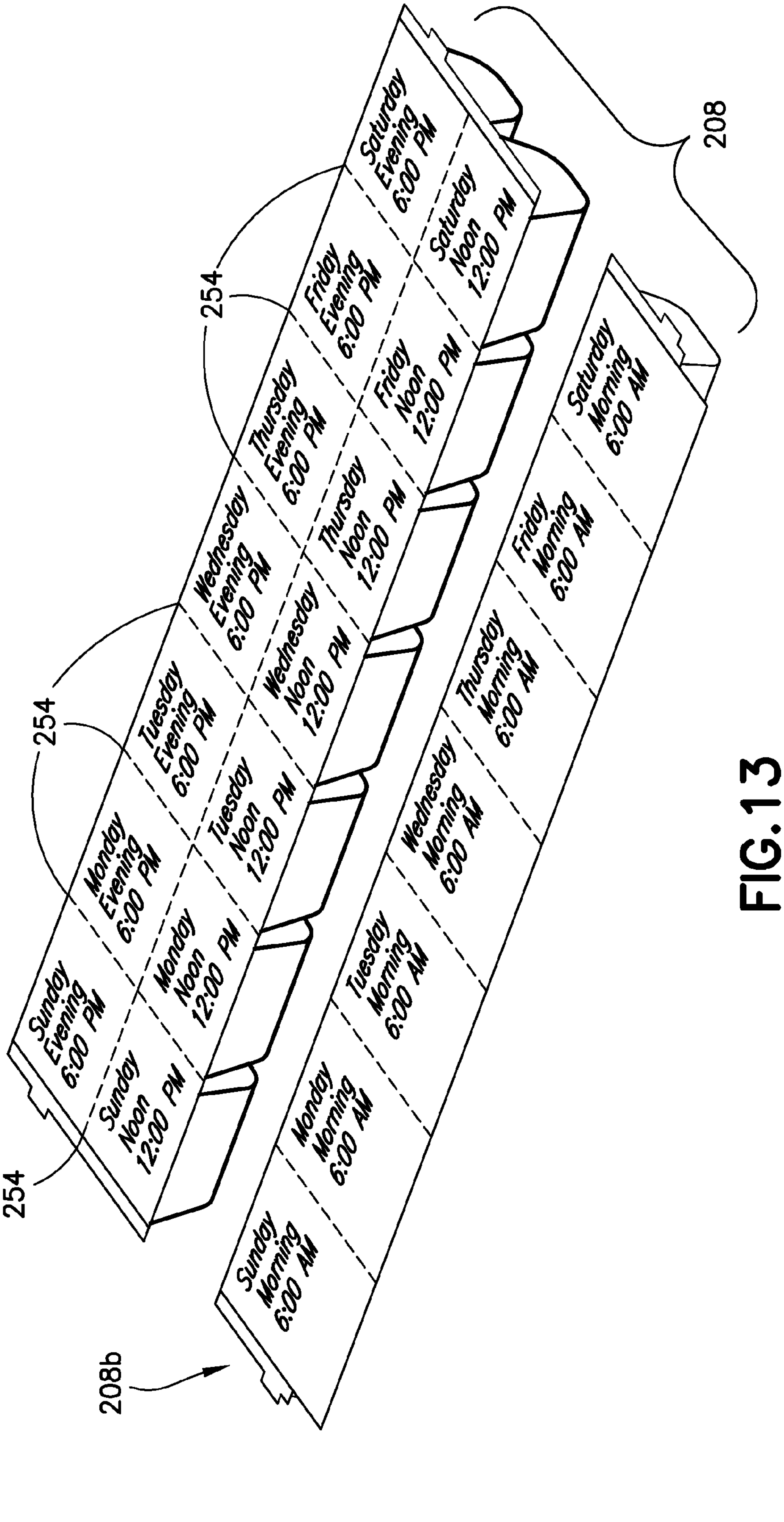
FIG. 13 is a perspective view of the tray of FIG. 12A, showing the bottom row separated from the remainder of the tray, in accordance with an embodiment of the invention.

FIG. 13 is an example of a tray 208 showing the bottom row 208*b* removed because the morning dose has changed, for example. Other rows or individual wells may be removed as needed, for example.

Pill Box Electronics

Figure 14A:
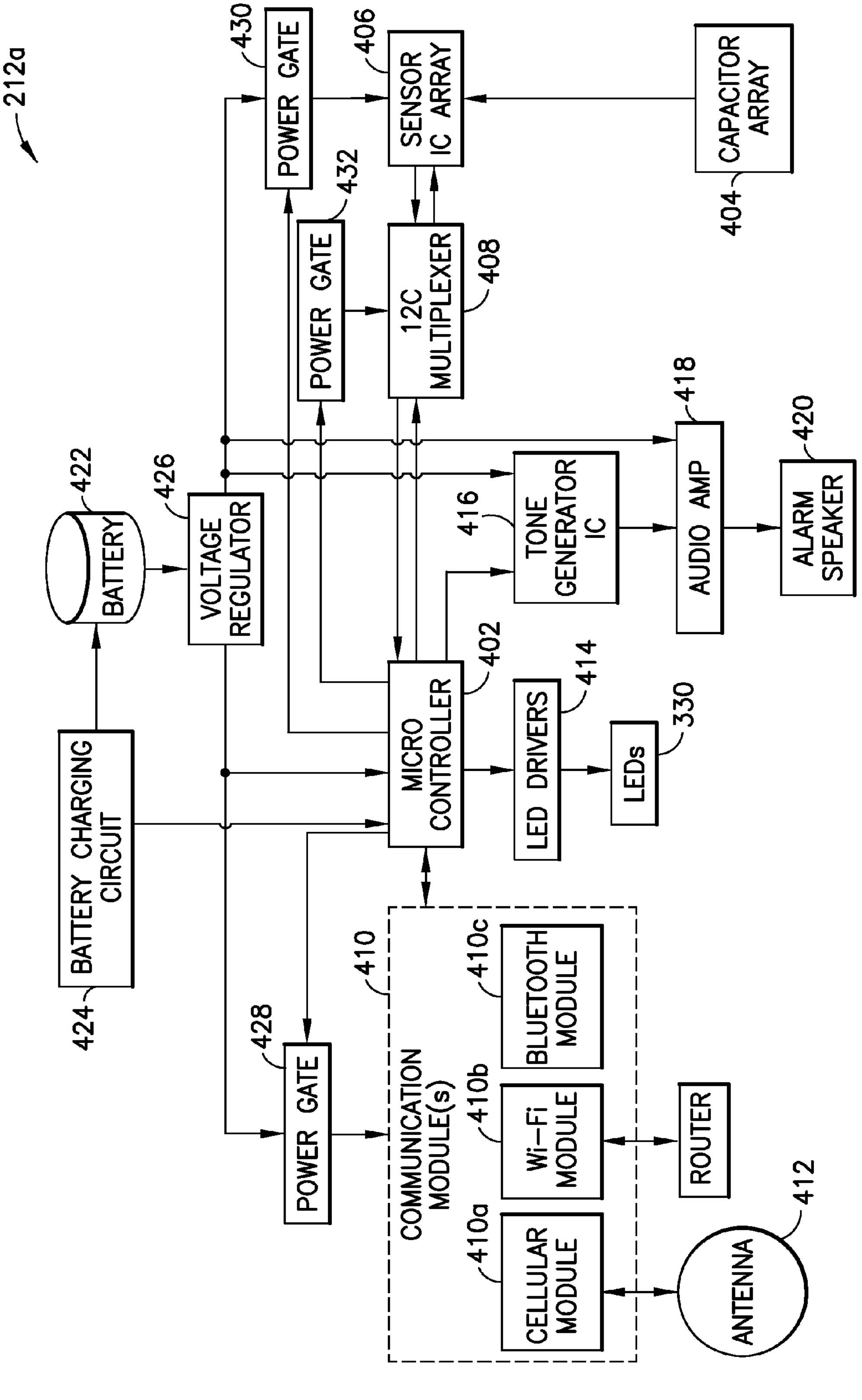
FIGS. 14A-14C are block diagrams of examples of electronics that may be used in the pill boxes described herein, in accordance with the embodiments of the invention.

FIG. 14A is a block diagram of an example of the electronics 212*a* that may be used in the pill boxes 200, 300, and other pill boxes in accordance with embodiments of the invention. The operations of a respective pill box are controlled by a processing device 402, which may be a microcontroller or microprocessor, for example. A microcontroller is shown in FIG. 12A. The main functions of the processing device 402 are to receive digital signals from the other electronic components for processing and to issue commands to the other electronic components to perform various functions. The microcontroller 402 contains processing and control circuitry (registers, clocks, I/O ports, ALU, etc.) to control and receive input from the other circuits in FIG. 12. In particular, the microcontroller 402 processes the sensor data to determine whether pills (or other medication) has been inserted or removed from the pill box, or to put the date in a form for processing by the central processing center 102, for example. To provide the functionality and interact with all the peripherals described herein, in one example the microcontroller 402 would have at least about 80 general purpose input/output pins (GPIO) and be able to perform 32-bit operations, for example. Suitable microcontrollers/microprocessors may be obtained from Atmel Corporation, San Jose, Calif. Texas Instruments, Inc., Dallas, Tex. and Cypress Semiconductor Corporation, San Jose, Calif. ("Cypress"), for example. The programmable system on a chip (PSOC) family of chips from Cypress may be used, for example. A processing device having less capability may be used if less functionality is acceptable. While the processing device 402 of FIG. 12B is identified as microcontroller in FIG. 12A and below, the microcontroller may be a microprocessor or other processing device capable of and configured to perform at least certain of the functions described herein.

The excitation electrodes 280*a*, 280*b*, 280*c* and the input channel electrodes 282*a*-282*u* of FIG. 9, or the capacitance plates 268 in FIG. 7, are part of a capacitance array 404, for example. The capacitor array 404 is electrically coupled to a sensor integrated circuit ("sensor IC") array 406, which may comprise one or more capacitance-to-digital converter ("CDC") chips, for example. The input channel electrodes 282*a*-282*u*, the metal plates 268, and capacitance sensor arrays 404 may be electronically coupled to capacitive input channels of the sensor IC array 406.

The sensor IC array 406 may include one or more integrated circuit chips such as the LC717A00AR 8-channel capacitance to digital converter ("CDC") from ON Semiconductor, Phoenix, Ariz., for example. The sensor IC array 406 may also be an ultra low power capacitance CDC 2-channel AD7150, AD7152, AD7143, and AD7148 from Analog Devices, Inc., Norwood, Mass. ("Analog Devices," for example. Because some CDC chips, such as the Analog Devices chips, communicate with other digital electronics via an inter-integrated circuit ("I2C") interface, an I2C multiplexer 408 is provided between the microcontroller 402 and the sensor IC array 406, in case addresses for the CDC chips need to be reused. The I2C multiplexer may not be needed if other sensor ICs are used. Other interfaces, such as a serial peripheral interface ("SPI"), may also be used between the microcontroller 402 and the one or more sensor IC's in the sensor IC array 406.

The PSOC family of chips from Cypress have analog input pins between which the microcontroller 402 can sense capacitances. In this case, assuming the capacitance sensing has a high enough resolution based on the size and shape of the wells, the estimated range of change in dielectric constant, and the capabilities of the microcontroller 402, for example, the separate sensing IC 406 may not be needed. The appropriate pins of the microcontroller 402 may then be directly connected to the capacitor array 402.

One or more communication modules 410 may be coupled to the microcontroller 402. The communication module 410 may be or include a cellular module 410*a* coupled to an antenna 412, enabling communication with the cellular network 112. As discussed above, the cellular network 112 may provide direct communication with the central processing center 102, or may communicate with the central processing center via the network 108, such as the Internet, for example. Text messages may also be sent by the pill box to user devices 114 through the cellular module 410*a*.

The cellular module 410*a* may comprise a chipset available from Telit Communications, PLC, London, UK, ("Telit") or Kore Telematics, Alpharetta, Ga. ("Kore"), for example. Fully-certified devices, which may include the Telit or Kore chipsets are available from Janus Remote Communication, Aurora, Ill., and Multi-Tech Systems, Inc., Mounds View, Minn., for example. The fully-certified cellular device may be the PCB 240*c*, while chip sets may be supported in 240*b* or another PCB 240*c*, for example.

The microcontroller 402 may interface with the cellular module 410 via a universal asynchronous receiver/transmitter ("UART") serial connection, through which AT commands are issued. Other types of connections between the microcontroller 402 and cellular module 410 may be used where appropriate.

The antenna 412 may be an external antenna, a cable antenna, or a PCB antenna, for example. The antenna 412 may connect to the cellular module 412*a* via U.FL with an RF connector or other interface. The position, geometry, material, and/or other constraints of the antenna 412 may be adjusted to meet certification standards.

Low data rates are anticipated. A 2G 1×RTT CDMA connection may thereafter be adequate. At least one or more of 3G and 4G LTE technologies may also be used.

The communication module(s) 410 may also be or include Wi-Fi module 410*b*. If the communications module 410 includes a Wi-Fi module 412*b*, the microcontroller 402 may communicate with the network 108 via an external wireless router, for example.

The communications module(s) 410 may also include a Bluetooth module 410*c* for communication with other user devices 114 or other pill boxes, for example. The Bluetooth module may also be used to communicate with a personal health hub that may be present in the user's home, as is known in the art. The Bluetooth module 410*c* may also be provided instead of the cellular module 410*a* and Wi-Fi module 410*b*, to lower costs. In this case, the Bluetooth module may communicate with the central processing center 102 via other Bluetooth enabled devices, such as Bluetooth enabled user devices 114 and/or a personal health hub, for example.

As discussed above, the pill box and electronics 212 may also include LEDs 250 on the grid 216 to light up or flash to indicate that pills should be removed from a respective well, or to indicate a low battery, for example. In this example, the LEDs 330 and other LEDs (not shown) are controlled by the microcontroller 402 and may optionally be powered by LED driver circuits 414, which would be connected to the microcontroller by inter-integrated circuit (I2C), serial peripheral interface (SPI), or another interface.

A tone generator IC 416 may be coupled to the microcontroller 402. The tone generator IC 416 feeds into an amplifier 418 that drives a speaker 420. The tone generator IC 416 allows the microcontroller 402 to deliver a range of sounds at appropriate times based on the programming of the microcontroller 402, to remind a user 106 to take their medication, for example. The tone generator IC 416 or other such audio alarm may be used to remind the user 106 to charge the battery, for example. Different tones or number of tones may be used for different types of reminders, for example. The tone generator IC 416 may be used in addition to or instead of the LEDs (not shown) and/or other reminders such as text, email, phone, or other types of reminders. Other sound generation configurations may be used.

The electronics 240*a* are powered by a battery 422. If the battery 422 is rechargeable, then a battery charging circuit 424 may be provided to connect the battery 422 to electrical interfaces for charging. Interfaces for powering the battery charging circuit 424 may include wall sockets, barrel plugs, USB cables, micro-USB, or custom chargers, for example. The battery 422 may be a single cell, such as a AA, AAA, 9-volt, lithium ion, for example. The battery 422 may also comprise multiple cells in series and/or parallel to deliver the amount of power appropriate for the functions described herein. Since the various circuits described in the electronics 212*a* may require specific voltages in order to operate, the battery output may be connected to one or more voltage regulators 426 to supply the appropriate voltage(s) to the respective circuits, as is known in the art. Other sources of power may be used. For example, the pill box may be plugged into household power to power the device.

The microcontroller 402 may also enable the battery charging circuit 424 to charge the battery 422 when the pill box is plugged in. The microcontroller 402 may also be programmed to sleep at preprogrammed times to reduce overall power consumption and improve battery life.

The microcontroller 402 may also control one or more power gates 428, 430, 432, for example, in order to control the power supply to the respective integrated circuits to conserve energy.

Figure 14B:
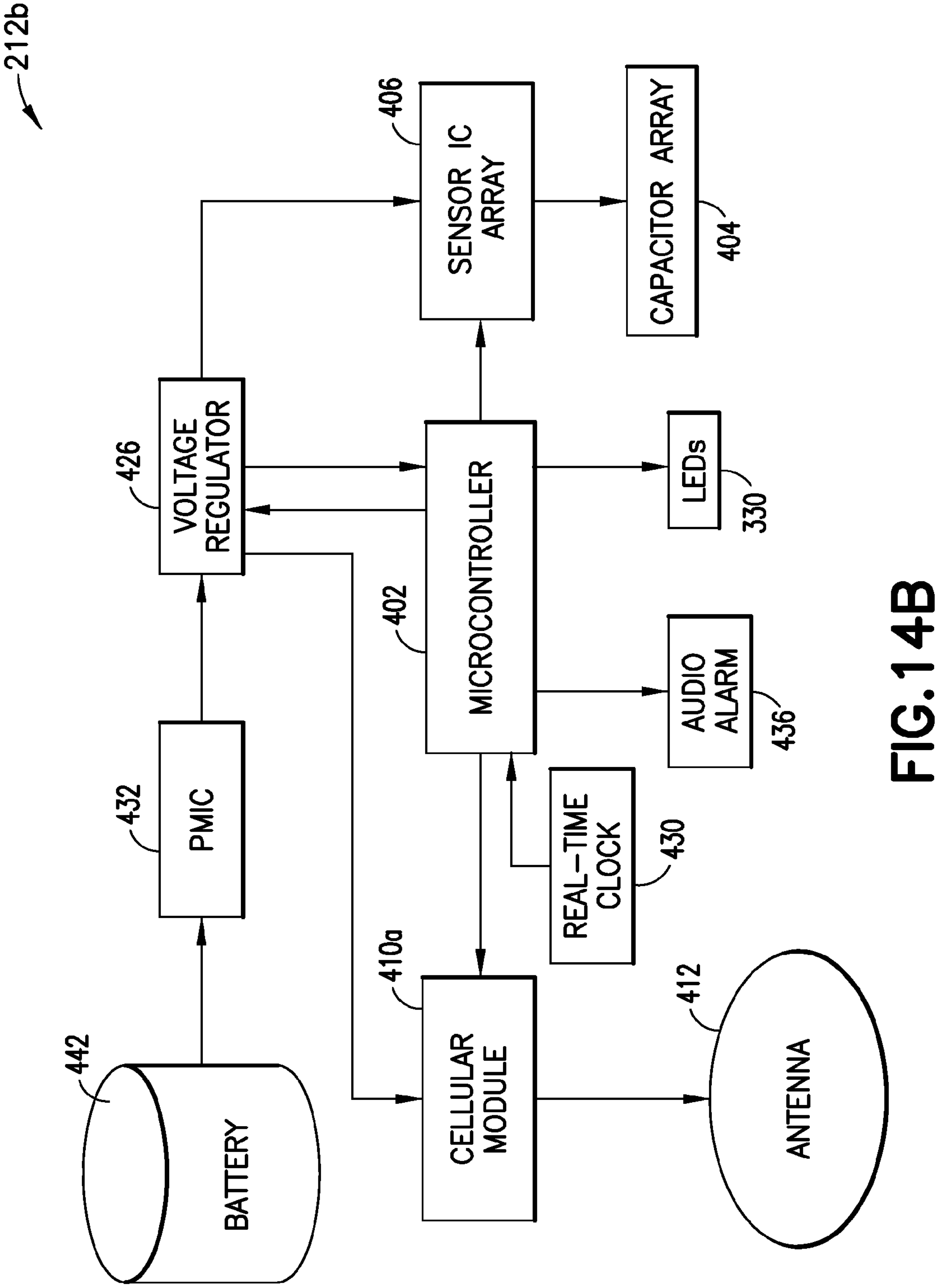

FIG. 14B shows another example of the electronics 240*b*. Elements common to FIG. 12A are commonly numbered in FIG. 12B and the teachings related to the electronics 240*a* are applicable to the electronics 240*b* of FIG. 12B. In this example, the communication module 410 is a cellular module 410*a*, as described above.

In this example, the microcontroller 402 is electronically coupled to a real-time clock 430 in order to appropriately trigger various time-sensitive functions, such as turning on power to the other circuits and monitoring a medication schedule, for example. The microcontroller 402 may also use the real-time dock 430 to determine when to start sending data collected from the capacitance array 404 to the central processing system 102 via the cellular module 412*a* and the antenna 414.

The microcontroller 402 may go into a to p ode when activity is not expected, such as between scheduled sensing and transmission times, for example. The microcontroller 402 may be woken up by an asynchronous signal from a peripheral, such as the accelerometer 470*b* or the sensor IC array 406, for example. The microcontroller 402 may also shut down selected peripheral circuits until they are needed, to save power.

In the example of FIG. 14B, the battery 442 and the voltage regulator 426 are electronically coupled to a power management integrated circuit ("PMIC") 432, which interfaces with a charging station (not shown in this view), such as the charging circuit 424 in FIG. 12A. The PMIC 432 may also control the voltage at the input of the voltage regulator 426. The microcontroller 402 may control the PMIC 432 to disable one or more power paths when these power paths are not being used. The microcontroller 402 may receive data about the status of the battery 442 via the PMIC 432, which may then be displayed to the user 106 via one or more of the LEDs (not shown), for example.

Instead of the CDC chips in the sensor IC array 406 of FIG. 14A, in FIG. 14B the sensor IC array 404 may comprise grid capacitance sensing ICs to detect the change in capacitance due to removal of one or more pills from a respective well. Suitable grid capacitance sensing ICs are available from Atmel Corporation, San Jose, Calif. and Broadcom Corporation, Irvine, Calif., for example. One or more ICs may be provided, depending on the number of channels needed. An interface (not shown) may be provided to select among the different channels.

In FIG. 14B, the microcontroller 402 is connected to the LEDs 330 in the without the LED drivers circuits 414, of FIG. 12A. The audio alarm circuit 436 in this example comprises an amplifier and speaker.

Figure 14C:
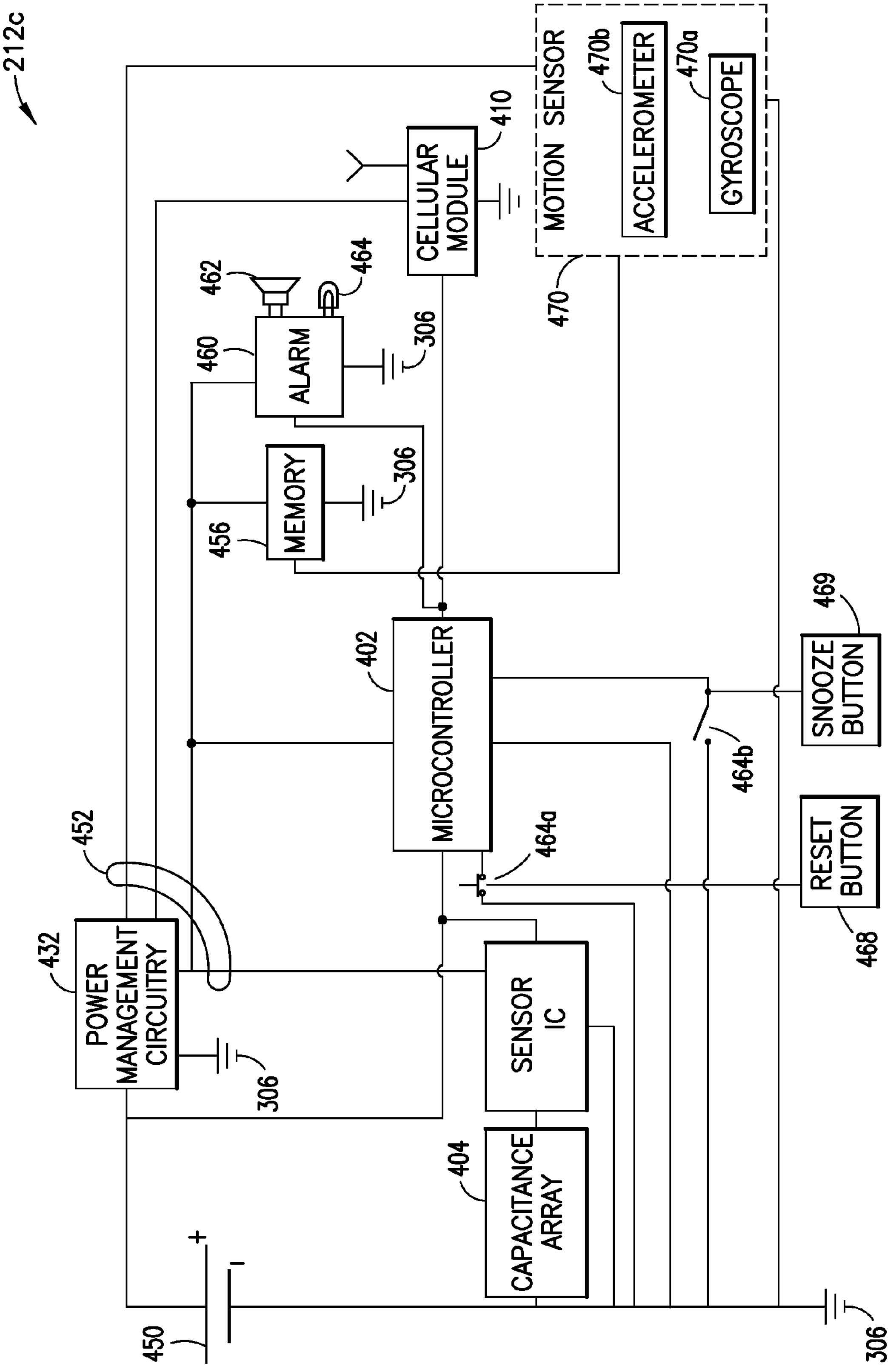

FIG. 14C is another block diagram of an example of electronics 240*c* that may be present in a pill box. Elements common to FIGS. 12A and 12B are commonly numbered and the teachings related to the electronics 240*a* and 240*b* of FIGS. 12A and 12B are applicable to the electronics 240*c* of FIG. 12C. The electronics 240*c* may be powered by a power supply 450, which may be an alkaline, lithium ion, lithium iron phosphate, or other type of battery, for example. Alternatively, the power supply 250 may be powered by other types of power sources, such as supercapacitors or solar panels, or wall power, for example. These other power sources may also be used in the electronics 240*a*, 240*b*. The power supply 250 is connected to a common ground 306, as are the other components of the electronics 240, as noted below.

The power management circuit ("PMIC") 432 may be configured in various ways depending on the specifications of the power supply 450 and the power demands of the other circuitry. The PMIC 432 may include one or more buck/boost converters, one or more voltage regulators. If the power supply 450 comprises a battery, one or more battery charging IC's that connect the battery to the electrical mains or a computer for USB charging, for example, may also be part of the PMIC. The power management circuit 432 may also include passive components to implement a single-ended primary-inductor converter (SEPIC) or resistors in feedback to control a regulated voltage value, for example.

A power bus 452 extends to the circuits of the electronics 240*c* (except for the electrodes capacitance array 404). The power bus 452 may be implemented in a power plane in a PCB, for example. The power bus 452 may also contain multiple independent power paths that are set to different voltages (e.g. 3.3V for some components, 5V for others).

The microcontroller 402 may be coupled (through a general-purpose input/output GPIO) or asynchronous interrupt pin, for example) to one or more switches, such as switch 454*a* and 454*b*. The switch 454*a* may be coupled to a reset button 468 on the exterior of the pill box 104 to reset the pill box. A switch 464*b* may be coupled to a snooze button 469 on the exterior of the pill box, to snooze sensing and the sending of reminders, for example. Other switches may be provided to be coupled to other buttons on the exterior of the pill box 104 to transmit an alert, for example. A switch may also be provided to flash lights (LEDs) to indicate that pill box 104 is still working, for example.

During operation, the microcontroller 402 periodically commands the sensor IC array to poll the capacitance values at individual wells, in accordance with a sensing schedule, discussed further below. The microcontroller 402 may retrieve the digital data corresponding to the capacitance values from the sensor IC array 406, 434 (from FIGS. 12A, 12B) and store them in a memory 456. The memory 456 may be separate from or part of the microcontroller 402. For example, memory 456 may form a continuous storage structure wherein after the microcontroller 402 runs out of internal data memory, the microcontroller stores data in external memory. The memory 456 may comprise RAM, EEPROM, FLASH, nonvolatile NOR, nonvolatile NAND, or other memory technologies known in the art. The memory 456 may also be used to store data other than sensing data. The memory 456 may be connected to the microcontroller 402 through SPI or other interfaces.

The pill box 104 may include an alarm circuit 460 so that users 106 without regular access to the Internet, or who simply prefer not to receive phone/email outreach, may be alerted by the pill box directly. For example, the pill box may include a speaker 462 and/or lights 464, such as one or more LEDs, to alert the users. The speaker 462 and the lights 464 are shown connected to the alarm circuit 320 to indicate functional similarity, but may or may not operate in synchronization with each other under the control of the microcontroller 402 or any other element of the system.

The electronics 212*c* in this example includes one or more motion sensors 470, such as an accelerometer 470*a* and/or a gyroscope 470*b*, to detect changes in orientation of the pill box. For example, instead of reaching into a well of a pill box, a user 106 may turn over the pill box so that the pills in a respective well drop into the user's hand, for example. In this case, the role of the initial drop in capacitance may be diminished when determining when pills are removed from the box. In order to detect this type of pill dispensing, the electronics 212 may include one or more motion sensors, such as accelerometers, gyroscopes, and/or other sensors capable of detecting if the box is flipped over to drop pills out of a well. In addition, the capacitances sensed may be effected by movement of the pill box. The output of the motion sensors 470 may be used to adjust the capacitance data, if necessary, as discussed further below.

In lieu of or in addition to capacitance sensing, other sensing technologies may be used, such as weight sensing, pressure sensing or chemical sensing to detect the presence of pills in wells 210, 218, or optical sensing (LED-photodiode pair, for instance) to sense when pills in wells 210, 218 break an optical path, for example.

Use and Operation of the System

As discussed above, users 106 may load a week's worth of medications, such as pills, into respective wells 210 of the tray 208 or into wells 218 of the grid 216, for example, of a pill box 4. The wells are filled based on the times of the day that particular medications are to be taken.

A user 106 may also receive or pick up preloaded trays 208 for insertion into the pill box 104. As is known in the art, pharmacies and other facilities are outfitted with machines to automatically sort and move pills, and these machines may be used to place the pills into the trays. For example, a machine in the pharmacy or other facility may be connected to a computer and controlled by a program interfacing with the central processing center 102 and/or the microcontroller 402 of the pill box, or the user devices 114. An App may pass data related to a patient's medication regimen to the computer. The computer can then map the day-of-week and time-of-day data related to the user's medication regimen to the compartments in an insertable tray 208 to be filled. The computer may also map the medication data related to the user's medication regimen to one or more reservoirs of pills in the machine. With these mappings in place, the computer can issue digital commands to the machine to transfer pills from the reservoir/s to the wells of the replaceable tray 208 according to the medication schedule. The tray may then be covered by a seal 252 (FIG. 7) before being shipped to the user 106 by the pharmacy 208 or another facility.

As described above, in one example, the pill box 104 is able to sense the presence or absence of stored pills and other medications in wells, by detecting the change in capacitance caused by the presence or absence of the pills in compartments of the pill box by capacitance sensors. In one example, the removal of pills or other medication decreases the capacitance sensed by the capacitance sensors 283.

When a person reaches into a well coupled to capacitive sensors, it is sensed that the presence of the finger of the user 106 causes an initial drop in the capacitance detected by the sensors because the finger acts as a ground. This observed drop can be identified by the microcontroller 402 or by the central processing system 102, for example, in order to better time the loading or removal of pills from wells in the pill box and distinguish such actions from other events that would cause changes in detected capacitance.

If there is a sudden drop in the sensed capacitance in a given well, the microcontroller 402 may determine that pills have been removed from the well. The algorithms maintaining and updating the variables associated with these capacitance quantities may be run on the microcontroller 402 receiving inputs from the sensor IC array. The sensor IC array 406 may maintain in registers a running average of the capacitance in each well to mitigate the effects of noise on the sensed capacitance values. The array 406 may also rapidly measure the actual value of the capacitance in the wells.

The shape of the data sensed by the capacitance sensors 283 before and after pills are removed from a well may be a step function between a first capacitance value C1 sensed when pills are in a well and a second capacitance value C2 when pills are removed from the well. As discussed above, the capacitance decreases when pills are removed. The capacitance when the pills are removed is typically not zero (0) because of the dielectric of the materials of the tray 208 and/or the grid 216, the air, etc.

The step function may be analyzed by various techniques to determine whether the capacitance has dropped enough to be due to pill removal, to a desired level of certainty. For example, thresholds may be applied to the sensed capacitance values. If the difference between C1 and C2 is greater than or equal to a threshold, it may be concluded that pills have been removed from a respective well.

More complex analysis known in the art may be conducted such as applying a Student's t-test to a window sliding across a time series data of the sensed data, or applying a nonlinear filter, such as a median filter, to the signal, for example. The derivative of a graph of the sensed signals around a suspected step may be compared to the derivatives on both sides of the suspected step to confirm that a step has taken place, as is also known in the art.

In another example, the time series capacitance data may be filtered by statistical and or other methods, such as filtering for movement of the pill box 104 based on data from a motion sensor 470, for example, to remove peaks and to smooth fluctuations. The average or other statistical measure of the data before a suspected step may then be compared to the average or other statistical measure of the data after the peak. If the value after the peak is less than the value before the peak, or sufficiently less based on comparison to a threshold, then it may be determined that pills have been removed from the well.

Other signatures of a person interacting with the box to retrieve pills may be analyzed. For example, if a user rotates a pill box 104 to allow pills to fall out of a well, the motion sensor(s) 470 may output data indicative of an acceleration pattern due to the change in orientation of the pill box. Then the capacitance sensors will indicate that pills are no longer present in a respective well. A capacitive drop associated with a person's finger, etc., may be used instead of or in addition to the detected change in capacitance to determine whether and when the user 106 is retrieving the pills. For example, if the capacitances are being sensed often enough, the presence of a user's finger in a well may be sensed. The accelerometer 470*b* may detect acceleration in multiple axes.

If there is a sudden rise in the sensed capacitance of a given well with respect to the running average capacitance in the same well, the microcontroller 402 may determine that pills or a tray 208 have been loaded into the well. For example, it may be sensed that the user 106 is adding extra pills to one or more wells that were not issued with the tray 208 or filed by the pharmacy 126.

Instead of interpreting pill loading, pill removal, or other events by the microcontroller 402, the microcontroller may perform data conversion on the received capacitance data and create packets of data to be issued to the central processing center 102. Alternatively, the microcontroller 402 may perform coarse filtering on the received capacitance data and send the data to the central processing system 102 for further analysis if the received capacitance value for a given well varies a sufficient amount with respect to a previously stored value for that compartment or the running average of that compartment. Data packets may be sent to the central processing center 102. As discussed above, the microcontroller may send data packets via the cellular module 410*a* to the cellular network 112 and the Internet 108, or directly through the cell to network. The microcontroller 402 may also send data packets to the control processing center 102 via the Wi-Fi module 410*b*, and/or the network 108 through a router, for example. The data may be issued constantly or in brief time intervals related to the time at which the user 106 is supposed to/expected to load or remove the pills.

If the user 106 has not taken their pills within a fixed or adjustable window of time near the prescribed time according to the medication schedule, the central processing center 102 may issue a reminder via the one or more selected modes of communication, such as by text message, automated phone call, email, fax, etc., to the user 106. In one example, the central processing center 102 may also inform some or all of the members of the care community 124 that a respective medication was not taken on time. Text messages may be sent via the cellular network 112 or Twilio server, for example. The user 106 may also be able to access at least some of the information made available to the care community through the web and/or mobile application.

The central processing center 102 may time the reminder to improve the likelihood that it is received/viewed by the user 106 soon enough so that the patient can take the medications on time. The central processing center 102 may ping or otherwise contact the user device 164, such as a smart phone, tablet, or other device, as appropriate, and receive the corresponding echo in order to assess the latency in communication with the device in order to properly time the issuance of the reminder, for example.

In some cases, it is important to monitor a user's access of the pill box at all hours of the day. This requirement may trade off with the need to sense the presence or absence of pills sparingly in order to save power consumption. Normally, the microcontroller 402 may sense pills at a certain average frequency, with a high rate of sensing concentrated around the desired dosing times (for instance, morning, noon, and night). However, a patient (user 100) may try to access pills at an odd hour. Since accessing the pills may require physically disturbing pill box 102, the microcontroller 402 may employ the motion sensor 470, to detect this disturbance. If the motion sensor 460 detects motion, it may trigger an asynchronous interrupt to wake up the microcontroller 402, which will then triggers sensing via the capacitance array 404. Sensing schedules are discussed further below.

If a user 106 is carrying the pill box, the pills may jostle around inside the compartments. If the system is sensing capacitance in the wells during that time, the distortions and noise caused by the jostling may result in erroneous capacitance readings. The motion sensor 470, such as an accelerometer 470*b*, may detect this motion and provide a signal to the microcontroller 402, which may process the accelerometer data or transmit the data to the central processing center 102 for analysis by the machine server 108, for example. In some embodiments, the microcontroller 402 or the machine server 118 may apply mathematical methods known in the art to both the accelerometer and capacitance sensing data to correct for such jostling, as discussed further below. The motion sensor(s) 470 may operate in a low power mode at a low sample rate, to conserve power. The sampling rate may be increased by the microcontroller 402 during sensing.

As discussed above, pills may be manually loaded into the wells of the grid 216. In this case, the central processing system 102 and/or the user devices 114 App in communication with the pill box may forecast refill rates for respective medications and alert the user 106, members of the care community, and/or other third parties such as pharmacies that refill may be required.

For example, suppose a user 106 receives a pill bottle from a pharmacy 126 containing 90 pills of a certain medication, of which the patient is supposed to take 6 per week for 15 weeks before the pills run out. In accordance with an embodiment of the invention, the microcontroller 402 tracks when certain medications have been taken. Suppose that the microcontroller 402 or the central processing center 102 computes after 7 (or some other number) of weeks, that, on average, the patient has consumed only 3 pills per week. In addition to normal reminders, the central processing center 102 may inform the pharmacy 126 that at this rate, the user will require a refill after an additional 16 weeks. The pharmacy 126, or member of the care community 124, may then take action to check up on the user 102 to encourage the patient to take the pills at the appropriate frequency.

The central processing system 102 may communicate with the patient via a web application, a mobile application, and/or a text message/notification service. The central processing system may also communicate with members of a care community via the web application and/or the mobile application. The central processing system 102 may also communicate with members of the care community 124 via the text messages/notification service. For example, using at least some of this information, along with communications from the pill box, the central processing system can determine whether or not user have taken their pills on time. If a respective user has taken the required pills on time, then central processing system 102 may do nothing, or it may send a message to the user 106 (by issuing a congratulatory text, for example) and inform members of a care community 124 via a mobile and/or web application on their respective devices that a respective medication has been taken on time.

The machine server 118 of the central processing center 102 may index the data related to a specific pill box 104 according to a device ID associated with pill box 104. The device ID may be provided to the machine server 118 during registration of the user 106 and pill box 104, for example. The device ID may be or may contain the factory-installed production signature of the microcontroller 402 or other processing device inside the pill box 104. The device ID may also be or may also include a phone number or static IP address associated with a communications module 410 in the pill box 104. By associating the data with the pill box 104, the machine server 118 may avoid storing or exchanging data, including personal health information, related to respective users 106 or anyone else such as members of the care community 124, for example.

The machine server 118 may retain a list of device IDs that are authorized to participate in the network environment in order to detect under-participation associated with a given device ID, or participation by an unauthorized party. The machine server 118 may store this information in database server 120. More details regarding the machine server 118 activities is described below.

The front-end server 122 may store current medication regimens in the database 123, for example. The front-end server 122 may also issue the reminders, such as automated reminders (phone calls, emails, text messages, etc.) to the user 106 if the machine server 118 detects that pills from a certain well of pill box 104 have not been removed at a scheduled time. The front-end server 122 or the database 123 may map respective users 102 with device IDs of respective pill boxes 102. In one example, the machine server 118 may trigger the front-end server 122 to issue a reminder to user 100 to take his or her medication.

The machine server 118 may also trigger the front-end server 122 to issue a warning to the user 106 and optionally one or more members of the care community 124 if pills have been removed from the wrong well. This is important because it indicates that user 106 has taken pills at the wrong time. The front-end server 122 may also host a mobile application to display medication adherence data to the user 102 via a user device 114, to insurance company case managers, to hospital care coordinators, other members of the care community 124, and/or other authorized and relevant parties. Such parties may use this data to reach out to the user 102 to remind or encourage the user 102 to take their medications as directed.

Real-time medical data, such as blood sugar or blood pressure, from devices such as wearable devises, may also be integrated with the medication adherence data collected and recorded in the front-end server 112 or an in-home personal health hub or a third party, such as a doctor, nurse, or other medical provider, to provide even more granular information regarding the patient's health. For example, blood sugar and/or blood pressure levels may be analyzed before and after blood sugar and/or blood pressure medication is taken as well as throughout the day. Health care providers may then learn the efficiency of the respective mediation and whether the medication needs to be changed. The in-home medication hub may be configured to communicate with the central processing system 102.

Figure 15A:
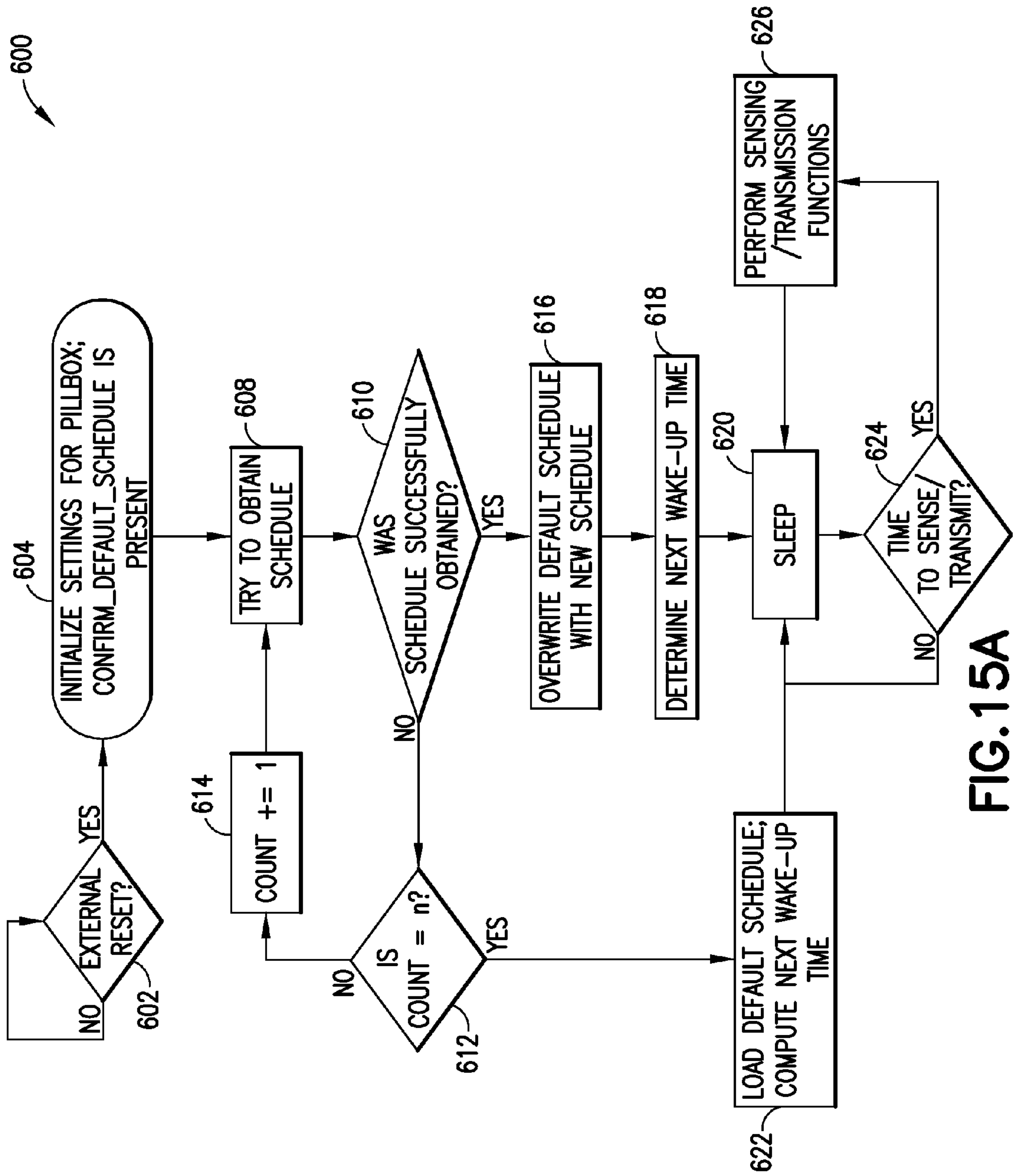
FIG. 15A-15C are flow charts of an example of the operation of the microcontroller of a pill box, in accordance with an embodiment of the invention.

FIG. 15A is a flow chart 600 of an example of the operation of the microcontroller 402 of a pill box 102, in accordance with an embodiment of the invention. If the pill box 104 is not responsive, for example, the microcontroller 402 may be reset externally by a user 106 for example, via the reset button 468, in Step 602. If the reset button 468 is activated by the user 106, various settings for the pill box (audio/visual alarms enabled, LED colors selected for notifications (if present), etc.) are initialized to default settings. These settings may later be toggled manually on the pill box 104 by a user 106, or wirelessly, via communications between machine server 118 to the pill box 102, for example.

It is also confirmed that a default medication schedule is present in Step 604. The default medication schedule for the user 106 may be programmed directly into the memory of the microcontroller 402 or into the memory 422. The default schedule may be programmed into the firmware code of the microcontroller 402, for example. If the communication module 410, such as the cellular module 410*a* is out of range for receiving a wireless signal, if there is no Internet or other network access, or if a new schedule has not been received, the default medication schedule allows the pill box to operate until the pill box 104 has returned within signal range or otherwise received an updated medication schedule. The default medication schedule may be based on an assumption that at least one pill is to be taken at the different times of the day, such as morning, noon, and evening, in this example.

The default medication schedule may be overwritten by medication schedules provided by the central processing center 102 via one or more networks (such as the network 108 and/or the cellular network 112, for example). In Step 608, the microcontroller 402 tries to retrieve this correct medication schedule from the central processing center 102. The microcontroller 402 attempts to retrieve this schedule a predetermined number of times "n" in Steps 610, 612, and 614. At any point during this iteration, if the microcontroller 402 has successfully retrieved the correct medication schedule, then the microcontroller overwrites the default medication schedule with the new medication schedule in Step 616, and computes the next time to wake-up time for sensing and transmission in Step 618.

After computing the wake-up time, the microcontroller 402 proceeds to Sleep in Step 620. If the microcontroller 402 performs the iteration n times without retrieving a new schedule (due to poor signal reception, down server, etc.), then the microcontroller 402 proceeds from Step 612 to Step 622, to load the default medication schedule into volatile memory, such as the memory 456, computes the next time to wake up (as in Step 618), and proceeds to Sleep in Step 620. The volatile memory may be part of the microcontroller 402 or may be a separate device, such as the memory 442.

During Sleep, the microcontroller 402 performs minimal processing (in some examples, with the aid of a real-time clock 430) in Step 624 to determine if it is time to wake-up and begin sensing or transmission processes. If it is determined in Step 624 that it is not time to sense/transmit in Step 624, the microcontroller 402 returns to Step 620. Step 624 is described in more detail in FIG. 14. If it is determined that it is time to sense/transmit, then the microcontroller 402 proceeds to Step 626. Step 626 is described in more detail in FIG. 15B.

Figure 15B:
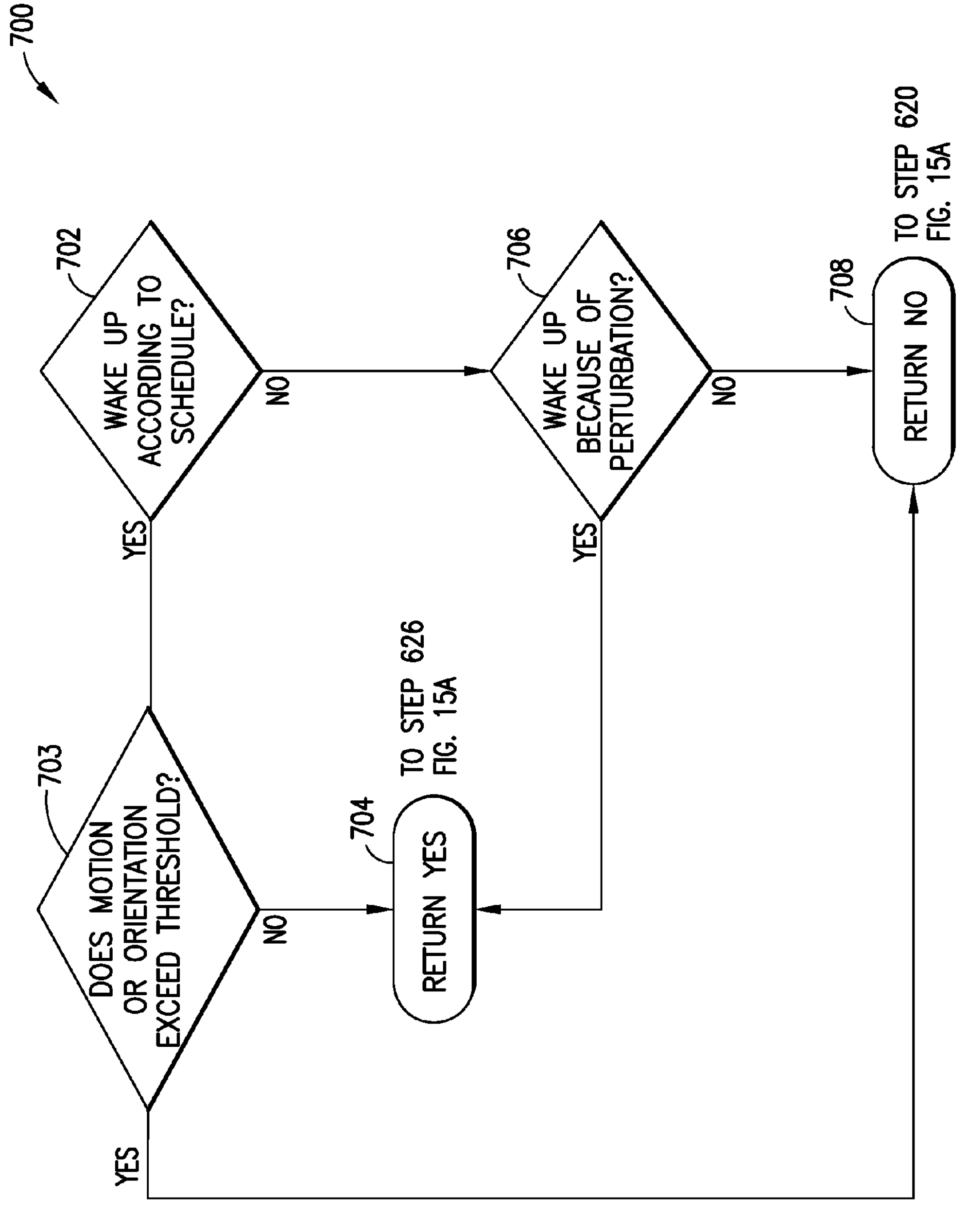

FIG. 15B is a flowchart 700 of an example of the operation of the microcontroller 402 during Step 624 in FIG. 13. In Step 702, the microcontroller 402 checks (by polling the real-time clock 430, for example) whether, according to the wake-up time determined obtained in Step 618 in FIG. 13, the time to begin sensing or transmission has been reached. It may be determined whether a sensing time has been reached by comparing the current time to the determined wake-up time according to the stored medication schedule to determine how much time there is from the current time to the next scheduled time. Other methods for determine a time to wake-up may be used. For example, the actual time may be received from the cellular network 112. In another example, the pill box is configured to receive a time input from the user 106 through buttons on the pill box. A display may be provided on the pill box to show a current time, a time to the next dose, and/or the time of the next dose, for example.

If there is less than a threshold amount of time to the next scheduled time, the microcontroller 402 proceeds to Step 703 to determine whether data from the motion sensor 470 indicates that the movement or orientation of the pill box 104 exceeds a threshold. If Yes, then such movement, etc., could interfere with sensing. The microcontroller 402 then returns No in Step 708, returning to Sleep in Step 620 of FIG. 15A. This acts to delay sensing until the pill box is in a more conducive conditions.

If No, the microcontroller 402 returns Yes in Step 704, proceeding to Step 626 of FIG. 15A to perform sensing and transmission functions.

If the time to wake-up has not been reached (No in Step 702), the microcontroller 402 proceeds to Step 706 to check whether the pill box 104 has been perturbed. This perturbation may result from an asynchronous interrupt to the microcontroller 402 from a motion sensor 470, such as an accelerometer 470*b* and/or or other motion sensors, such as a gyroscope 470*a* or from the capacitance sensing IC 406 for example. As explained above, the perturbation may occur if the user 106 is trying to access pills 502 at a time not defined by their prescribed medication schedule, for example. The perturbation may also occur if the user 106 drops the pill box 104 or handles the pill box to move it, travel with it, etc. The microcontroller 402 determines whether the perturbation signals from the motion sensor(s) 470 and/or capacitive sensors, for example, is indicative of pill removal or some other event by comparing the signals to a threshold or window, for example.

If it is determined the perturbation relates to pill sensing and the microcontroller 402 should wake-up, then the microcontroller 402 proceeds to Step 704 to begin sensing and transmitting data in Step 626 of FIG. 15A. If the perturbation is not indicative of pill removal "No" in Step 708, then the microcontroller 402, returns to a Sleep state to save power, in Step 620 of FIG. 13.

Figure 15C:
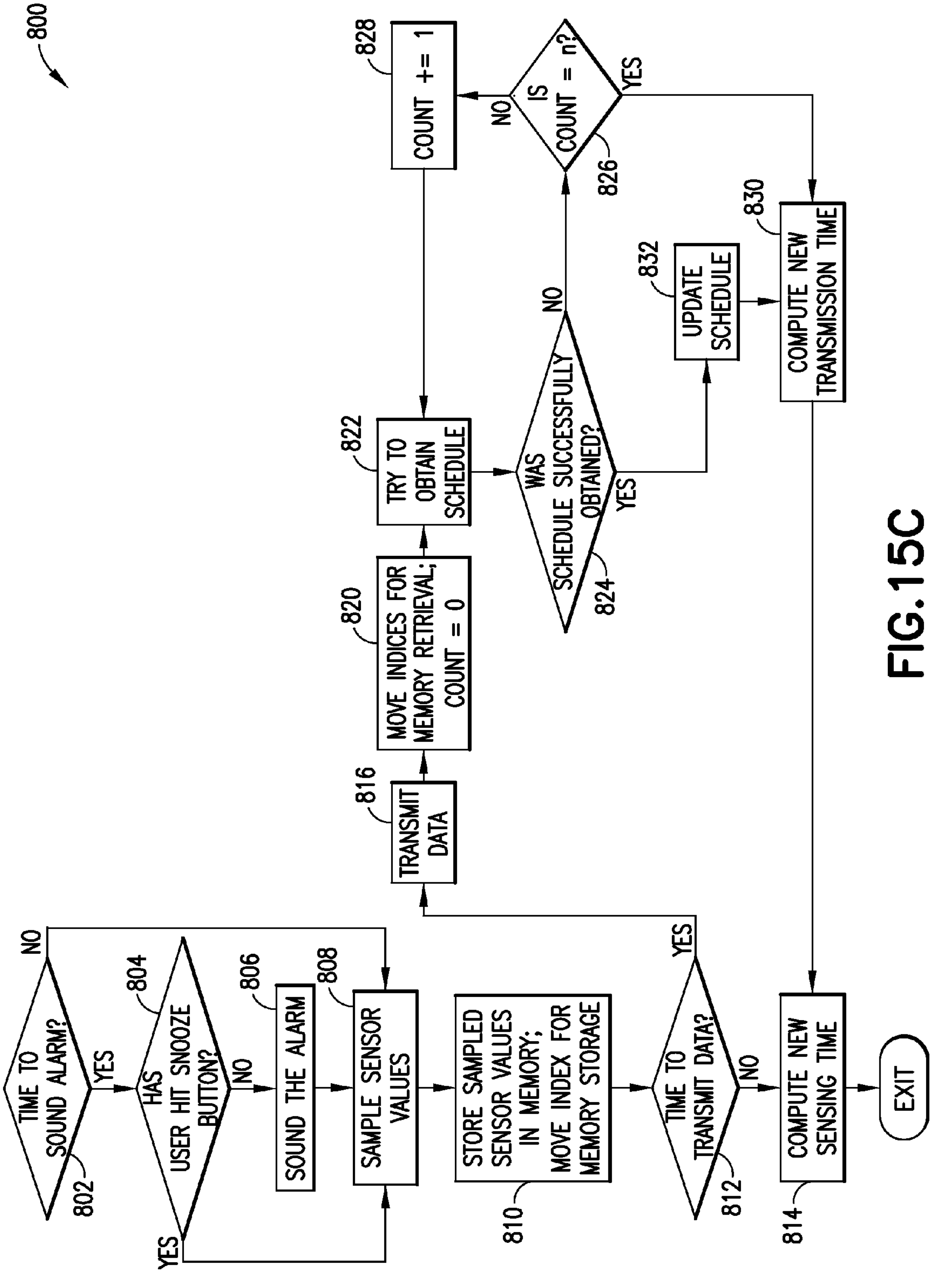

FIG. 15C is a flowchart 800 of an example of the operation of the microcontroller 402 during Step 626 of FIG. 15A, where sensing and transmission functions are performed, in accordance with an embodiment of the invention. In Step 802, the microcontroller 402 determines whether it is time to sound the alarm 436 because a user 106 has not taken their medication at their prescribed time or within the prescribed window. In this example, the alarm 436 is sounded if the microcontroller 402 has not been informed by the machine server 118 that the dose has been taken when it should have. The alarm 436 may comprise various combinations of flashing lights and/or sounds, for example. If Yes, then the microcontroller 402 checks whether or not the user 106 has engaged a snooze button 454, in FIG. 7C, for example. The time to sound the alarm in Step 802, and the check for whether the snooze button in Step 804 has been engaged, may occur many times around a single dosing time period (Monday morning, Tuesday evening, etc.). This time may also be customized by or on behalf of the user 106 by setting the time period with the central processing center 102 during registration or at other times. This information may be stored by the front-end server 112, and then transmitted to the pill box 104*by* the machine server 118 via the network 108 and/or the cellular network 112, for example. If it is time to sound the alarm and the user 106 has not hit the snooze button, the microcontroller 402 sounds the alarm in Step 806, and then proceeds to Step 808 to sample sensor values.

If it is not time to sound the alarm 436 (No in Step 802), or if the user 106 has hit the snooze button 454 in Step 804 (Yes in Step 804), the microcontroller 402 proceeds to Step 808 without sounding the alarm, to sample sensor values.

In one example, the microcontroller 402 samples sensor values in Step 810 by instructing the sensor IC array 406 to excite an appropriate excitation electrode 280*a*-280*c*, to measure the capacitance coupling between the excited excitation electrodes and respective input channel electrodes 282*a*-282*u* in the capacitance sensor array 404. All input channel electrodes 280*a*-280*c* may be sampled, or only a subset of the input channel electrodes, such as only the electrodes sensing the well for the current day and time. In another example, the electrodes for the respective current well and wells adjacent to the current well are sampled to also detect whether pills were removed from the wrong well, for example. Other components, such as the accelerometer 470 and/or the battery 442 may also be sampled at this or other times. The microcontroller then polls the sensor IC array 406 for the sensed data and stores the data in memory.

In Step 810, the microcontroller 402 pushes the polled data to its internal memory, to the memory 456, or other memory. The microcontroller 402 may also move an index corresponding to the location of the last stored data in the memory, thereby storing sensing data sequentially according to the time at which the data was sensed.

In Step 812, the microcontroller 402 determines whether or not it is time to transmit data to the central processing center 102. Data is transmitted in accordance with the medication schedule. Transmission may take place after multiple sensing cycles to save power. A transmission schedule may be added to the medication schedule sent to the pill box 104 by the central processing center 102 or may be provided separately by the central processing center. However, transmission may take place frequently enough to avoid sending a reminder when pills have been removed from a well. If it is time to transmit the polled data, the microcontroller 402 transmits the data in Step 816. The microcontroller 402 may send the data to the central processing center 102 via the cellular module 410*a* to the cellular network 112 and the network 108, such as the Internet, or directly via the cellular network. Alternatively the data may be sent by the Wi-Fi module 410*b* via the network 108, instead. To save power, the data may be sent at only a fraction of the frequency at which Steps 802 through 810 are performed. The sent data is received by the machine server 118 of the central processing center 102.

If it is not time to transmit the polled data, the microcontroller 402 proceeds to Step 814 to compute the next time to wake-up, and then exits in Step 816 to return to a Sleep state, in the Step 620 of FIG. 13.

After transmitting the data in Step 816, the microcontroller 402 moves an index corresponding to the address of the last sensing data that was transmitted to the central processing center 102, in Step 820. The microcontroller 402 may require a handshake from the machine server 118 to change the index. The index is moved from the last address to which the index was set to the last index set in Step 810. A variable ("Count") corresponding to the number of times the system has attempted to wirelessly retrieve the schedule is set to 0, similar to Step 606 of FIG. 13.

The microcontroller 402 attempts to retrieve the current medication schedule of the user 106 from the central processing center 102, by iterating Steps 822, 824, 826, and 828, within a similar manner as described in Steps 608, 610, 612, and 614 of FIG. 13, for example. If a new schedule is obtained, the stored schedule is updated in Step 830 by replacing the current stored schedule by the new schedule.

Whether or not the microcontroller 402 obtains the schedule (Yes in Step 824) or retains and acts in accordance with the previous schedule, the system proceeds to Step 832 to compute the new transmit time and then computes a new sensing time in accordance with the medication schedule, before proceeding to Step 814.

Figure 16A:
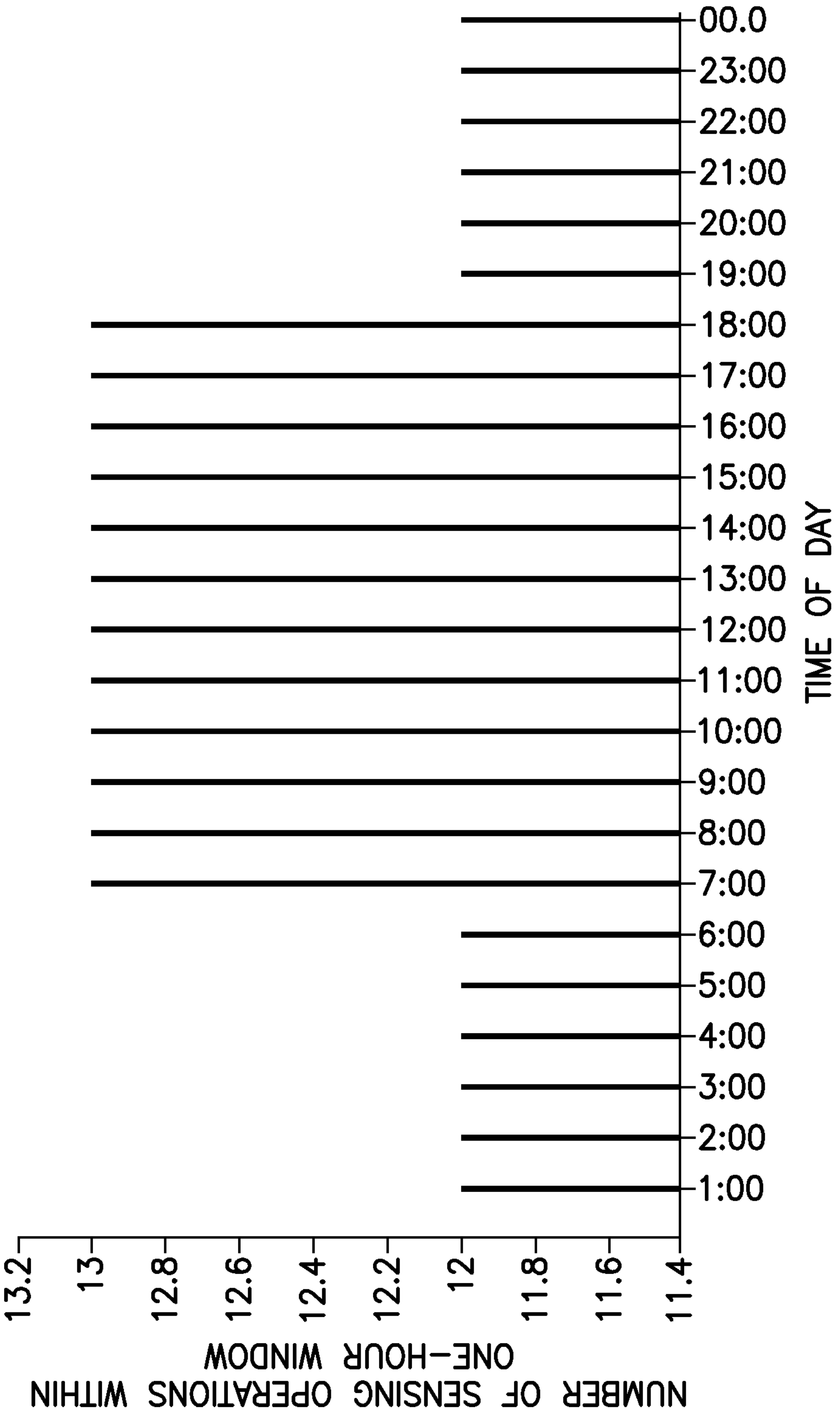
FIGS. 16A-16B are examples of sensing schedules for us in the flowcharts of FIG. 15A.

FIG. 16A is an example of an exemplary sensing schedule for the pill box 102, Step 620 of FIG. 15A. The horizontal X-axis represents the time of day in military time (100-2400 hours) for a given time zone. The vertical Y-axis represents the number of times the microcontroller 402 performs Step 626 of FIG. 13. In this example, Step 626 of FIG. 15A is performed the indicated number of times within a one-hour window, half-an-hour on each side, of each hour (100-2400). Other time windows may be used. Sensing may be performed uniformly throughout that window, or may be clustered according to different distributions known in the art, such as a Bell Curve. A distribution such as that shown in FIG. 19A may also define the schedule at which the microcontroller 402 of the pill box 104 decides to wake up.

Since transmission of data in Step 814 involves potentially power-intensive cellular or other transmission, the transmission may be performed during a fraction of the sensing times shown. Similarly, Step 806 in FIG. 15A, may be performed during a fraction of the sensing times to save power and prevent annoyance for the user 106. The scheduling of Steps 802 and 806 may depend on user preferences and doctor's prescriptions concerning when a dose should be taken.

In this example, the sensing schedule is based on a predetermined number of sensing times per day (24 hours). The predetermined number may be based on the number of sensing operations that may be performed, along with the other operations of the pill box 102, before the battery 442 needs to be charged. In the current example, the battery 442 needs to be charged after three (3) weeks, which, based on the power required for sensing and transmission of sensed data, allows for 300 sensing operations per 24 hour period. If the battery 442 could last longer, if the pill box 104 is configured to perform fewer other operations, or if the user 106 can tolerate charging more often, for example, additional sensing operations may be provided per day. Under other circumstances, fewer sensing operations may be provided.

Given the total of 300 sensing times per day in this example, the sensing may be distributed so that sensing occurs 13 times per hour during prime waking hours (7:00 AM-6:00 PM), during which a user 106 is most likely to remove medication, while sensing occurs 12 times per day during the other hours of the day, since the user 106 may be less likely to take pills during this time. The range of "prime waking hours" may be shifted, widened, split etc., in order to account for an individual user's lifestyle and needs. For example, a user may take a nap at 5 PM and not take their evening pills until 7 PM, for example. The total number of sensing times (300) and the distribution of sensing times in this example is merely exemplary and more or fewer sensing times may be provided. For example, more sensing times may be provided during prime wake hours and fewer during other times.

Figure 16B:
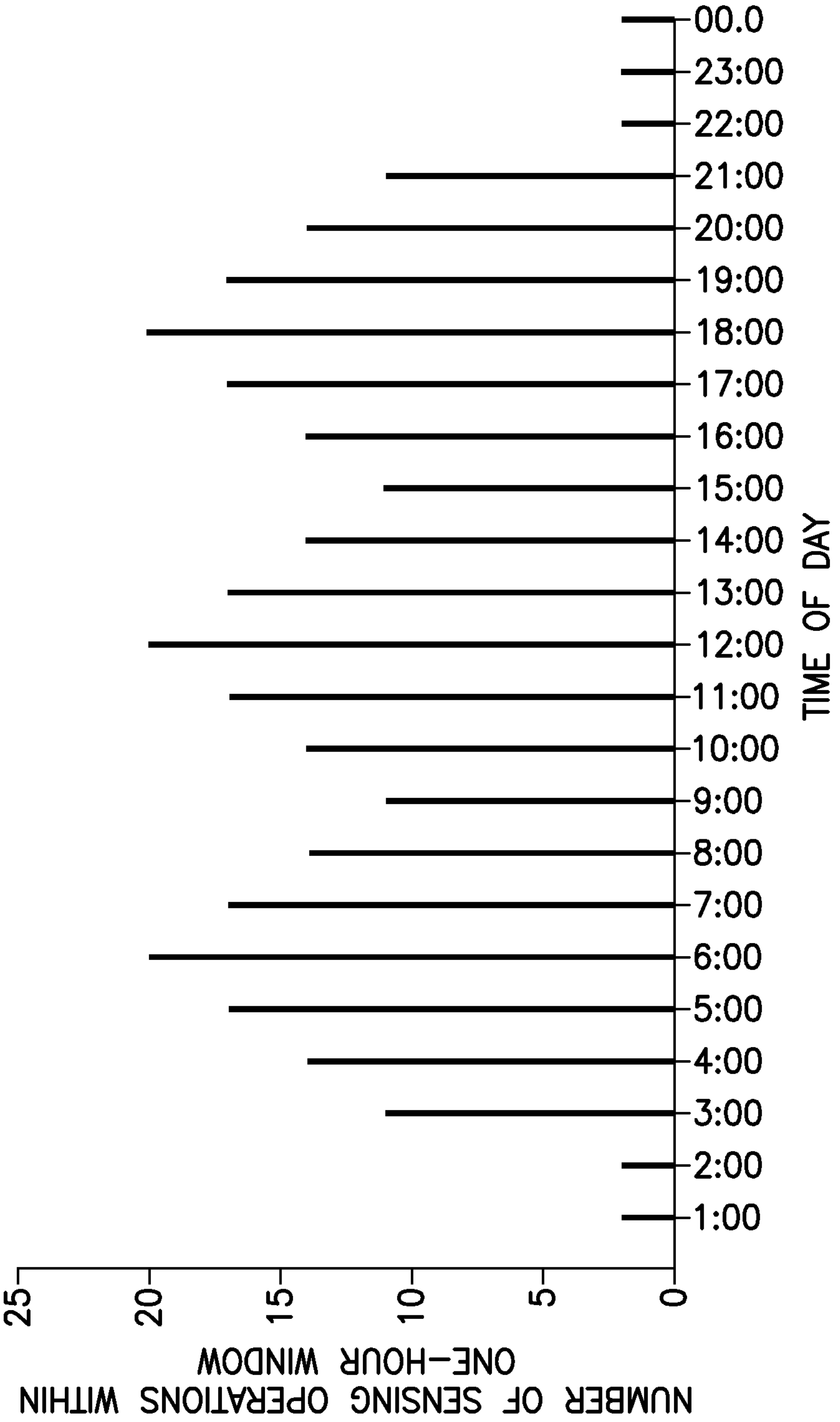

FIG. 16B is an example of an alternative distribution of the sensing times. FIG. 16B maintains the same exemplary assumption of 300 sensing times per day, but distributes the sensing so that the distribution peaks around 6:00 AM, 12:00 AM, and 6:00 PM, and drops off between those hours. The distribution falls to 2 sensing operations per hour at night between 10 PM and 2 AM. The peak times may depend on times prescribed by the physician, the user 106, and the user's lifestyle, and may be adjusted from the example of FIG. 16B.

The total distribution may depend on the probability that a respective user 106 will take their medications within a given hour, multiplied by the number of sensing times per day (300 in this example). The probability may be based on a statistically significant number of past dose removals per hour divided by the total number of doses, for example. The probability may also be determined based on a few or a large number of users. The sensing frequency may have multiple peaks near the specified dosing times for the respective user 106. Other factors may be considered in determining the distribution of sensing times for a pill box 104 used by a respective user 106, such as the remaining power in the battery, for example.

The initial number of sensing times may be progressively adjusted from an even distribution, such as the distribution of FIG. 16A, to a distribution having peaks around specified dosing times, as in FIG. 16B, after a certain number of days or weeks during which a respective user 106 has used the pill box 104. Combinations of machine learning and artificial intelligence techniques known in the art may be used to determine when user 106 is most likely to take the respective doses of medication. For example, if a respective user 106 takes their Tuesday morning medications within 5 minutes of 6:00 AM every Tuesday morning, the microcontroller 402 or the central processing center 102 may adjust the sensing schedule to more closely concentrate sensing closer to 6 AM on Tuesday mornings.

The microcontroller 402 and/or the central processing center 102 may also adjust the time the alarm 436 goes off and/or reminders are sent to user devices 114 so that they do not begin until 6:05 AM instead of 6:00 AM, for example, based on past activity of the user 106. This provides a more realistic grace period based on past activity to match the habits of the user and mitigates annoying the user. If the microcontroller 402/central processing center 102 changes the rate of sensing operations to 20 per hour within the Tuesday 6:00 AM window, with a 3-minute resolution of pill removal, the microcontroller 402/central processing center 102 may learn over time that a respective user 100 in fact takes their medications within 3 minutes of 6:00 AM. In this case, the system changes the patient's first reminder for the Tuesday morning dose from 6:05 AM to 6:03 AM. A "5-minute", "3-minute", and/or "1-minute" time interval may be stored to provide the adjustment, for example. Other times may be stored, as well.

Figure 17:
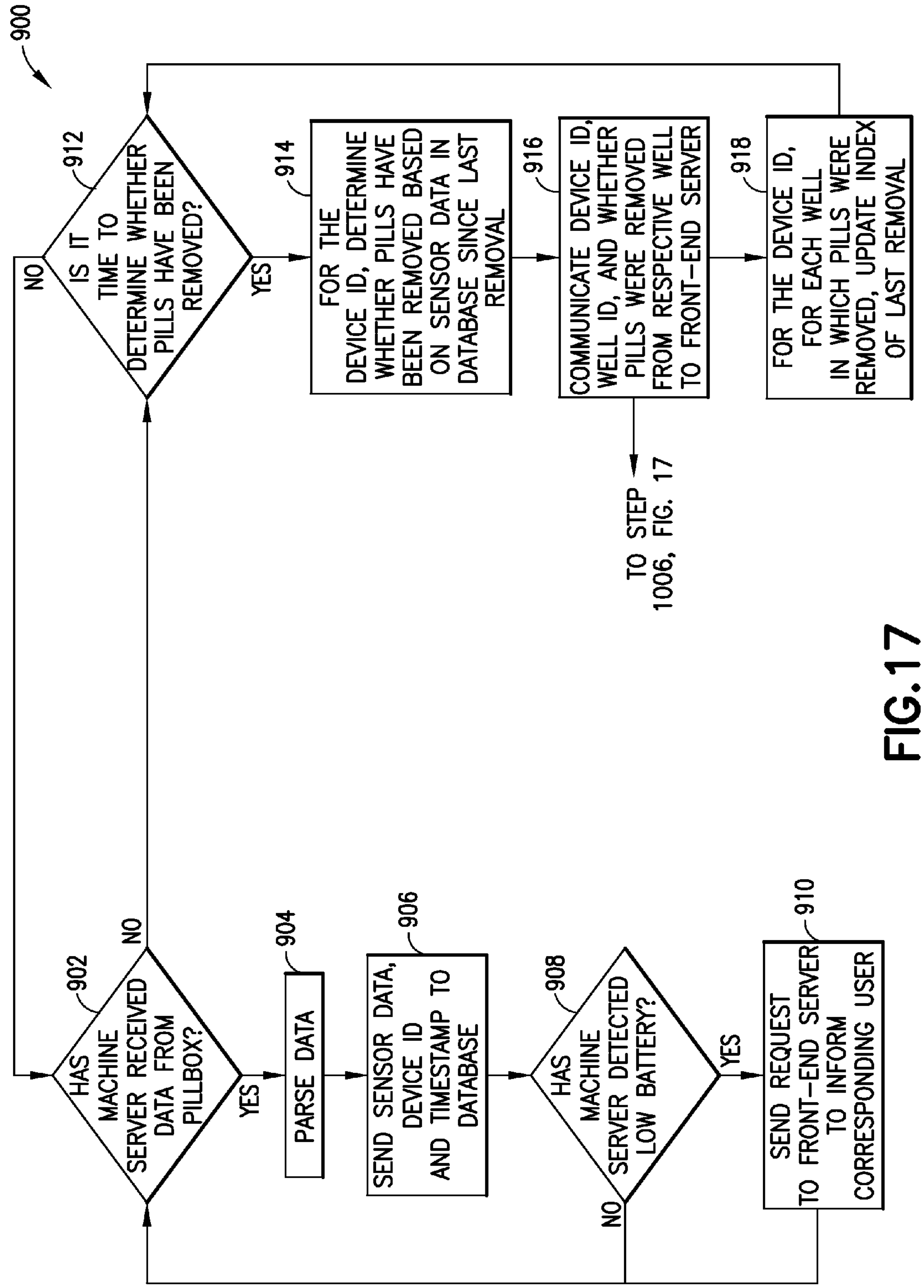
FIG. 17 is a flow chart 900 of an example of the operation of the machine server of the central processing center 102, in accordance with one embodiment of the invention.

FIG. 17 is a flow chart 900 of an example of the operation of the machine server 118 of the central processing center 102, in accordance with one embodiment of the invention. In Step 902, the machine server 118 checks whether data from a given pill box 104 has been received. The data includes the sensed data and the device ID of the pill box 104 sending the data, as well as other data concerning the pill box 102, such as the state of the battery 442. If Yes, the machine server 118 parses the sensed data for processing and storage by the machine server 118, in Step 904.

In Step 906, the machine server 118 stores the parsed sensed data, the device ID, and a timestamp assigned to the data in the database 119 in or associated with the machine server. The time stamp may be transmitted from the pill box 104 when the data is sent or may be recorded by the machine server 118 when the data is received, during Steps 902 through 906. The database 119 may use appropriate methods and data structures known in the art to associate the sensing data, device ID, and timestamp. The data may be associated in a table, for example.

In Step 908, the machine server 118 checks whether the data value corresponding to the voltage on the battery 442 received from the pill box 104 indicates a low level of charge, and thus needs recharging. If Yes, then in Step 910, the machine server 118 sends a request to the front-end server 122 to remind the user 106 corresponding to the device ID to recharge the battery 422. The machine server 118 then returns to Step 902, as it would if the battery value was not determined to be low in Step 908.

If the machine server 118 has not received data from a pill box 104 in Step 902, then the machine server proceeds to Step 912 to determine whether or not it is time to determine whether pills have been removed from a well based on the received sensing data, in Step 914. Step 914 may occur just before it is time to remind the user 106 to take their medication, so that there is time to gather enough data and enable or shut off any pending reminders if it is determined that one or more pills have been removed from a well. Step 914 in this example is performed by the machine server 118 when data is not being received.

If it is not time to determine whether pills have been removed from respective wells, the machine server 118 returns to Step 902. If it is time to perform the sensing algorithm, when data is not being received in this example, the machine server 118 proceeds to Step 914, where the machine server determine whether pills have been removed from each well based on the stored sensing data corresponding to each device ID and well, since the last time pills were removed from that well for that device ID. The time at which pills were last removed may be periodically reset, such as weekly, when a new tray is issued to a user 106. Step 914 may only be performed for the subset of users 106 who were supposed to remove medication from a well in a current time period.

The determination that pills or other medications have been removed from a respective well may be based on thresholds, or the step function analysis techniques discussed above, for example.

In Step 916, the machine server 118 communicates each well ID and device ID from which pills were removed to the front-end server 122. The machine server 118 may push the data or the front-end may pull the data, for example. In one example, the machine server 118 queues the data in the database 119 of the machine server and sends the data to the front-end server 122, which may store the received data in the front-end database 121. Other information may also be provided to the front-end server 122, such as the status of other components, such as the battery 442. As discussed above, the machine server 118 and the front-end server 122 communicate with each other via the network 108, or via direct connections, for example.

In Step 918, for each of the device IDs and wells from which pills were removed, the index indicating the last time that pills were removed is updated to the current time. The machine server 118 then returns to Step 912.

Figure 18A:
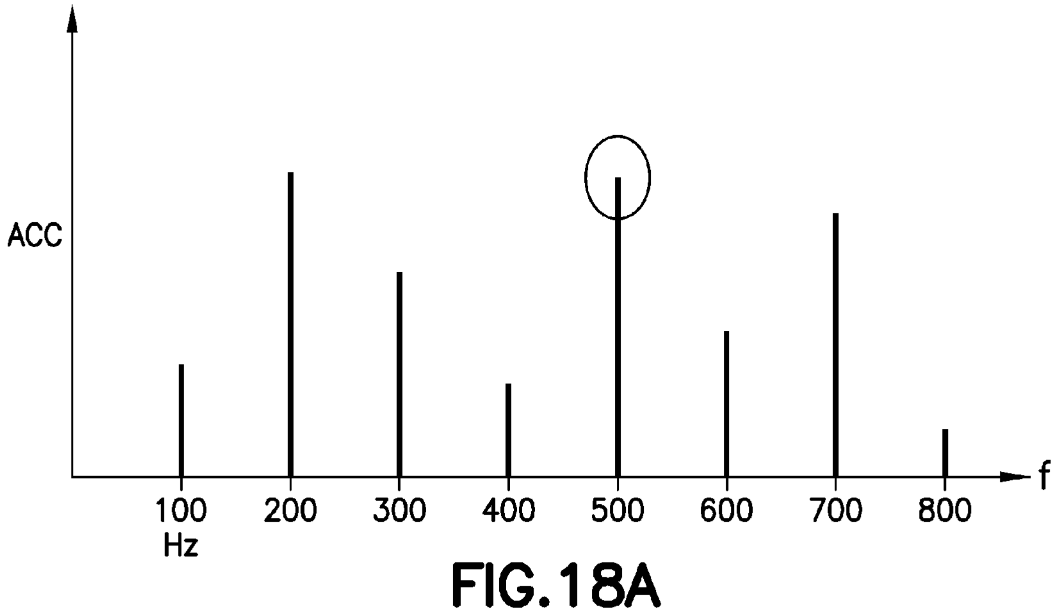
FIGS. 18A-18B are graphs of examples of a Fourier Transforms of the data from the accelerometer and capacitance sensors over a frequency range.

Capacitance values may be impacted by movement of the pill box 102. Such movement may be detected by the motion sensor 470, such as the accelerometer **470*b*. FIG. 18A is a graph of an example of a Fourier Transform of the data from the accelerometer 470*a* from 100 Hz to 800 Hz, in intervals of 100 Hz. FIG. 17B shows the equivalent Fourier Transform data from the capacitance sensing. These numbers are purely exemplary. If there are corresponding high frequency spikes in the capacitance time series data and the accelerometer time series data, then the spikes are likely due to movement of the pill box 102**.

Figure 18B:
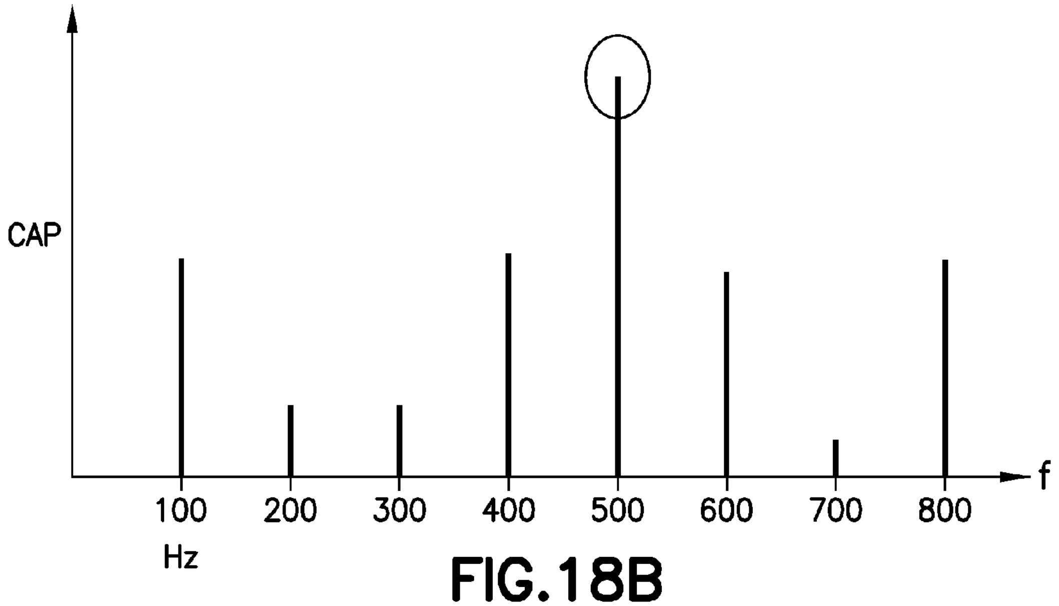

There is little correlation between the frequency components of the data except at 500 Hz (which is circled in FIGS. 18A and 18B). This suggests that there may be some influence from the motion of the box (measured by the accelerator **470*a***) and the capacitance sensors at 500 Hz. To improve the data before analysis of whether pills have been removed from a respective well, in accordance with an embodiment of the invention, the 500 Hz component in the capacitance data is reduced or removed.

After the 500 Hz component is corrected for, the capacitance data is re-converted to the time domain using the inverse Fast Fourier transform ("FFT"), yielding the "corrected" capacitance data to be analyzed. Similar changes may be made to other frequency components, if necessary in other examples. Spikes may be similarly eliminated or reduced in the time domain.

Figure 19A:
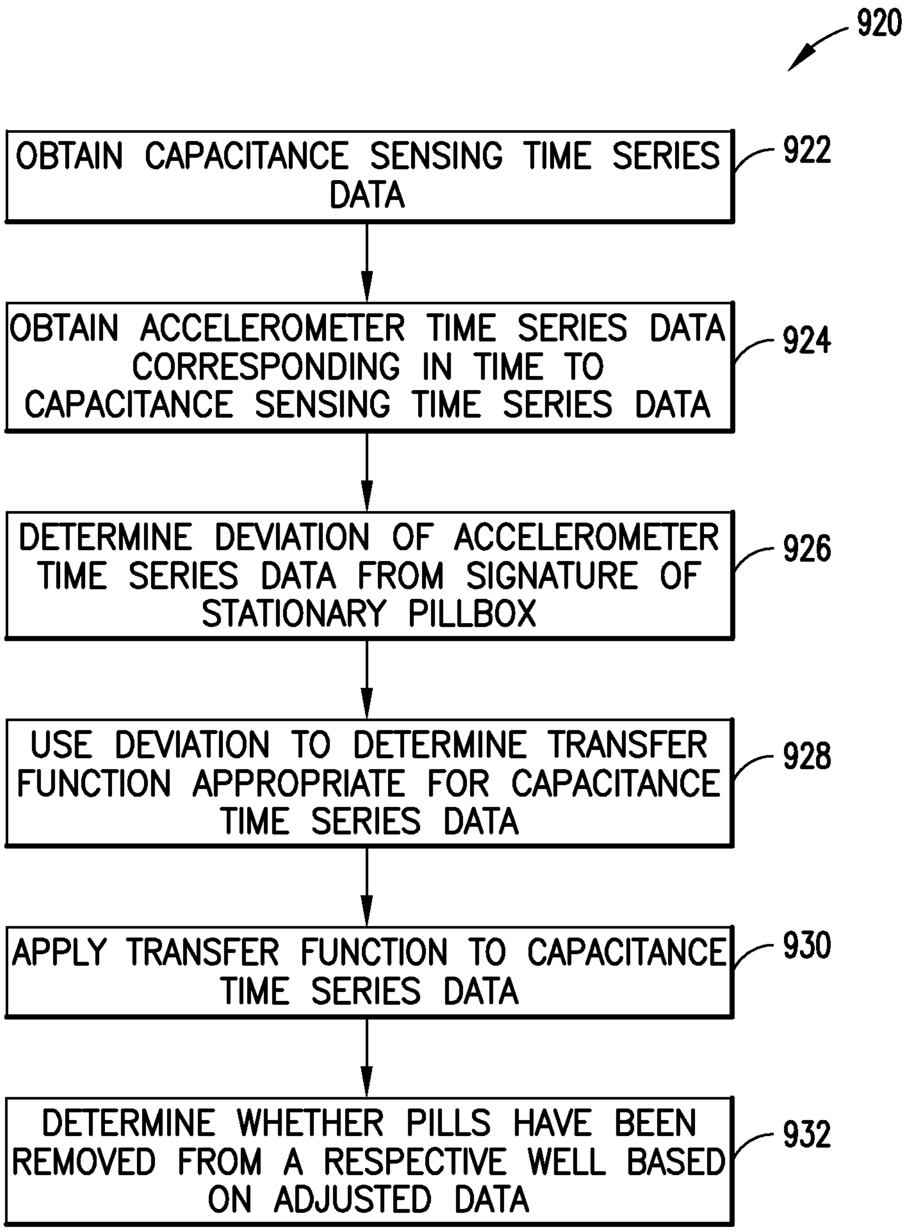
FIG. 19A-19B are flowcharts of examples of adjusting capacitance sensing data based on accelerometer data, in accordance with embodiments of the invention.

FIG. 19A is a flowchart 920 of an example of a method for compensating sensed capacitance values for movement detected by the accelerometer **470*a* or other motion sensor, in accordance with one embodiment of the invention. The method may be implemented by the machine server 118 or the microcontroller 402 in the pill box 102, for example. FIG. 19A will be described with respect to the machine server 118**.

Capacitance sensing time series data, which is a time-indexed batch of data from a respective well that is sent to the central processing center 102 by the microcontroller 402 during data transmission, is obtained in Step 922. Accelerometer time series data corresponding in time and/or frequency to the capacitance sensing time series data is obtained in Step 924.

A deviation of the accelerometer time series data from accelerometer time series data of a stationary pill box is determined, in Step 926. Accelerometer time series data while the pill box 104 is stationary may be obtained during setup servicing, and/or calibration of a respective pill box 102, for example and stored in the memory 922, for example.

From the deviation the machine server 118 determines a transfer function appropriate to adjust the capacitance time series, in Step 928. The transfer function may be as simple as multiplying the data at the coinciding frequency and/or time by "0" to eliminate that data, while multiplying the rest of the data by "1", for example. More complex transfer functions may be derived, as well. In one example, the major frequency components in the capacitance time series data and the accelerometer time series data are analyzed by analyzing frequency and/or time domains of the signals by performing a Fourier transform, for example. The transfer function may be based on the comparison of the high frequency coincidences, which may be spikes, peaks, fluctuations, or deviations in the identified in the Fourier transform, for example.

The transfer function is applied to the capacitance time series data, in Step 930, to transform the capacitance data. After the spike(s) are corrected for, the capacitance data is re-converted to the time domain using the inverse Fast Fourier transform ("FFT"), yielding the "corrected" capacitance data to be analyzed to determine whether pills or other medications have been removed from a respective well, in Step 932.

Figure 19B:
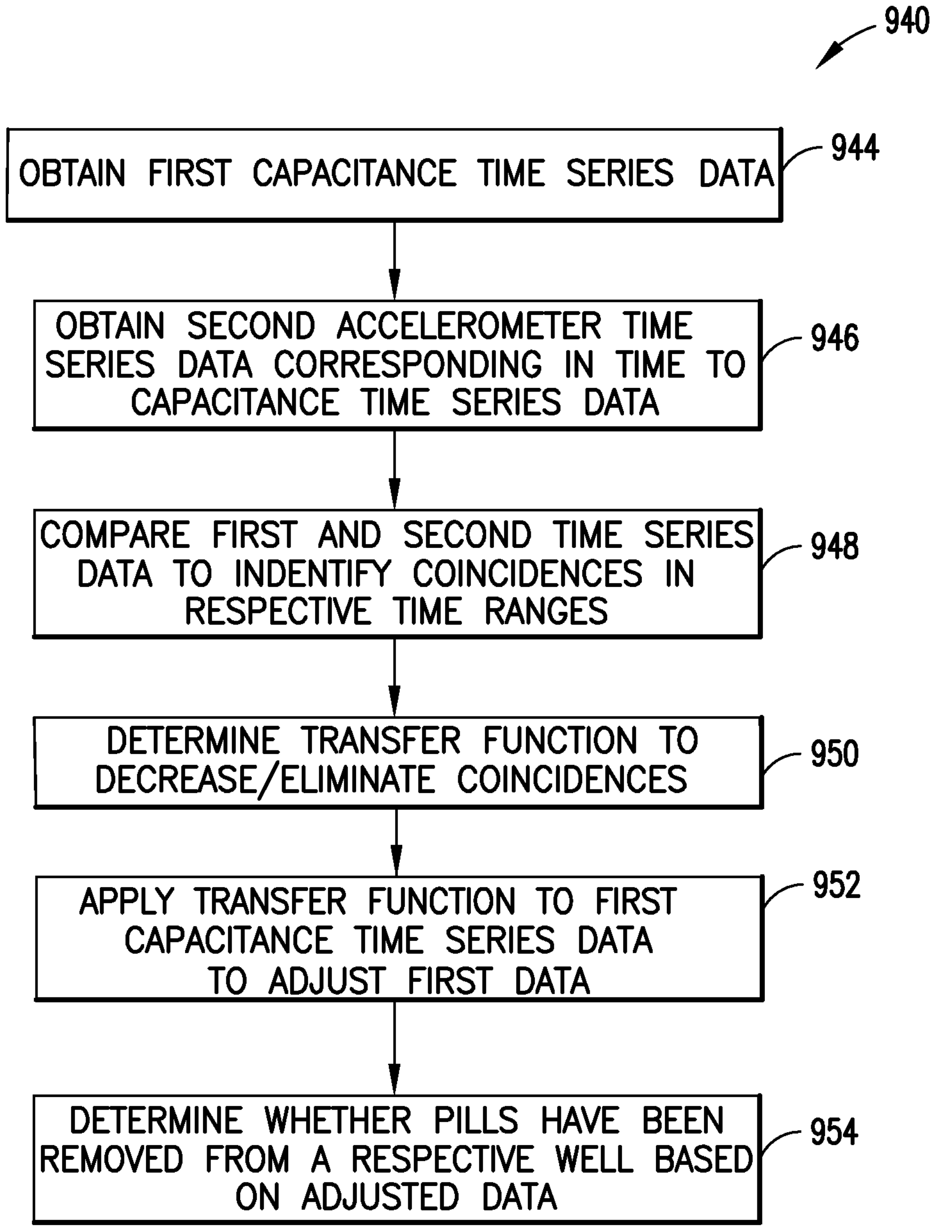

FIG. 19B is a flowchart 940 of another example of a method for compensating sensed capacitance values for movement detected by the accelerometer 470*a* or other motion sensor, in accordance with this embodiment of the invention. As above, the method may be implemented by the machine server 118 or the microcontroller 402 in the pill box 102, for example. FIG. 19B will be described with respect to the machine server 118. First capacitance time series data from a respective well, and second accelerometer time series data corresponding in time and/or frequency to the capacitance time series data are obtained in Steps 944 and 946, as above.

The first and second time series data are compared to identify coincidences, in Step 948. A transfer function is determined to decrease or eliminate the coincidences, in Step 950, as above. The transfer function is applied to the first data to adjust the first data before analysis, in Step 950. The adjusted first data is analyzed to determine whether medication, such as pills, have been removed from the respective well, in Step 954.

Alternatively, "jerk" may be measured by taking the time derivative of the acceleration data from the accelerometer 470*b* or other motion sensor 470, for example. In other examples, the capacitance values may be adjusted based on the 1) velocity (divide FFT by 2pi*f), 2) position (divide FFT again by 2pi*f), or 3) a combination thereof, from values received from the accelerometer 470 or other motion sensor 470.

In another example, the capacitance time series may be corrected based on the accelerometer time series data through correction values stored in a look-up table correlating correction values with accelerometer data, for example. The capacitance time series data may also be corrected based on the accelerometer time series data through a learning algorithm.

Figure 20A:
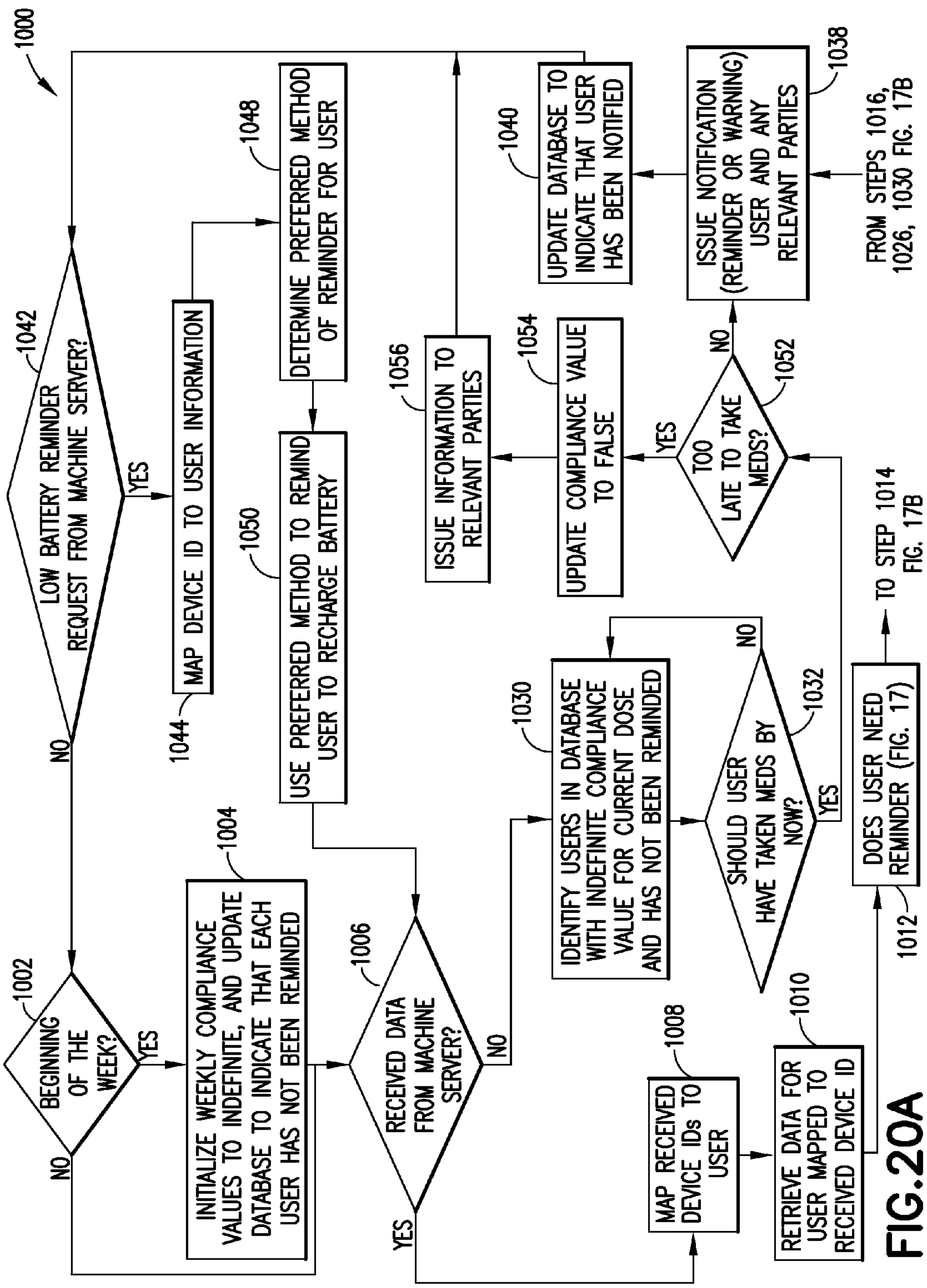
FIGS. 20A-20B are flowcharts of examples of the operation of the front-end server in accordance with an embodiment of the invention.

FIG. 20A is a flow chart 1000 of an example of the operation of the front-end server 122 in accordance with an embodiment of the invention. In Step 1002, the front-end server 122 checks whether it is the beginning of the week, at which point each patient should have received a new tray 208 or reloaded their pills into the wells 218 of the grid 218 of their pill box 102. It is now time to start monitoring the adherence of the user 106 to the upcoming weekly medication schedule. If it is not the beginning of the week, the front-end server 122 proceeds directly to Step 1010, which is discussed further below.

If it is the beginning of the week, then in Step 1004, the front-end server 122 changes a parameter corresponding to the user's compliance for a given dosing time to "indefinite" for the upcoming week, in order to indicate that it is not yet known whether or not the user 106 has taken or missed their dose. The front-end server 122 also changes a parameter corresponding to whether or not the user 106 has been reminded of that dosing time. These parameters may be set for every user 106 and every dosing time (each well in the pill box 102) of each user 106. The front-end server 122 may use a data structure, such as a table, that includes the medication regimen, medication schedule, and a 3×7 array that represents the wells 210 of the tray 208 or wells 218 of the grid 216, respectively, for each of the parameters reset in Step 1004 for each user 106, for example.

In Step 1006, the front-end server 122 checks whether data has been received from machine server 108 (sent in Step 916 in FIG. 17A).

If the data has been received, then in Step 1008 the front-end server 122 maps the received device ID to a respective user 106. The mapping of a device ID to a user 106 may be stored in the database 121 of the front-end server 120 and may only be accessible via requests from the front-end server 112, in order to separate the identity of user 106 from the specific pill box 104 being used. In Step 1010, the front-end server 122 retrieves relevant data for the user 106 identified in Step 1008, such as the medication regimen, which includes the medication schedule and other information, such as dosing instructions, for the respective user 106.

Figure 20B:
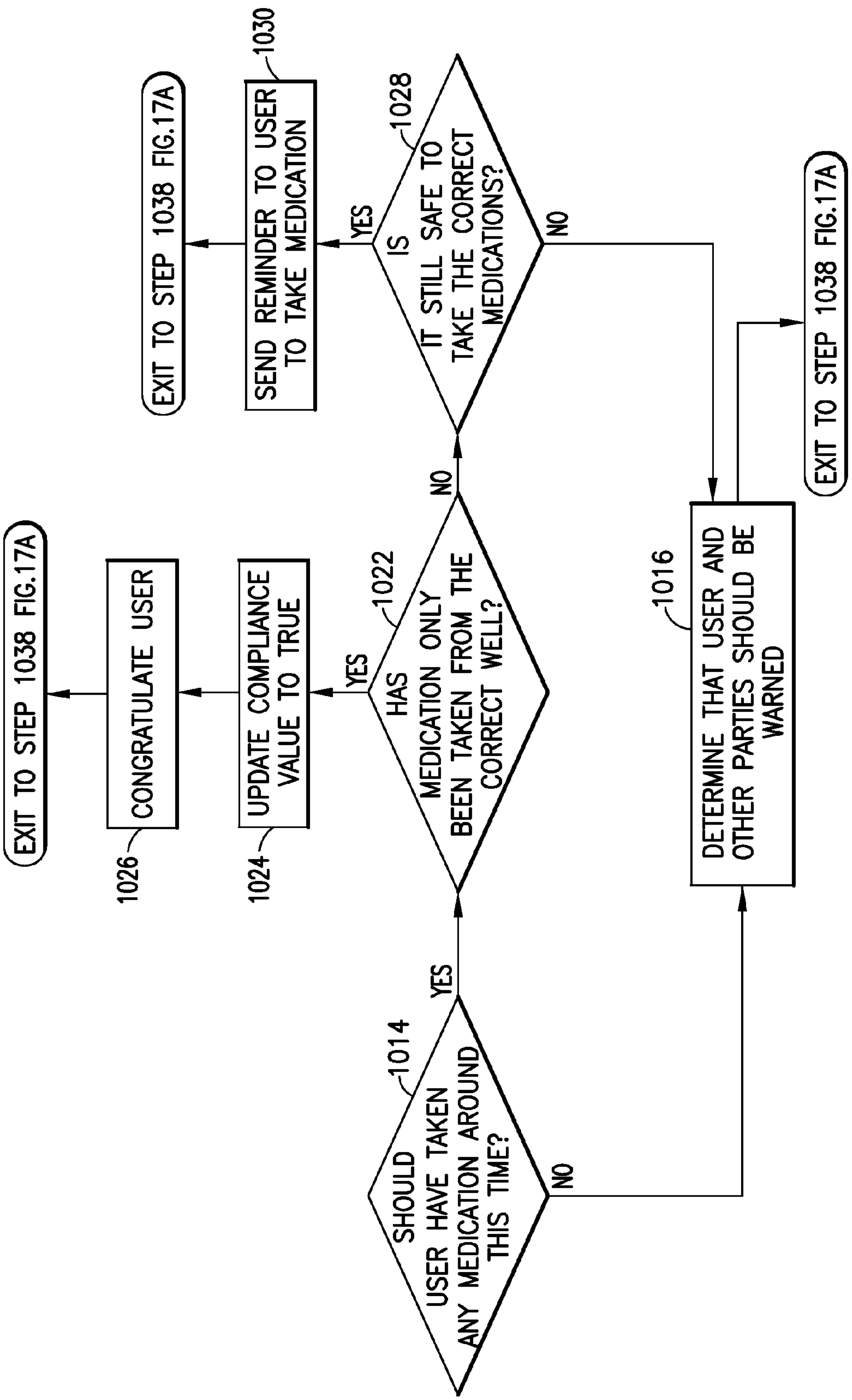

In Step 1012, the front-end server 122 checks whether or not the user 106 needs to be reminded to take medication. FIG. 20B is an example of the operations in Step 1012. In Step 1014, FIG. 18B, the front-end server 112 determines whether the respective user 106 should have taken any medication around the current time, in Step 1014, FIG. 20B. This may be done by comparing a current time to the time defined in the medication schedule of the respective user 106. The time defined by the medication schedule may include a range such as plus or minus 30 minutes, for example. "Around the time" in this example refers to the range of minutes or hours that can be set by or on behalf of a user 106 by the front-end server 112.

If No in Step 1014, the front-end server 122 determines that the user 106 and other parties should be warned, and proceeds to Step 1038 in FIG. 20A. If the data is received from the machine server 118 in Step 1006, the user 106 should not have taken medicine around this time (No in Step 1014), the user may have overdosed, mixed drugs, or otherwise consumed medication in a dangerous manner. The front-end server 122 then exits to Step 1038 in FIG. 20A.

If Yes in Step 1014, the front end server 112 checks whether medication has only been taken from the correct well by comparing the well defined by the medication schedule with the well ID provided by the machine server 118. If Yes, the front-end server 122 assumes that the user 106 has taken only the correct medication and all of the correct medication for that time period, and updates the user's compliance value from "indefinite" (see Step 1004) to "true" in Step 1024. The front-end server 122 may then congratulate the user, in Step 1026.

If the user 106 has not taken medication only from the correct well (No in Step 1022), the front-end server 122 determines whether it is still safe for the respective user 106 to take the medication, in Step 1028. The front-end server 122 may determine this based on information in the medication regimen for that user stored by the front-end server 122, in the database 123, for that user, such as instructions from the doctor and/or pharmacy, contraindications, and other information. If Yes, then in Step 1030, the front-end server 122 Exits to Step 1038 in FIG. 20A, to send appropriate reminders to the user 106 and members of the care community 124.

If it is not safe to take the correct medications (No in Step 1028), the front-end server 122 proceeds to Step 1016 to determine that the user 106 should be warned not to take the medication. Other parties, such as, members of the care community 124, may also be warned that the user 106 should not take the medication.

If not predetermined, the one or more members of the care community 124 may initially be chosen to receive warnings and reminders randomly. In accordance with an embodiment of the invention, if over time the front-end server 122 learns that reminders sent to particular members correlate with increased medication compliance, then future reminders may be sent to them. The front-end server 122 may apply a learning algorithm to make such determinations. Thus, if the user 106 responds to follow-up calls by his or her spouse by increasing medication adherence, but does not do so for follow-up calls from his or her doctor, then the front-end server 122 will remind the spouse more frequently and the doctor less frequently, for example.

In Step 1038, the front-end server 122 issues a warning, such as a text or email, to user devices 114 and/or an automated phone call to the user 106 and any other relevant parties, such as one or more members of the care community 124 via their respective devices and/or an automated phone call, for example. This warning may include emergency instructions for handling the situation safely, for example.

If data has not been received from the machine server 118 in Step 1006, in Step 1030, the front-end server 122 identifies users 106 who have doses for which they have not been reminded and for which their compliance is indefinite (see Step 1004). In Step 1032, the front-end server 122 identifies the subset of the users 106 who should have taken their medications by the current time. If there are none, the front-end server 122 may return to Step 1030 until data has been received from the machine server 118, in Step 1006.

If users 106 should have taken the medication by now, (Yes in Step 1032), the front-end server 122 determines whether it is too late for these users to take their medications in Step 1052. This may be determined based on information in the medication regimen. If No, then in Step 1038 the front-end server 122 issues a reminder to the users 106 and relevant parties. In Step 1040, the front-end server 122 updates the database 123 to note that respective users 106 have been reminded, and then before proceeds to Step 1042 where the front-end server determines whether the machine server 108 has sent the front-end server 112 a request related to a pill box 104 with a low charge in battery 442. (Step 910, FIG. 17). If no such request has been received, the front-end server 122 returns to Step 1002. Step 1038 may follow from other steps as described above or may occur asynchronously.

For the users for whom it is too late to take medications (Yes in Step 1052), the user's "compliance value" is updated to "false" in Step 1054, and the user 106, members of the care community, and other relevant parties are notified for future reference, before the front-end server 122 proceeds to Step 1038. The compilation of "true" and "false" values for individual patients, medications, and times may be a valuable repository from which various statistical and data analytics tools known in the art may provide overall population trends related to medication adherence, by insurance companies, pharmacies, and/or medical providers, or example.

If a low battery reminder has been received (Yes in Step 1042), then in Step 1044, the front-end server 122 maps device ID information received from the machine server 118 to the corresponding user 106, as in Step 1008. In this case, the front-end server 122 determines in Step 1044 how best to send a reminder to the identified user 106 based on the preferences of respective users 106. The user 106 may have selected phone call, text message, email, etc. The user 106 may also be able to select different types of reminders for different events (text message for charging reminder, phone call for medication reminder). Once this method of reminder for recharging the battery has been determined, the front-end server 112 issues the reminder in Step 1050 before proceeding to Step 1006.

If it is too late for the user 106 to take this medication (Yes in Step 1052), then the front-end server 122 updates the compliance value false in Step 1054, and issue information to relevant parties, such as the user 106 and members of the care community 124, for example, in Step 1056. The server 122 then proceeds to step 1042, as discussed above.

Figure 21A:
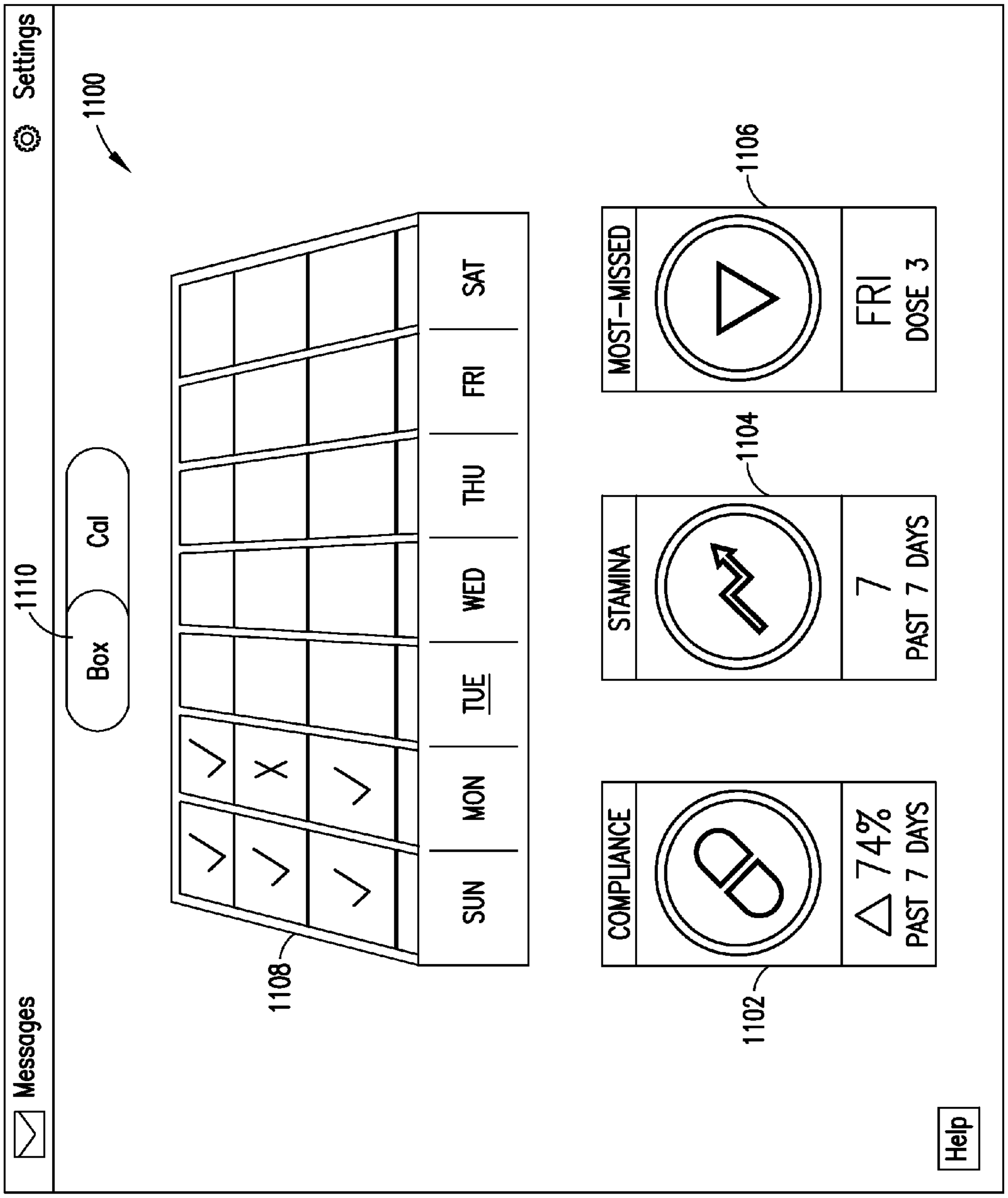
FIGS. 21A-21B are examples of displays available on screens of a user device of a user and on screens of other parties that tracks compliance of one or many users with a medication schedule, in accordance with an embodiment of the invention.

FIG. 21A is an example of a display 1100 available on a screen of a user device 114 that tracks compliance of a user 106 with a medication schedule, in accordance with an embodiment of the invention. The screen 1100 is generated by a processing device, such as a microcontroller, microprocessor of the pill box 104 and/or the central processing unit 102, for example, of the respective user device 114 under the control of an App on the device or accessible on the web, such as from the central processing center 102. The App is accessible via the network 108, for example. The web accessible App may be executed at the central processing center 102 by the front-end server 122, for example. The App on the user device 114 may be downloaded from the front-end server 122 or another source, for example.

In accordance with an embodiment of the invention, the App generates adherence indicators that quantify aspects of a user's adherence to their medication schedule. FIG. 18A shows three (3) such adherence indicators: 1) compliance 1102 in a time period; 2) stamina 1104, which is an indicator of how many days the user has been fully compliant; and 3) most missed dose 116 (statistically) over a time period. By "statistical" is meant that the most missed dose is based in a statistically significant number of doses. In this example, the adherence indicators are based on the number of times the microcontroller 402 on the pill box 104 and/or the central processing center 102 determines that the user 106 removed pills from the pill box 104 on time.

Compliance 1102 in a time period indicates the percentage of compliance with the medication schedule in the past seven (7) days. Compliance in other time periods, such as one (1), three (3), six (6), nine (9), and twelve (12) months, for example, may also be displayed. The user 106 may have an option to request the time period displayed through an input on the screen or keyboard of the user device 114, for example. Alternatively or in addition, the user 106 may request a default time period during set up or at a later time.

It is expected that display of the adherence indicators to the user 106 will encourage adherence. For example, the user 106 missed the Friday evening dose (dose 3) most often. This might have been due to a regular appointment that the user 106 has on Friday night, such as dinner outside the home with a family member, for example. Realizing that this dose is often missed, the user 106 may concentrate on bringing the pill box 104 to dinner or having dinner at home, for example.

Also shown in the display 1100 is a representation 1108 of the user's medication regimen in the visual form corresponding to the rows and columns of the pill box 102. The availability of this representation may be based on a data structure in the App that maps the medication regimen of the user 106 to the compartments in the pill box. The representation 1108 of the pill box 104 may include indictors that a dose has been taken, such as a check mark. The representation 1108 may indicate the respective days of the week (Sunday-Saturday) in association with respective columns the current day by highlighting the name of the day. In FIG. 18A, Tuesday is underlined to indicate that it is the current day. An indicator may also be used to show that a dose has been skipped, such as a cross mark (X). FIG. 19A shows that all the doses on Sunday and Monday, and the morning and evening doses on Tuesday have been taken, but that the Tuesday afternoon does has been skipped for example. Clicking on a respective well may also reveal additional information such as actual time of day the dose should be taken, identification of the specific medications to be taken, warnings or other information ("take with food," "take on empty stomach," for example), the prescribing doctor, etc.

Adherence indicators may be modified, manually or automatically by the user 106 guardian, a member of the care community 124, for example, to correct for errors. For example, if a false negative occurs, wherein the pill box 104 detects a high capacitance despite the patient having removed the pill on time, the user 106 and members of the care community 124 may still receive reminders and/or other notifications. A witness having seen the patient actually taking the pill may request a member of the care community 124 to acknowledge that the medication was in fact taken on time. The user 106 may also send a picture of an empty well to the central processing center 102 from a user device 114.

The user 106 may also see that a cross-mark (X) indicates that a respective dose is missed (such as Tuesday afternoon), when the user 106 did take the dose.

A tab 1110 may be provided to switch between display of the representation 1108 ("Box") display of a calendar ("Cal"). The calendar may be a weekly or monthly calendar, for example, that may also include indicators that doses have been taken or missed, as well as the other information described above.

The App may be configured to display a field or graphical user interface (not shown) in which the user 106 may indicate that they have taken other medications not part of their pill regimens. For example, the user may take vitamins that are not included in the tray 208 received from a pharmacy 124, for example. Alternatively, if the pill box 104 is not configured to store powder or liquid medication and the user 106 takes such medication from another dispenser or a container, the user 106 may enter that information. Even if that information is not verified, it can improve the user's 106 attentiveness in taking the medication.

The user 106 may have access to any subset or superset of the data displayed in FIG. 18A.

Figure 21B:
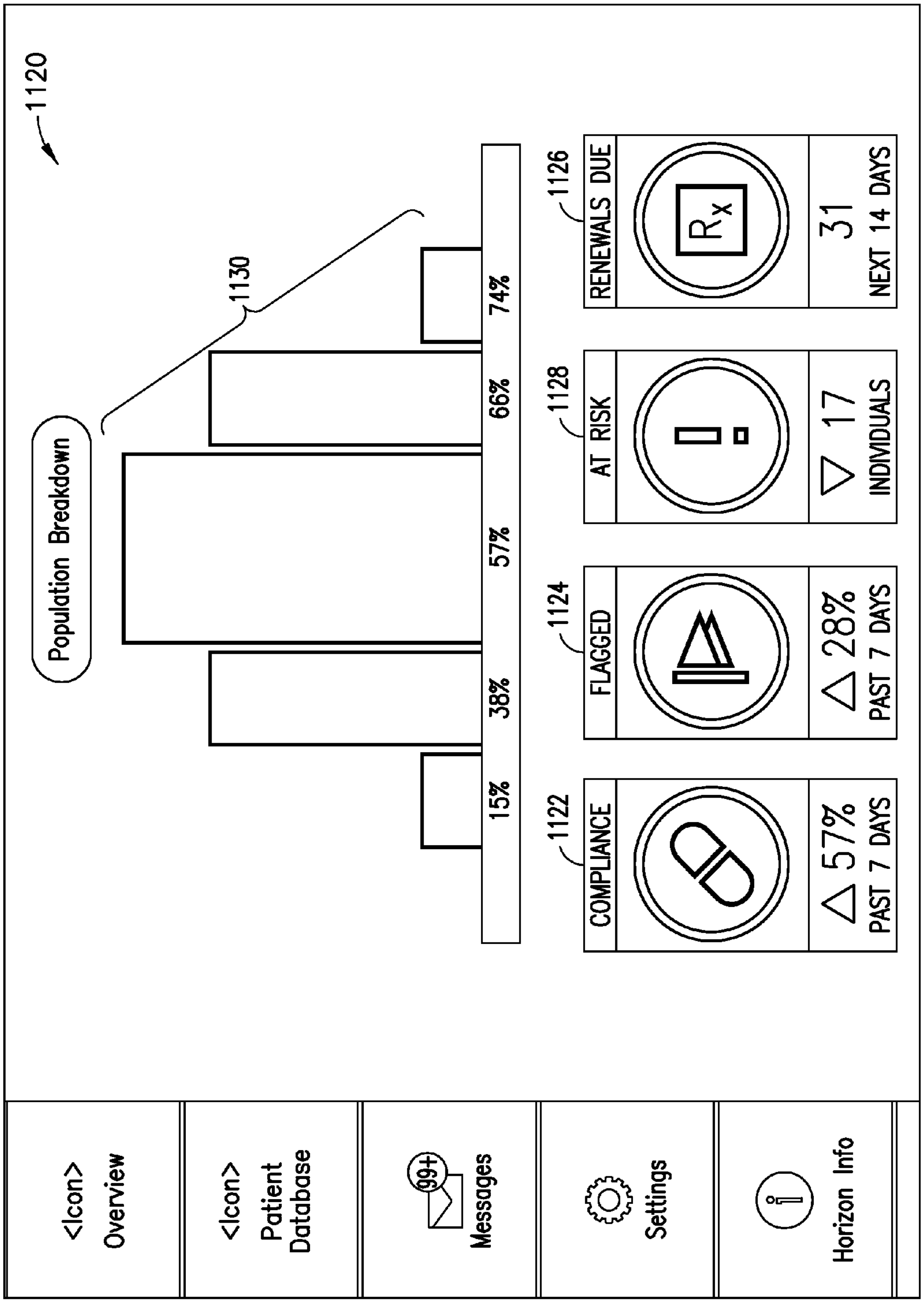

FIG. 21B is an example of a screen 1120 including information that may be made available to a member of the care community 124, such as a doctor or nurse responsible for multiple patients, on a device of a respective member of the care community, in accordance with another embodiment of the invention. The device may also have downloaded an App or have access to an App at the central processing center 102 via the network 108, cellular network 112, or other network. Here, the member of the care community member 124 may be able to view multiple types of data such as an average compliance 1122 of the patients under the care of the doctor or nurse, the number of patients under care that are flagged 1124 for requiring special attention due to low compliance, and the number of patients under care whose prescriptions need to be refilled soon, for example. Refill information may also be provided.

A doctor, nurse or other member of the care community 124 may be able to text, email, or cause an automated phone message to be sent to a respective user 106 to communicate with user 106 about their compliance. This is another way to improve the adherence of users.

Information provided via the App may enable members of the care community 124 to identify at-risk patients 1128 who need to be notified more frequently or monitored more closely. Notifications may be provided by live or automated phone call, text, email, etc. The central processing center 102 may assist the member of the care community in this task by detecting whether a given patient has been missing doses at or below a minimum threshold compliance rate and/or missing a particular dose more than a threshold number of times in a time period. The threshold(s) may be modified manually or automatically, based on the importance of certain medications and overall trends in missed doses among the population of patients by at least certain members of the care community, such as a doctor and/or nurse. The thresholds may be modified manually by a doctor, nurse, the user 106, etc., for example, by communicating with the central processing center 102 through the App.

Automatic adjustment may be performed by a machine learning algorithm by adjusting the threshold until no statistically significant improvements in adherence are provided by moving the threshold for missed doses down or up, for example.

The central processing center 102 may issue automated notifications to a user 106 instead of or in addition to the member of the care community's notifications, such as when a patient has missed a threshold number of doses of a critical medication. The central processing center 102 may also send notifications to members of the care community when these or other thresholds are exceeded. The user's insurance company may be similarly notified.

FIG. 21B also shows a population breakdown table 1130 of sub-populations relevant to particular parties, such as a doctor's patients or an insurance case worker's clients, for example. The information may be used by the respective parties to evaluate the adherence of the sub-population and determine of outreach or other action is necessary to improve adherence, for example.

It is understood by one of ordinary skill in the art that variations may be made to the examples described above without departing from the spirit and scope of the invention, which are defined by the claims below.

We claim as our invention the following:

1. A system for tracking a patient's adherence to a medication schedule, the system comprising:

- a replaceable tray comprising a plurality of first wells, each of the first plurality of wells interconnected to each other and containing medication for a set period of time of a medication schedule for a patient;
- a pillbox comprising
  - a body portion comprising a plurality of sensors, and
  - a grid comprising a plurality of second wells, the grid positioned within the body portion above the plurality of sensors; and
- a processor;
- wherein each of the plurality of first wells is positioned within a corresponding well of the plurality of second wells;
- generating an electric field in each well of the plurality of first wells partially based on the presence of medication in each well of the plurality of first wells, wherein each well of the plurality of first wells comprises a forward wall with an upward concave curved cross-section with respect to an interior of the well that rises from a bottom wall toward the front of each well in the direction of mediation removal, wherein each well of the plurality of first wells further comprises a rear wall extending upward with respect to a bottom wall, the upward concave curved cross-section configured to position the medication for sensing by a sensor of the plurality of sensors;
- wherein the processor is configured to determine adherence to the medication schedule for the patient based on a plurality of signals from the plurality of sensors and data for the medication schedule for the patient, wherein an absence of medication in a well of the first plurality of wells results in a changed value of a sensed physical quantity detected by a sensor of the plurality of sensors resulting in the absence of medication reported by the sensor.

2. The system according to claim 1 wherein the plurality of sensors comprises a plurality of parallel capacitive plates and wherein the medication positioned within a well of the plurality of first wells changes a dielectric constant between a pair of parallel capacitive plates of the plurality of parallel capacitive plates.

3. The system according to claim 1 wherein the plurality of sensors comprises a plurality of electrodes and wherein the absence of the medication within a well of the plurality of first wells changes the electric field in the well generated by the plurality of electrodes.

4. The system according to claim 1 wherein the processor is located at a remote central processing center.

5. The system according to claim 1 wherein the processor is located on the pillbox.

6. The system according to claim 1 wherein the pillbox further comprises a wireless transceiver for transmitting data from the pillbox.

7. A method for tracking a patient's adherence to a medication schedule, the system comprising:

placing a replaceable tray into a grid of a pillbox, the replaceable tray comprising a plurality of first wells, each of the plurality of wells interconnected to each other and containing medication for a medication schedule for a patient, the grid of the pillbox comprising a plurality of second wells, wherein each of the plurality of first wells is positioned within a corresponding well of the plurality of second wells;

generating an electric field in each well of the plurality of first wells partially based on the presence of medication in each well of the plurality of first wells, wherein each well of the plurality of first wells comprises a forward wall with an upward concave curved cross-section with respect to an interior of the well that rises from a bottom wall toward the front of each well in the direction of mediation removal, wherein each well of the plurality of first wells further comprises a rear wall extending upward with respect to a bottom wall, the upward concave curved cross-section configured to position the medication for sensing by a sensor of the plurality of sensors;

generating an electronic signal when medication is removed from a well of the first plurality of wells, the electronic signal generated by a sensor of a plurality of sensors positioned within the pillbox and in proximity to the well of the first plurality of wells detecting a change in the electric field;

transmitting the electronic signal to a processor; and determining if the patient is adhering to the medication schedule based on medication schedule data and the electronic signal.

8. The method according to claim 7 wherein the plurality of sensors comprises a plurality of parallel capacitive plates and wherein medication positioned within a well of the plurality of first wells changes a dielectric constant between a pair of parallel capacitive plates of the plurality of parallel capacitive plates.

9. The method according to claim 7 wherein the plurality of sensors comprises a plurality of electrodes and wherein the absence of medication within a well of the plurality of first wells changes the electric field in the well generated by the plurality of electrodes.

10. The method according to claim 7 wherein the processor is located at a remote central processing center.

11. The method according to claim 7 wherein the processor is located on the pillbox.

12. The method according to claim 7 further comprising filling the replaceable tray at a remote pharmacy.

13. The method according to claim 12 further comprising delivering the replaceable tray to a patient's residence.

14. A system for tracking a patient's adherence to a medication schedule, the system comprising:

a replaceable tray comprising a plurality of first wells, each of the first plurality of wells interconnected to each other and containing medication for a set period of time of a medication schedule for a patient;

a pillbox comprising a body portion comprising a plurality of sensors, and a grid comprising a plurality of second wells, the grid positioned within the body portion above the plurality of sensors; and a processor;

wherein each of the plurality of first wells is positioned within a corresponding well of the plurality of second wells;

generating an electric field in each well of the plurality of first wells partially based on the presence of medication in each well of the plurality of first wells, wherein each well of the plurality of first wells comprises a forward wall with an upward concave curved cross-section with respect to an interior of the well that rises from a bottom wall toward the front of each well in the direction of mediation removal, wherein each well of the plurality of first wells further comprises a rear wall extending upward with respect to a bottom wall, wherein the upward concave curved cross-section of each well of the plurality of first wells is configured to position the medication for sensing by a sensor of the plurality of sensors of the body portion;

wherein the processor is configured to periodically determine adherence to the medication schedule for the patient based on a plurality of signals from the plurality of sensors and data for the medication schedule for the patient, wherein an absence of medication in a well of the first plurality of wells results in a changed value of a sensed physical quantity detected by a sensor of the plurality of sensors resulting in the absence of medication reported by the sensor.

* * * * *